(12) United States Patent
Misawa et al.

(10) Patent No.: US 11,375,105 B2
(45) Date of Patent: Jun. 28, 2022

(54) CAMERA, SETTING METHOD OF CAMERA, AND SETTING PROGRAM OF CAMERA

(71) Applicant: FUJIFILM Corporation, Tokyo (JP)

(72) Inventors: Atsushi Misawa, Saitama (JP); Kentaro Tokiwa, Saitama (JP); Hirofumi Horii, Saitama (JP); Yuichi Fujimura, Saitama (JP); Takeshi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 15 days.

(21) Appl. No.: 16/918,560

(22) Filed: Jul. 1, 2020

(65) Prior Publication Data

US 2020/0336651 A1 Oct. 22, 2020

Related U.S. Application Data

(63) Continuation of application No. 16/242,329, filed on Jan. 8, 2019, now Pat. No. 10,742,870, which is a
(Continued)

(30) Foreign Application Priority Data

Jul. 29, 2016 (JP) .............................. JP2016-149788

(51) Int. Cl.
*H04N 5/232* (2006.01)
*H04N 5/225* (2006.01)
(Continued)

(52) U.S. Cl.
CPC ......... *H04N 5/23216* (2013.01); *G03B 17/02* (2013.01); *G06F 3/02* (2013.01);
(Continued)

(58) Field of Classification Search
CPC .. H04N 5/23216; H04N 5/225; H04N 5/2254; G03B 17/02; G06F 3/02; G06F 3/0487; G06F 3/0416; G06F 3/04883
See application file for complete search history.

(56) References Cited

U.S. PATENT DOCUMENTS 5,585,878 A * 12/1996 Matsukawa ............ G03B 17/18
396/281
5,742,853 A * 4/1998 Haga ...................... G03B 17/18
345/684
(Continued)

FOREIGN PATENT DOCUMENTS

JP 7-77718 A 3/1995
JP 7-134320 A 5/1995
(Continued)

OTHER PUBLICATIONS

International Preliminary Report on Patentability and Written Opinion of the International Searching Authority for International Application No. PCT/JP2017/023668, dated Feb. 7, 2019, with an English translation.
(Continued)

*Primary Examiner* — Nhan T Tran
(74) *Attorney, Agent, or Firm* — Birch, Stewart, Kolasch & Birch, LLP

(57) ABSTRACT

Provided are a camera capable of preventing an erroneous operation with a compact configuration and has high operability, a setting method of the camera, and a setting program of the camera. A change in a setting value by the operation dial is switched between valid and invalid, and an operation by the operation dial becomes possible only in a case where the change in the setting value is valid. A setting value of an item to be set by the operation dial is displayed on a dial display provided on the operation dial.

20 Claims, 44 Drawing Sheets

Related U.S. Application Data continuation of application No. PCT/JP2017/023668, filed on Jun. 28, 2017.

(51) Int. Cl.
  *G06F 3/041* (2006.01)
  *G03B 17/02* (2021.01)
  *G06F 3/02* (2006.01)
  *G06F 3/0487* (2013.01)
  *G06F 3/04883* (2022.01)

(52) U.S. Cl.
  CPC .......... *G06F 3/0416* (2013.01); *G06F 3/0487* (2013.01); *G06F 3/04883* (2013.01); *H04N 5/225* (2013.01); *H04N 5/2254* (2013.01)

(56) References Cited

U.S. PATENT DOCUMENTS

| | | | | |
|---|---|---|---|---|
| 5,749,005 | A * | 5/1998 | Haga | G03B 17/18 |
| | | | | 396/287 |
| 6,240,256 | B1 * | 5/2001 | Hozumi | G03B 7/097 |
| | | | | 396/223 |
| 2005/0184972 | A1 | 8/2005 | Tashiro et al. | |
| 2010/0087734 | A1 | 4/2010 | Song | |
| 2013/0021274 | A1 * | 1/2013 | Fukushima | H03K 17/9622 |
| | | | | 345/173 |
| 2016/0239196 | A1 * | 8/2016 | Takahashi | G06F 3/04842 |

FOREIGN PATENT DOCUMENTS

| | | |
|---|---|---|
| JP | 7-333709 A | 12/1995 |
| JP | 8-54661 A | 2/1996 |
| JP | 2002-277919 A | 9/2002 |
| JP | 2005-234993 A | 9/2005 |
| JP | 2005-250260 A | 9/2005 |
| JP | 2008-165118 A | 7/2008 |
| JP | 2010-88883 A | 4/2010 |
| JP | 2010-192223 A | 9/2010 |
| JP | 2014-202837 A | 10/2014 |
| JP | 2015-90668 A | 5/2015 |
| JP | 2015-125307 A | 7/2015 |

OTHER PUBLICATIONS

International Search Report for International Application No. PCT/JP2017/023668, dated Sep. 26, 2017, with English translation.

* cited by examiner

FIG. 18

| IMAGING MODE | ITEM TO BE SET BY OPERATION DIAL |
|---|---|
| PROGRAM | PROGRAM SHIFT |
| SHUTTER SPEED PRIORITY | SHUTTER SPEED |
| APERTURE STOP PRIORITY | F-NUMBER |
| MANUAL | SHUTTER SPEED OR F-NUMBER |

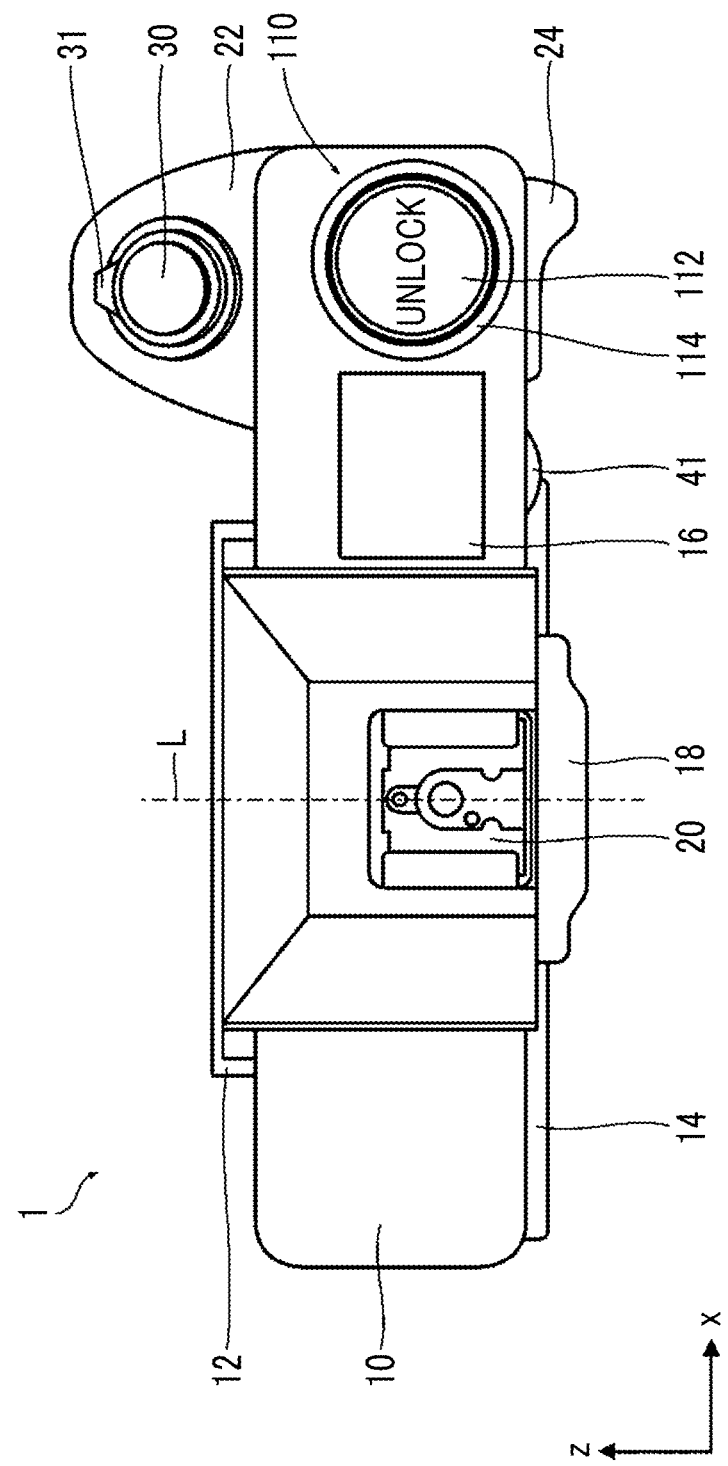

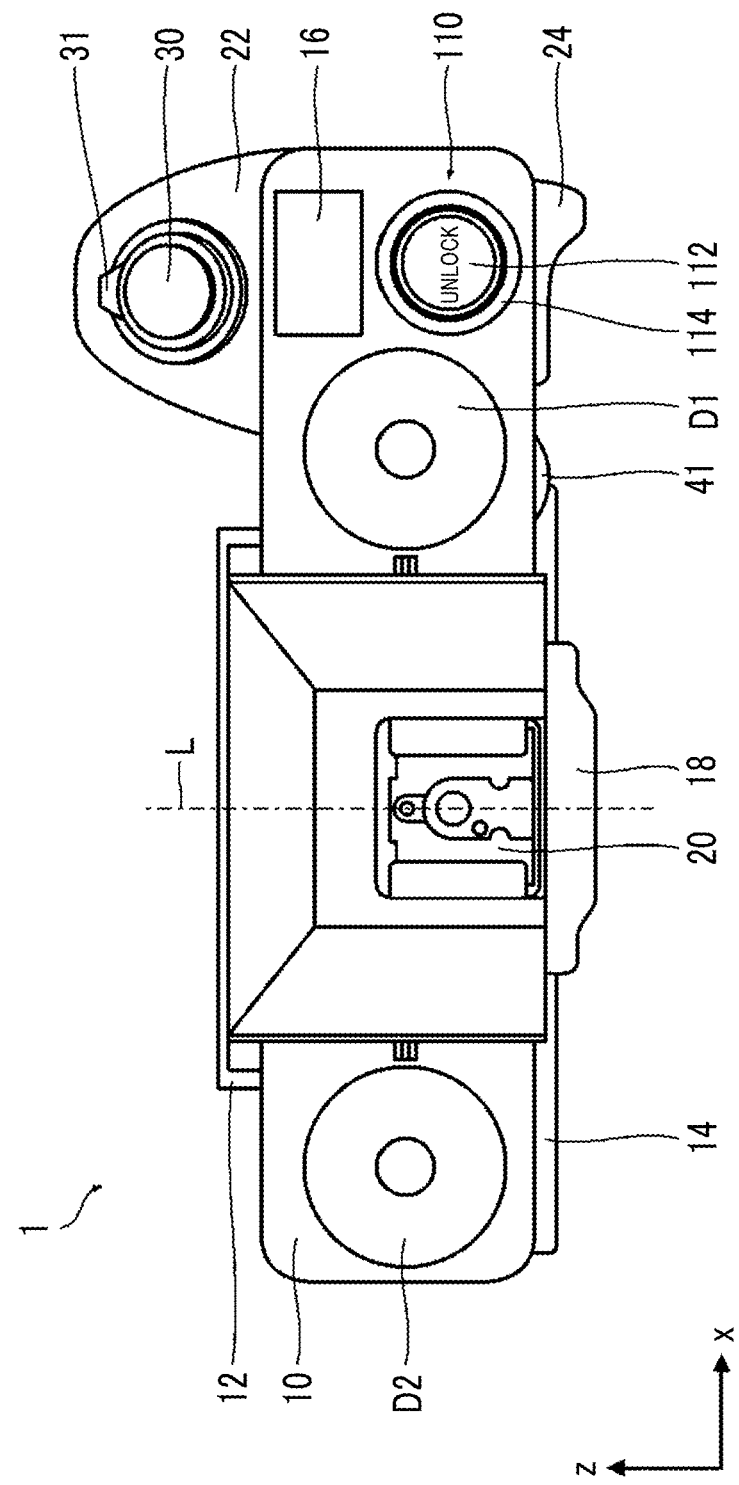

CAMERA, SETTING METHOD OF CAMERA, AND SETTING PROGRAM OF CAMERA

CROSS-REFERENCE TO RELATED APPLICATIONS

This application is a Continuation of copending U.S. application Ser. No. 16/242,329, filed on Jan. 8, 2019, which is a Continuation of PCT International Application No. PCT/JP2017/023668 filed on Jun. 28, 2017, which claims priority under 35 U.S.C § 119(a) to Japanese Patent Application No. 2016-149788 filed on Jul. 29, 2016. Each of the above application(s) is hereby expressly incorporated by reference, in its entirety, into the present application.

BACKGROUND OF THE INVENTION

1. Field of the Invention

The present invention relates to a camera comprising a rotary operation dial, a setting method of the camera, and a setting program of the camera.

2. Description of the Related Art

A camera that sets various conditions such as shutter speed, sensitivity, exposure correction value, and mode by using a rotary operation dial is known.

JP2008-165118A discloses an operation dial comprising a display section on a top surface as the rotary operation dial provided in a camera. In this operation dial, a display on the display section can be switched in response to an operation. Further, JP2014-202837A discloses an operation dial comprising a display section and a touch panel on the top surface of the operation dial. In the operation dial, the display on the display section can be switched by a touch operation on the touch panel.

JP1995-134320A (JP-H07-134320A) and JP2015-125307A propose operation dials comprising mechanisms that mechanically lock rotations of shafts.

Further, JP2002-277919A discloses a camera comprising means for prohibiting a change in a setting such that the setting is not changed even in a case where an operation dial is rotationally operated.

SUMMARY OF THE INVENTION

The invention has been made in consideration of the above-mentioned circumstances, and an object of the invention is to provide a camera capable of preventing an erroneous operation with a compact configuration and has high operability, a setting method of the camera, and a setting program of the camera.

Means for achieving the above-mentioned object are as follows.

A camera comprising: a rotary operation dial; a dial display section that is provided on a top surface of the operation dial; a display section that is provided near the operation dial; and a system controller configured to display setting values of a plurality of items capable of being set by the operation dial on the display section, display information on an item to be set by the operation dial, among the plurality of items, on the dial display section, switch between validity and invalidity of a change in setting value of the item to be set by the operation dial, change the setting value of the item in response to an operation of the operation dial in a case where the change in the setting value is valid.

According to the embodiment, the change in the setting value by the operation dial can be switched between valid and invalid. The operation by the operation dial becomes possible only in the case where the change in the setting value is valid. That is, the change in the setting value is allowed only in the case where the change in the setting value is valid. In the case where the change in the setting value is invalid, the setting value is not changed even in a case of operating the operation dial.

A setting method of a camera including a rotary operation dial, a dial display section that is provided on a top surface of the operation dial and a display section that is provided near the operation dial, the setting method comprising: displaying setting values of a plurality of items capable of being set by the operation dial on the display section, displaying information on an item to be set by the operation dial, among the plurality of items capable, on the dial display section, switching between validity and invalidity of a change in setting value of the item to be set by the operation dial, and changing the setting value of the item in response to an operation of the operation dial in a case where the change in the setting value is valid.

According to the embodiment, the change in the setting value by the operation dial is validated while the finger touches the top surface of the operation dial. That is, the operation becomes valid only in the case where the operation dial is operated while the top surface is touched.

BRIEF DESCRIPTION OF THE DRAWINGS

FIG. 18 is a table representing a relationship between imaging modes and items to be set by the operation dial.

Figure 22:
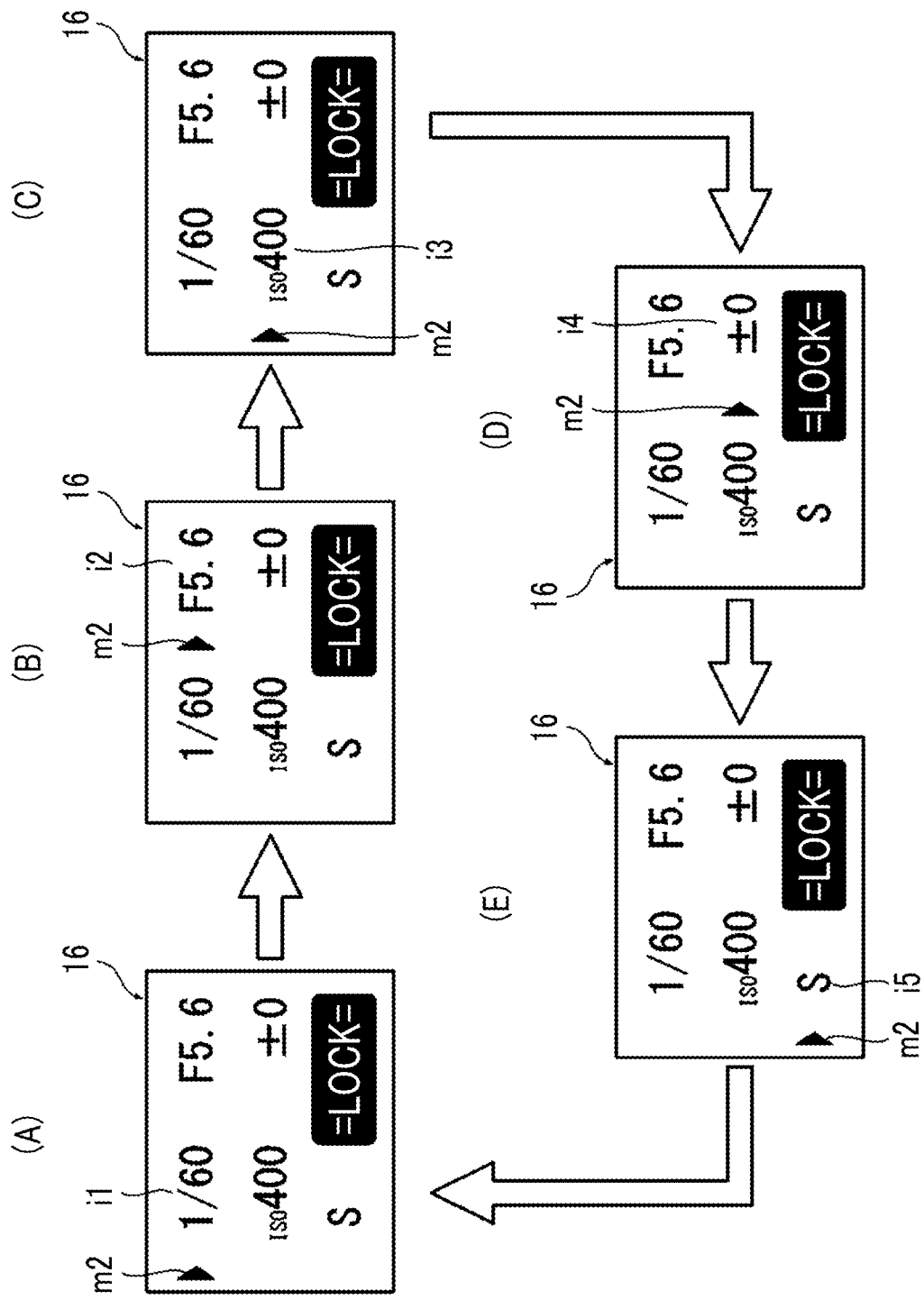

(A), (B), (C), (D), and (E) of FIG. 22 are plan views showing switching of the display on the sub-display.

Figure 23:
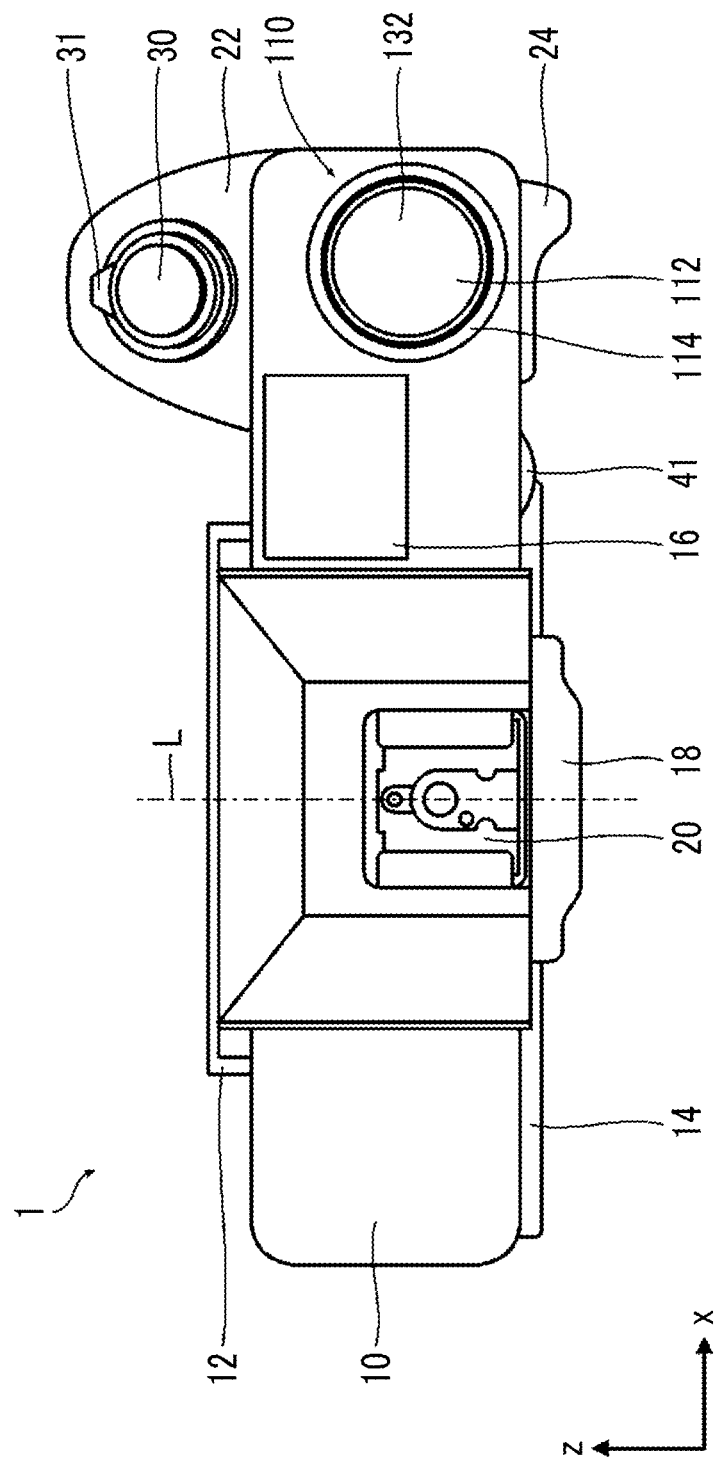

FIG. 23 is a plan view showing an example of the digital camera comprising a display on a top surface of the operation dial.

Figure 24:
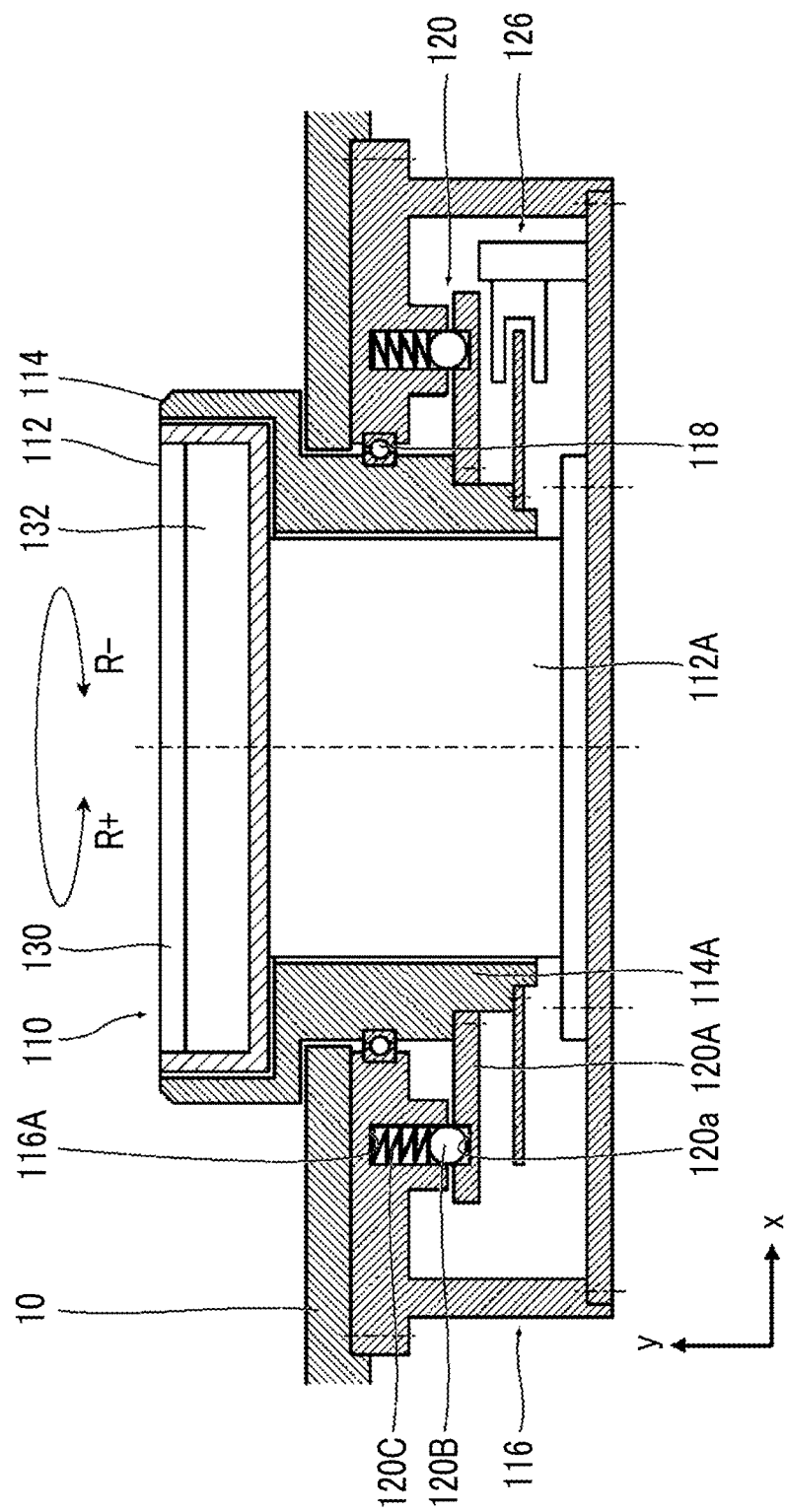

FIG. 24 is a longitudinal cross section view showing the schematic configuration of the operation dial comprising a dial-display on the top surface of the operation dial.

Figure 25:
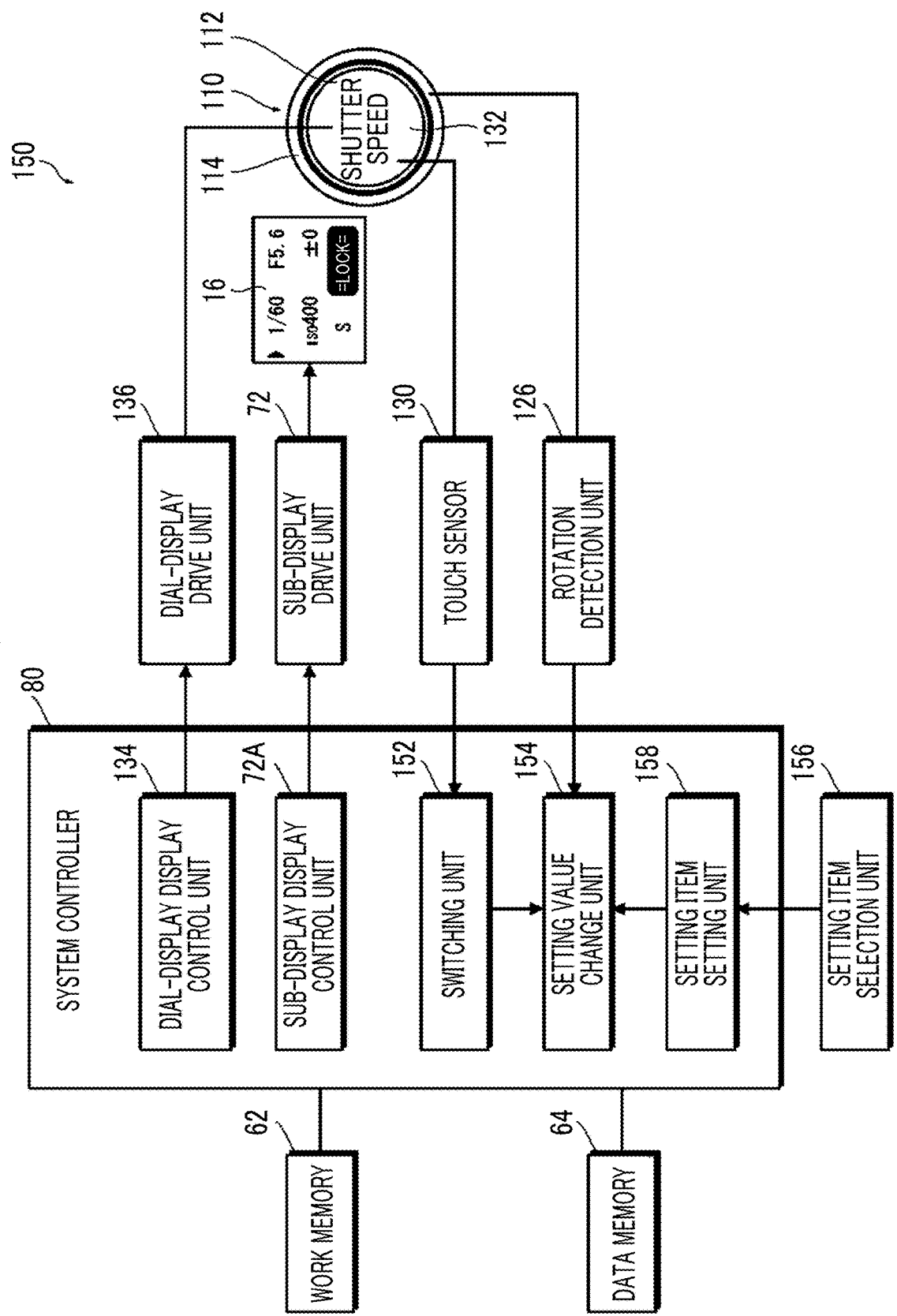

FIG. 25 is a block diagram showing the schematic configuration of the setting system provided in the digital camera.

Figure 26:
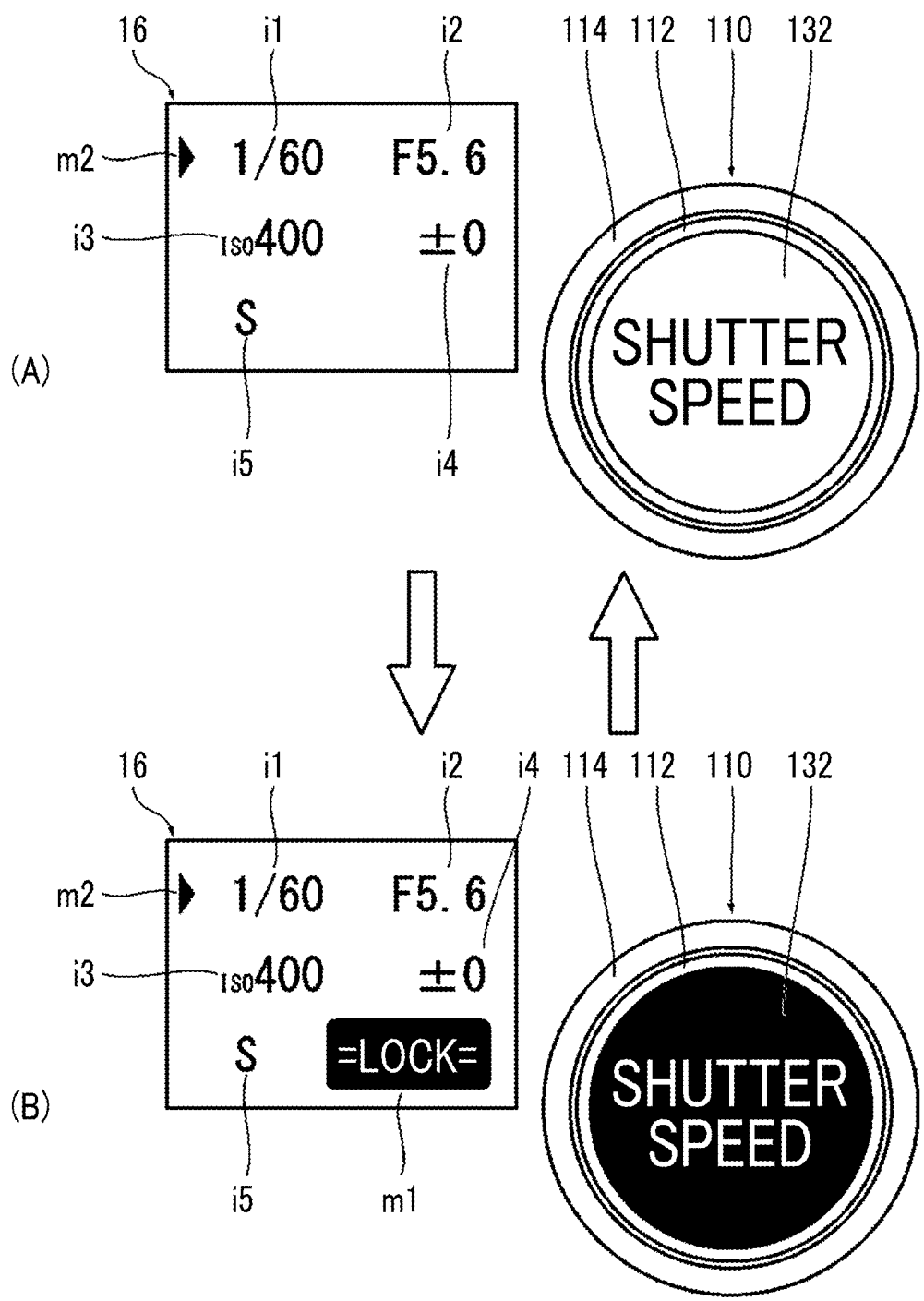

(A) and (B) of FIG. 26 are diagrams showing examples of the display on the sub-display and the dial-display in a case where the item to be set by the operation dial is a shutter speed.

Figure 27:
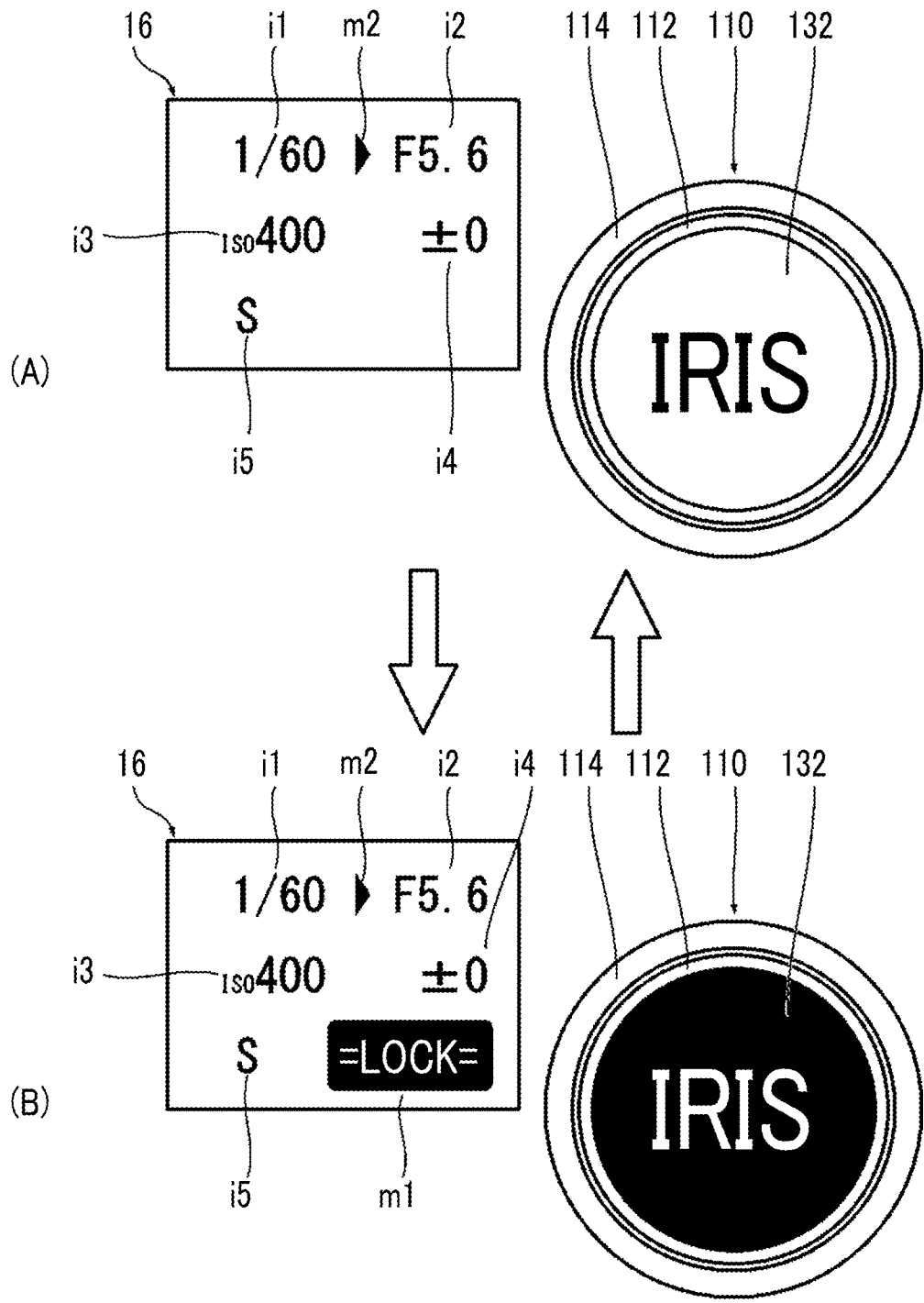

(A) and (B) of FIG. 27 are diagrams showing examples of the display on the sub-display and the dial-display in a case where the item to be set by the operation dial is an F-number.

Figure 28:
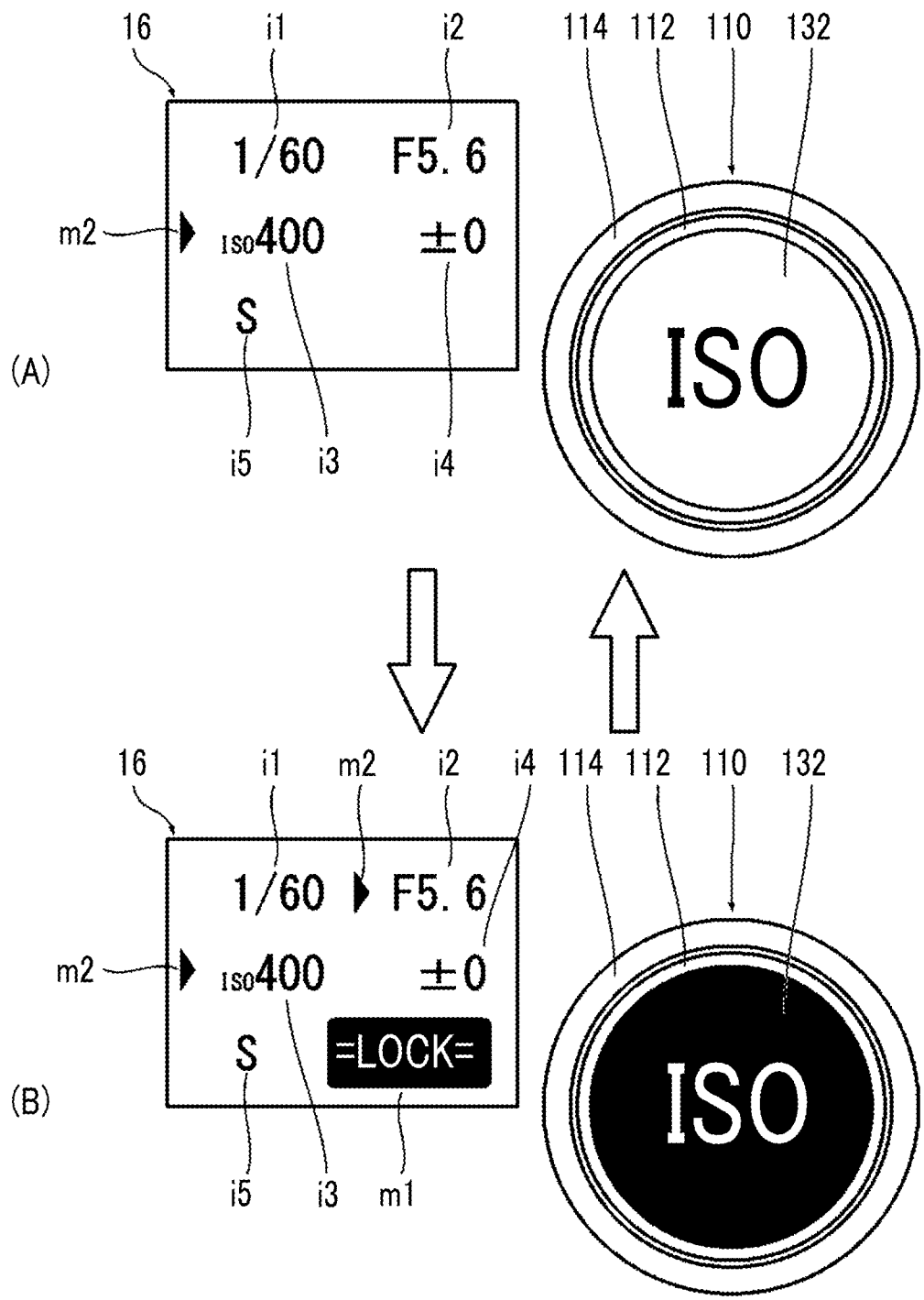

(A) and (B) of FIG. 28 are diagrams showing examples of the display on the sub-display and the dial-display in a case where the item to be set by the operation dial is ISO sensitivity.

Figure 29:
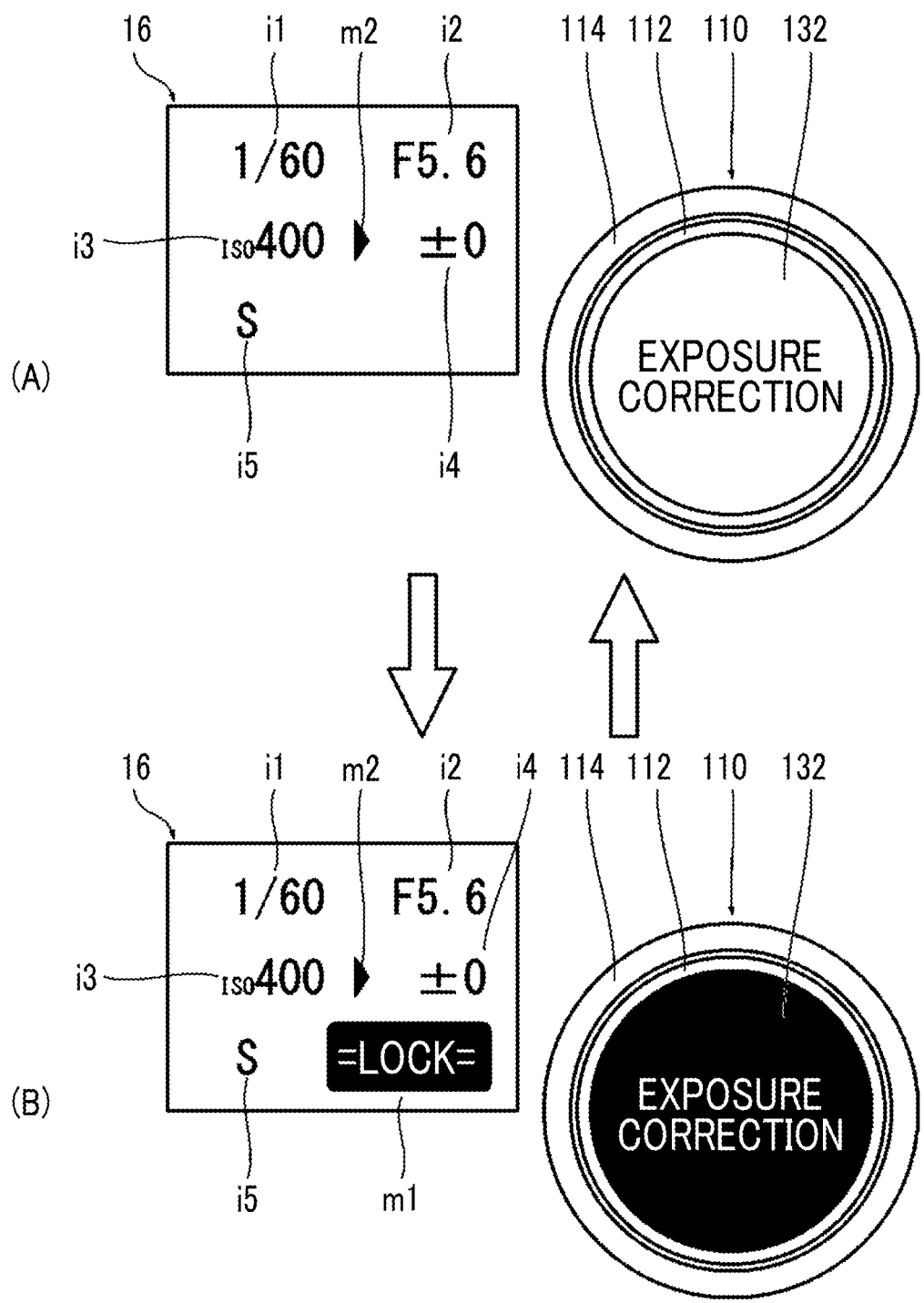

(A) and (B) of FIG. 29 are diagrams showing examples of the display on the sub-display and the dial-display in a case where the item to be set by the operation dial is an exposure correction value.

Figure 30:
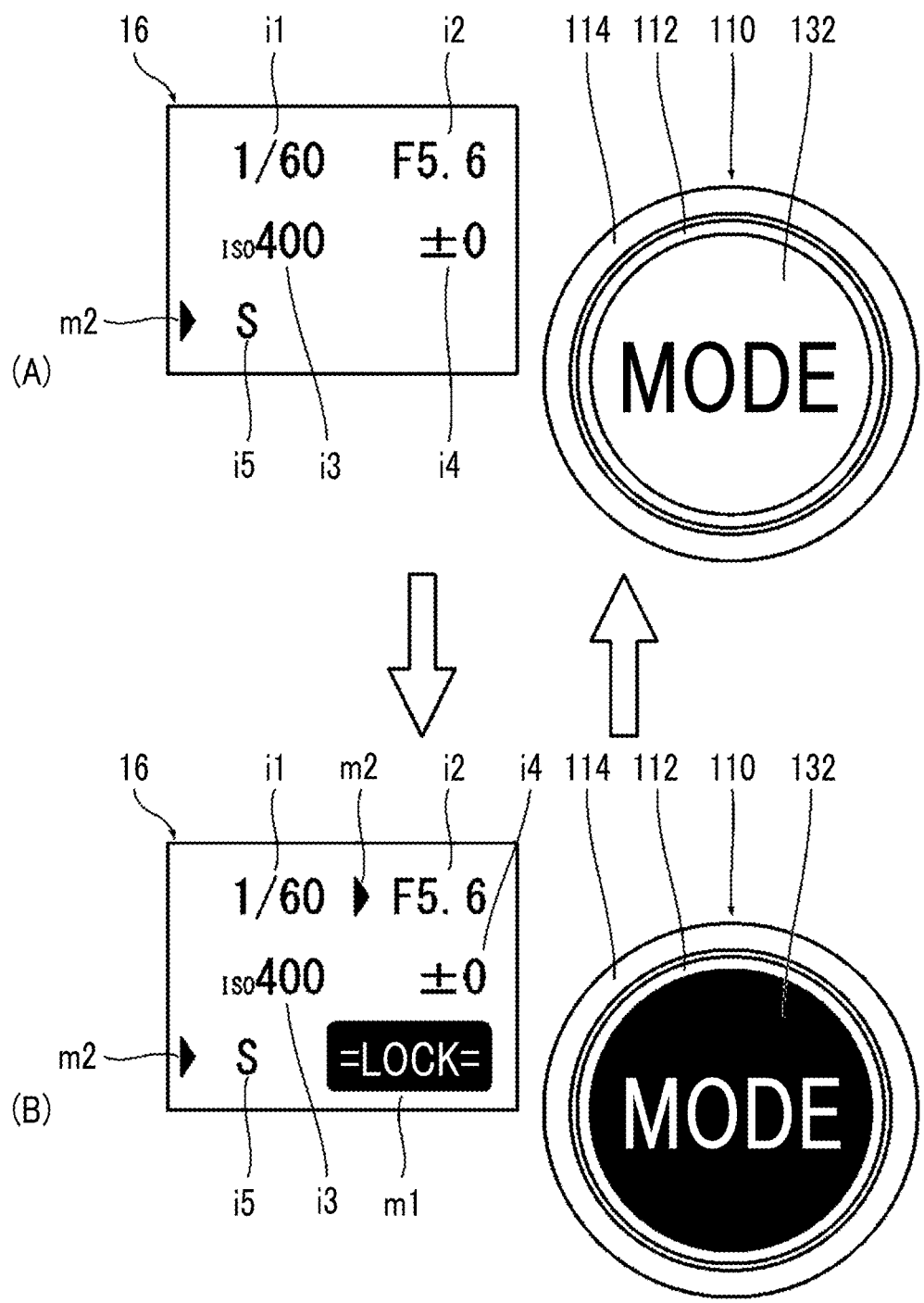

(A) and (B) of FIG. 30 are diagrams showing examples of the display on the sub-display and the dial-display in a case where the item to be set by the operation dial is the imaging mode.

Figure 31:
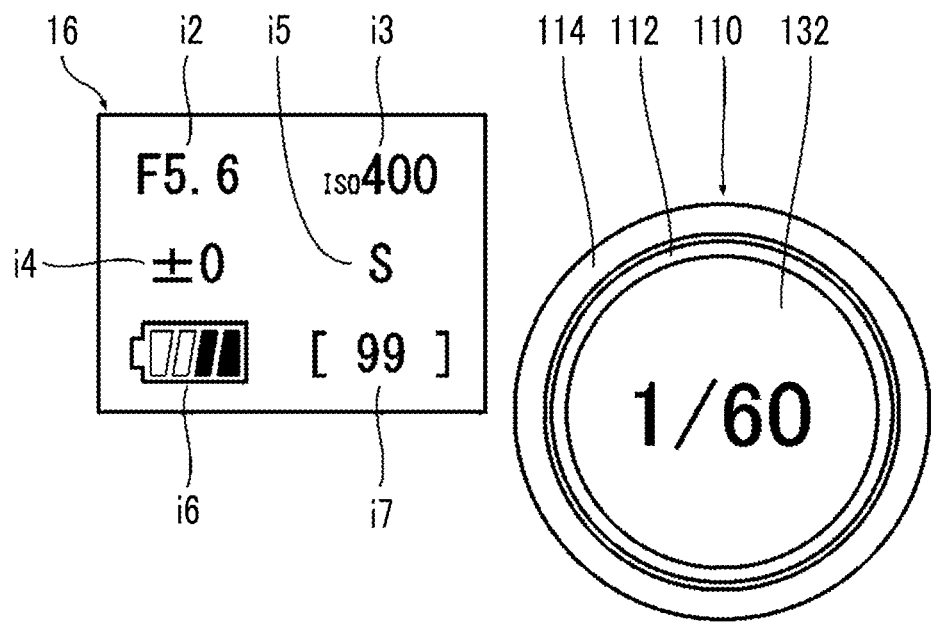

FIG. 31 is a diagram showing an example of displays on the sub-display and the dial-display.

Figure 32:
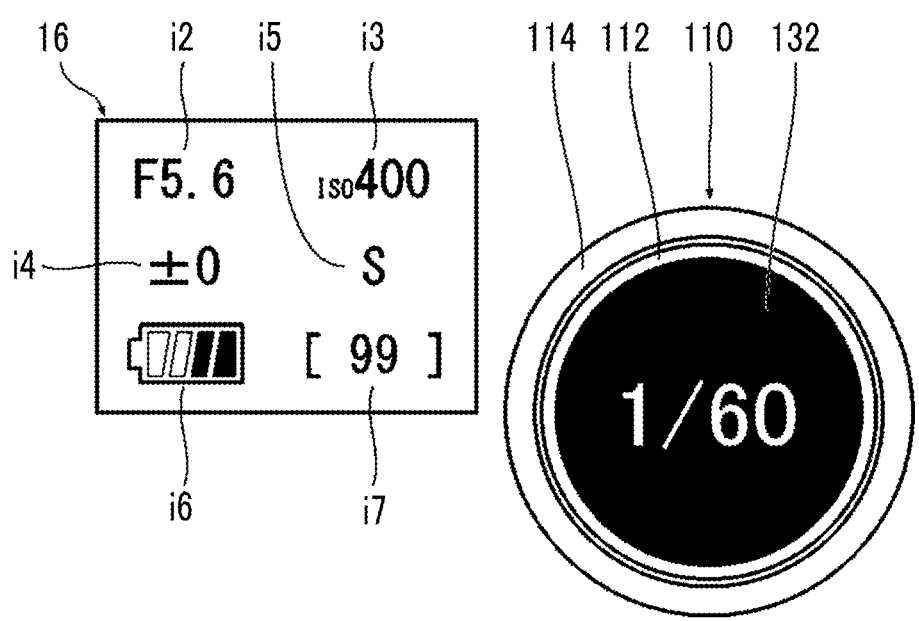

FIG. 32 is a diagram showing an example of displays on the sub-display and the dial-display in a case where the change in the setting value by the operation dial is invalid.

Figure 33:
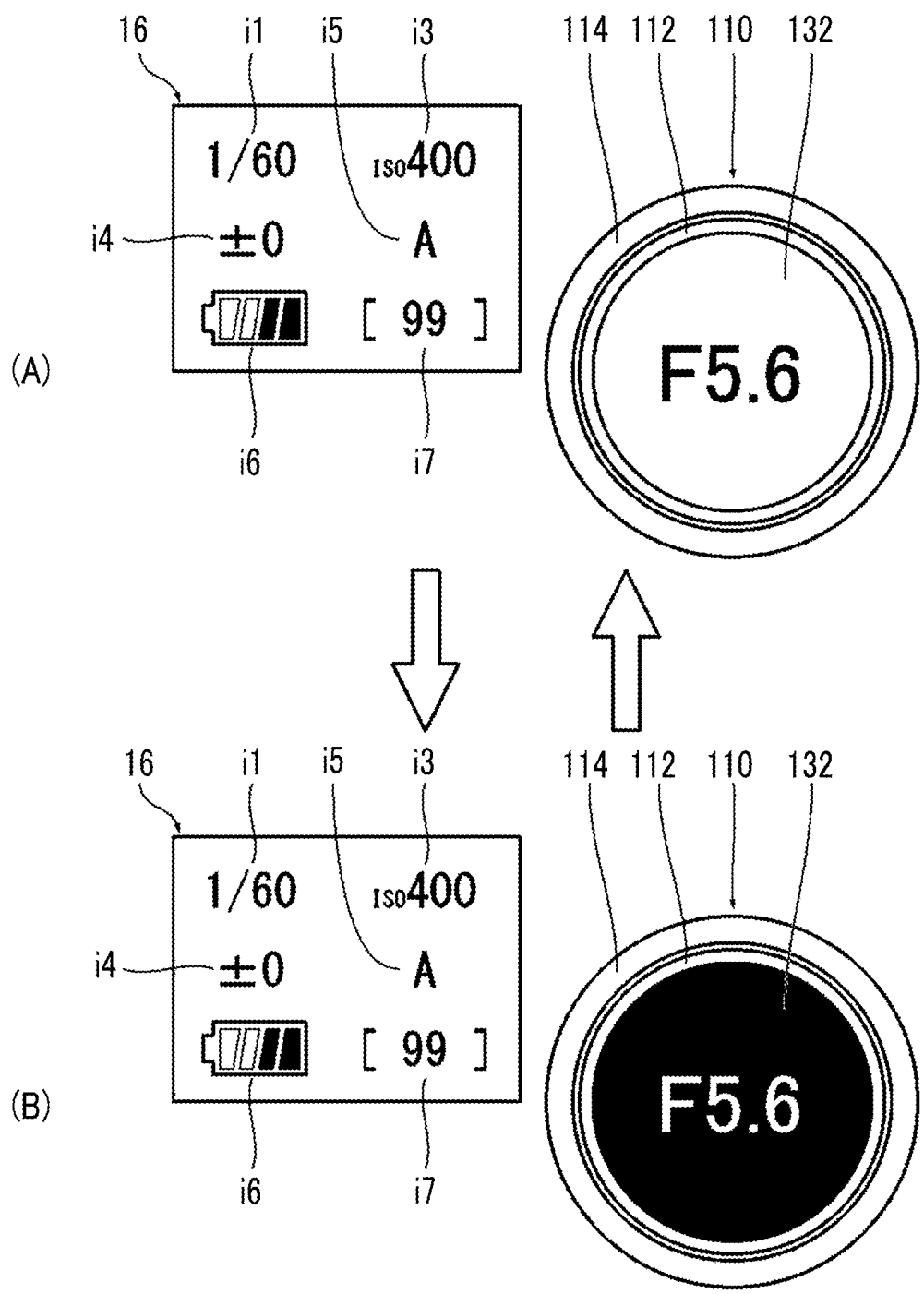

(A) and (B) of FIG. 33 are diagrams showing examples of the displays on the sub-display and the dial-display in a case where the item to be set by the operation dial is the F-number.

Figure 34:
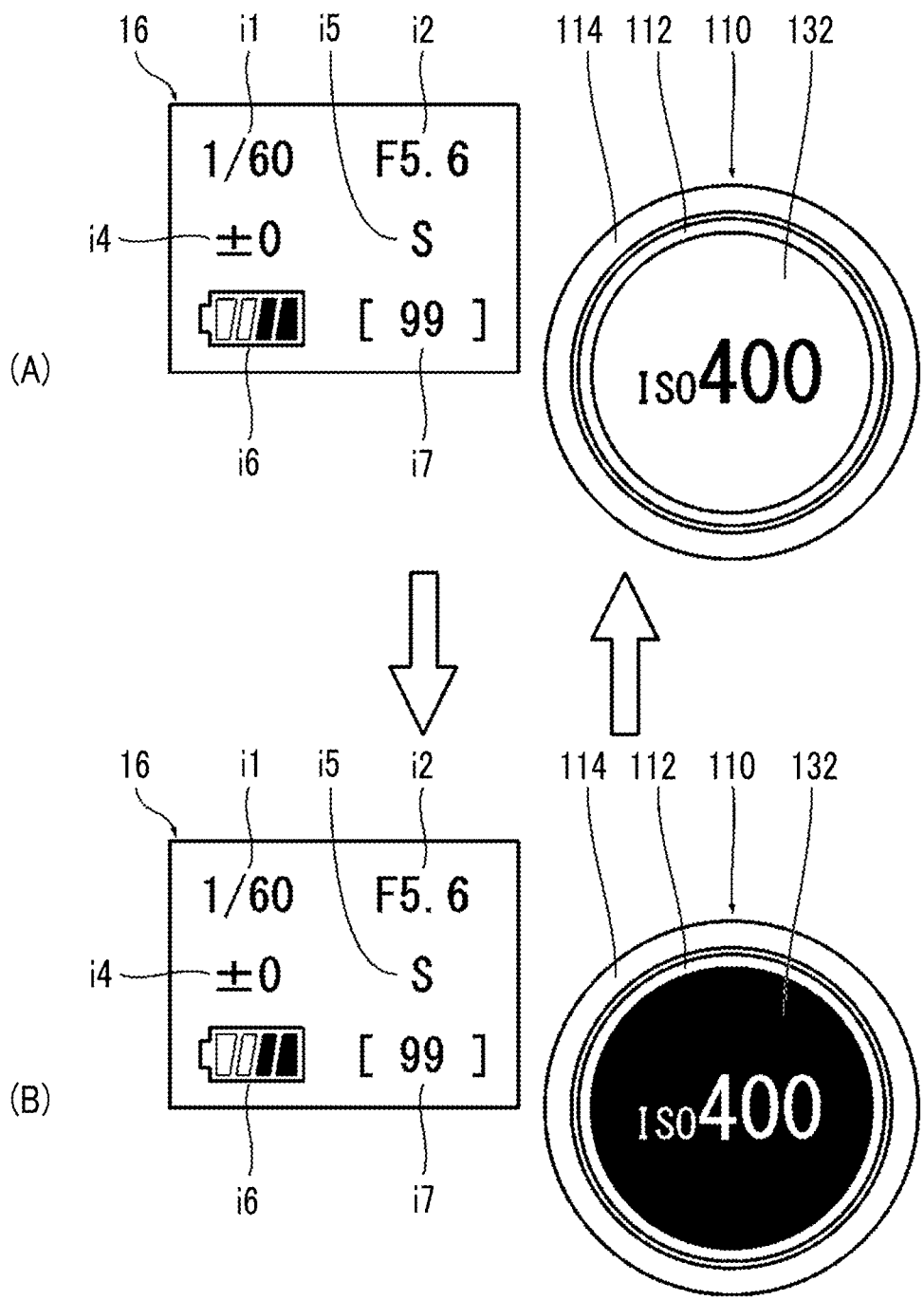

(A) and (B) of FIG. 34 are diagrams showing examples of the displays on the sub-display and the dial-display in a case where the item to be set by the operation dial is the ISO sensitivity.

Figure 35:
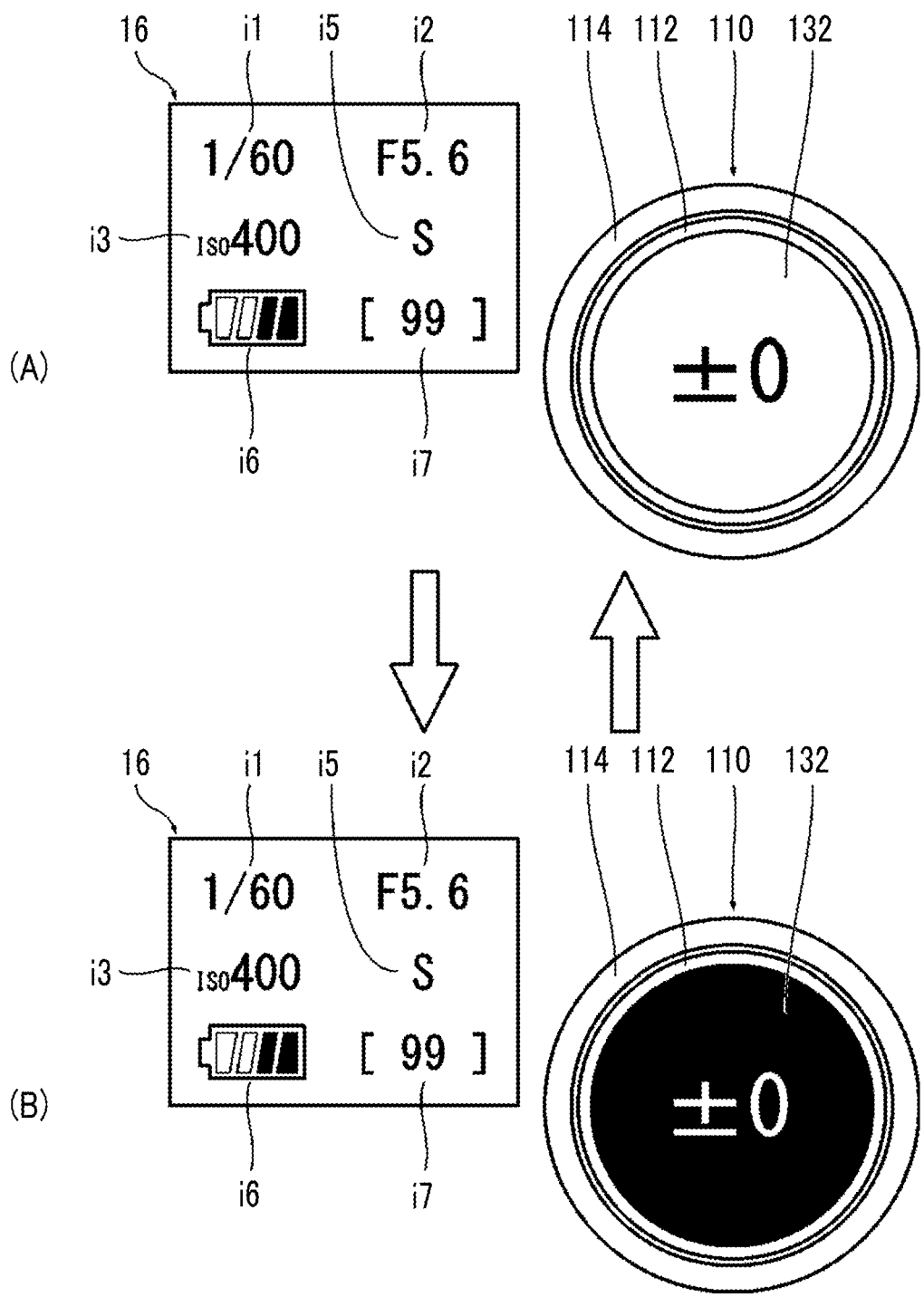

(A) and (B) of FIG. 35 are diagrams showing examples of the displays on the sub-display and the dial-display in a case where the item to be set by the operation dial is the exposure correction value.

Figure 36:
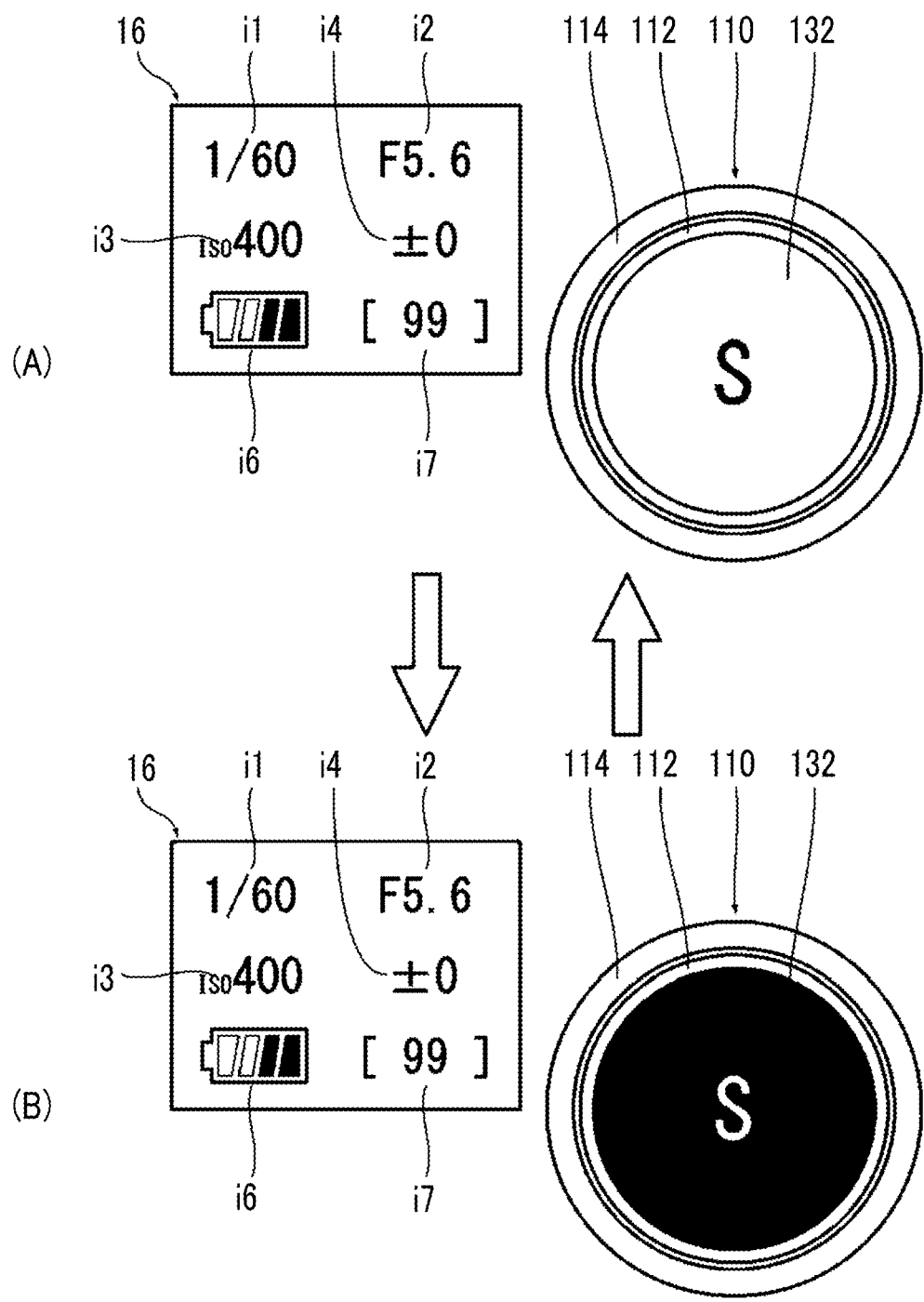

(A) and (B) of FIG. 36 are diagrams showing examples of the displays on the sub-display and the dial-display in a case where the item to be set by the operation dial is the imaging mode.

Figure 37:
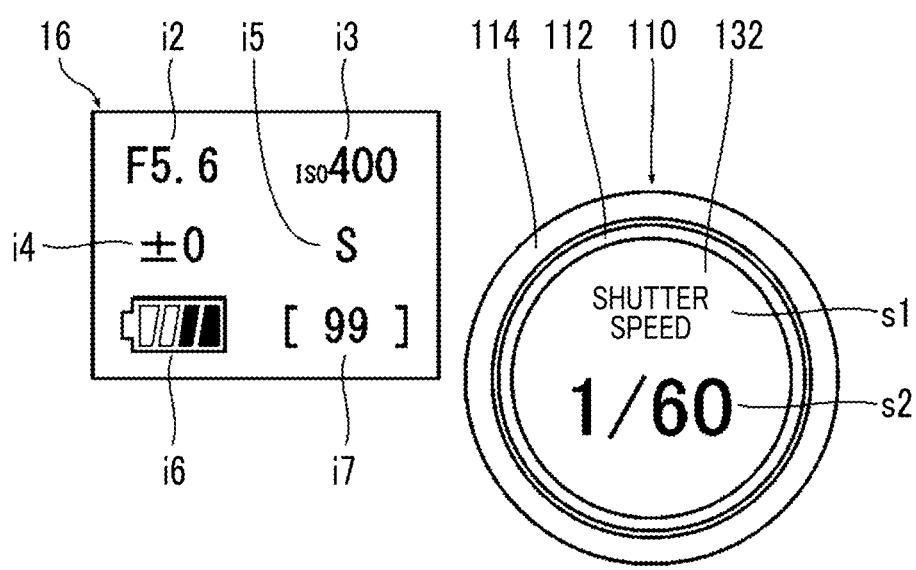

FIG. 37 is a diagram showing an example in a case where the dial-display displays information on an item to be set by the operation dial and a setting value of the item.

Figure 38:
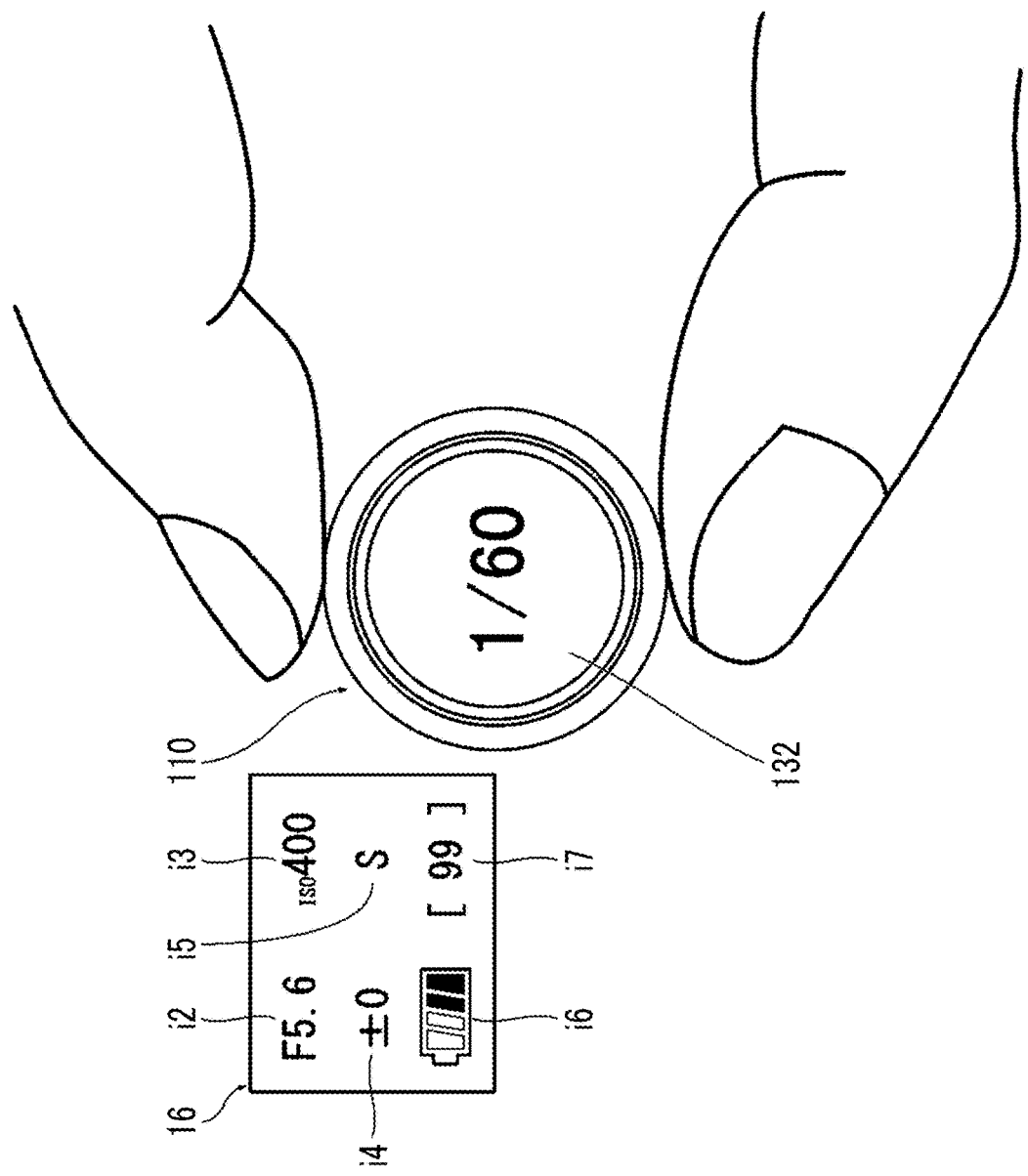

FIG. 38 is a diagram showing an example of displays on the sub-display and the dial-display in a case where the top surface of the operation dial is not touched by a finger.

Figure 39:
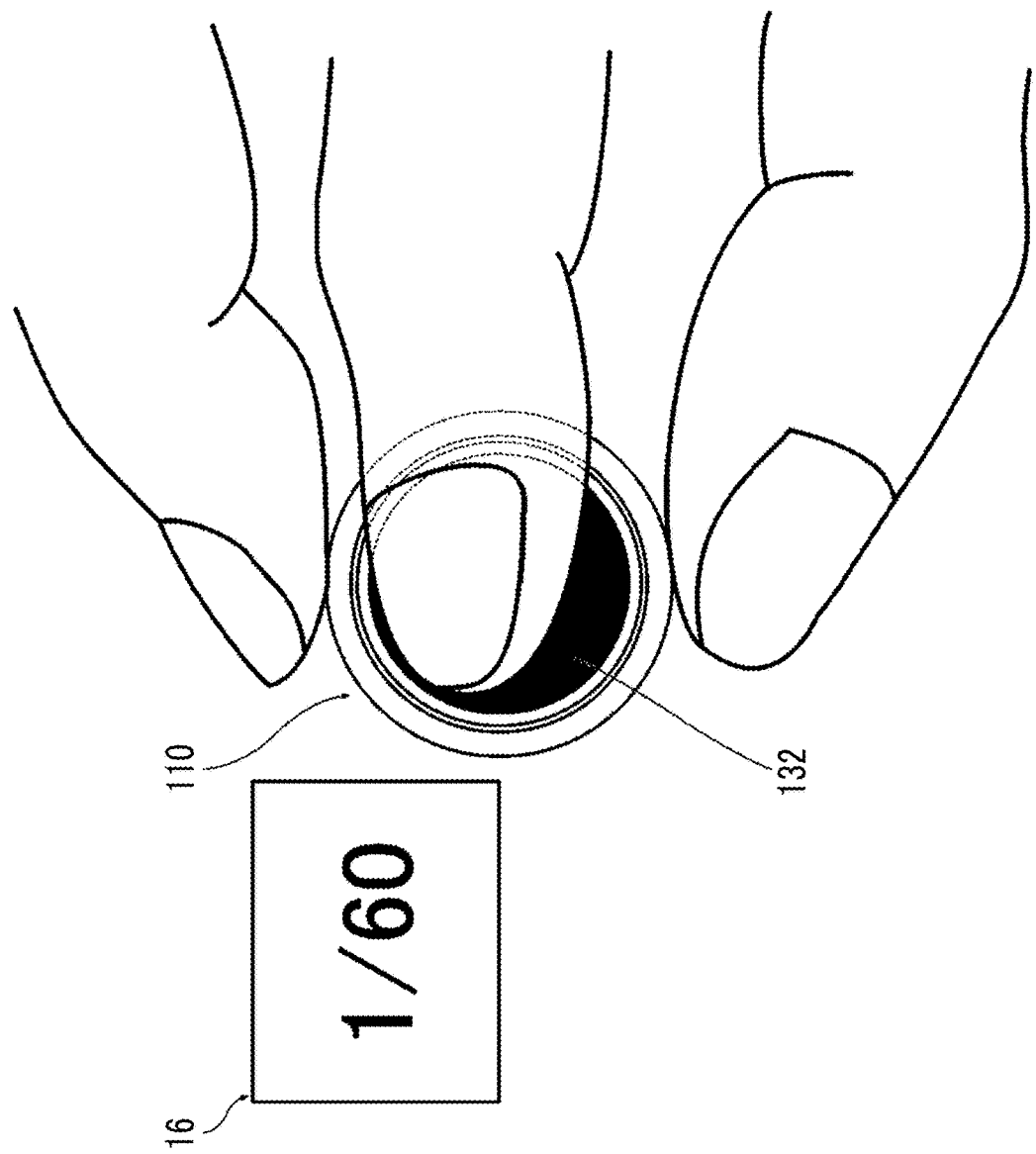

FIG. 39 is a diagram showing an example of displays on the sub-display and the dial-display in a case where the top surface of the operation dial is touched by the finger.

Figure 40:
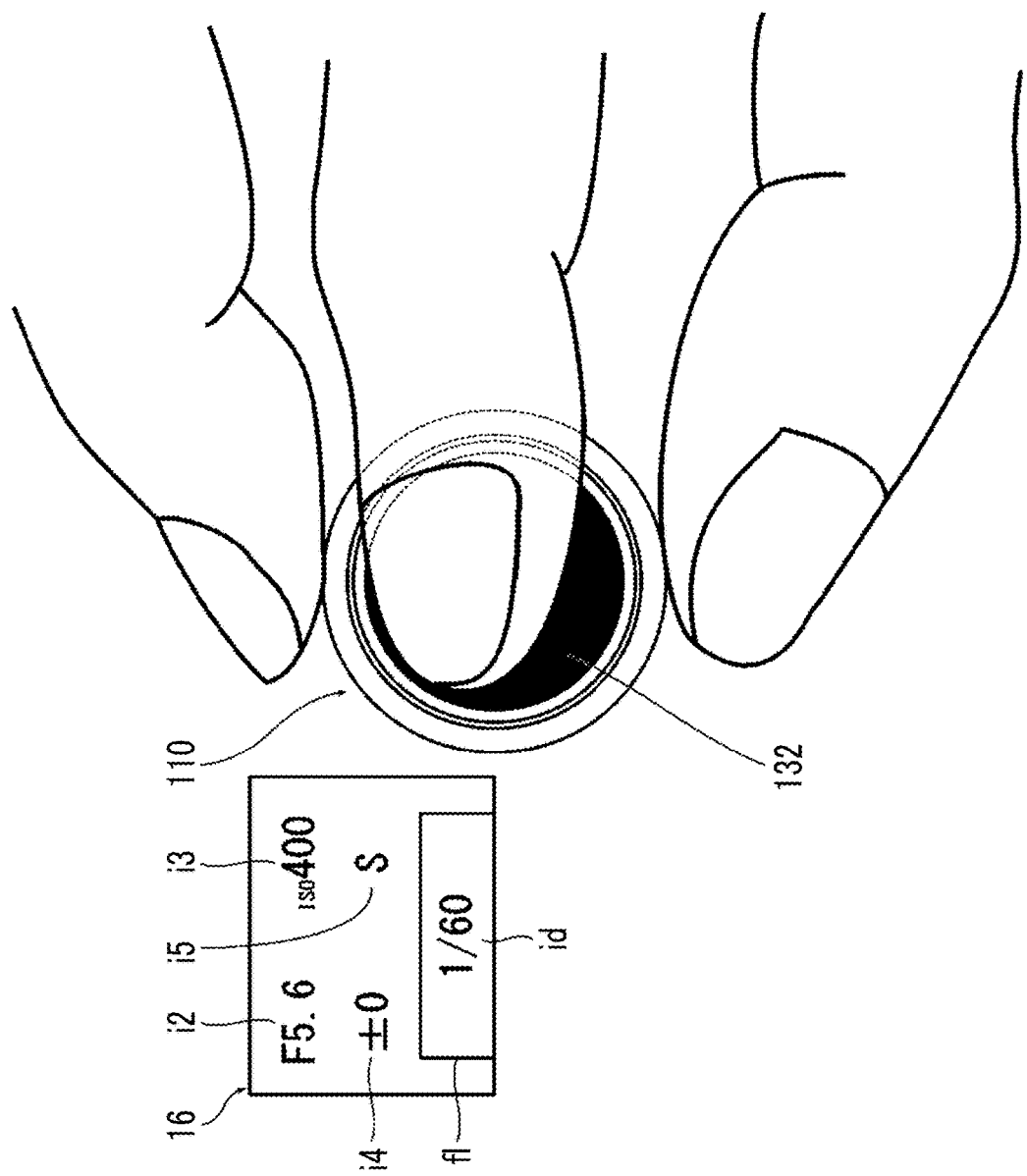

FIG. 40 is a diagram showing another example of displays on the sub-display and the dial-display in the case where the top surface of the operation dial is touched by the finger.

Figure 41:
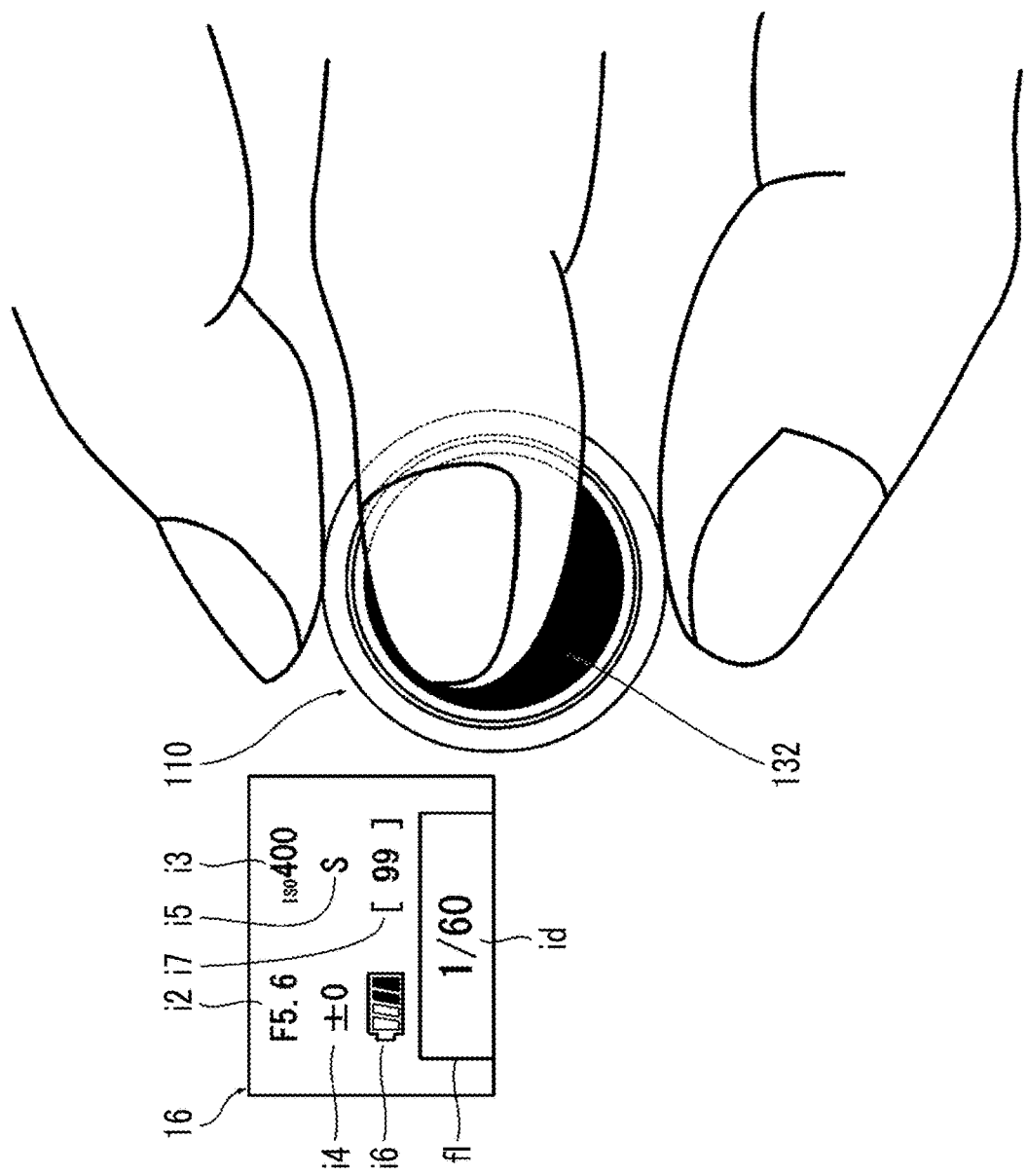

FIG. 41 is a diagram showing still another example of displays on the sub-display and the dial-display in the case where the top surface of the operation dial is touched by the finger.

Figure 42:
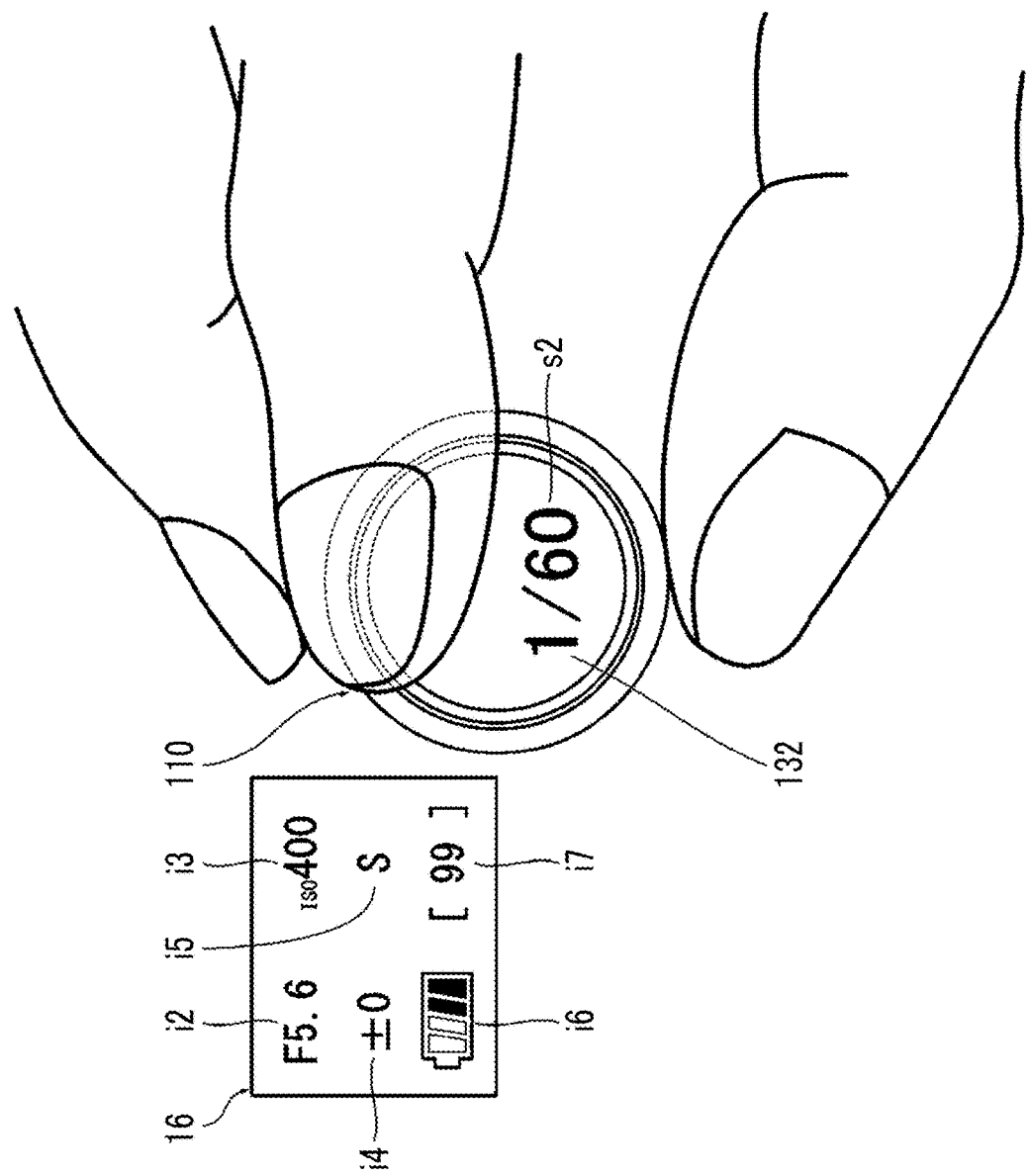

FIG. 42 is a diagram showing yet another example of displays on the sub-display and the dial-display in the case where the top surface of the operation dial is touched by the finger.

Figure 43:
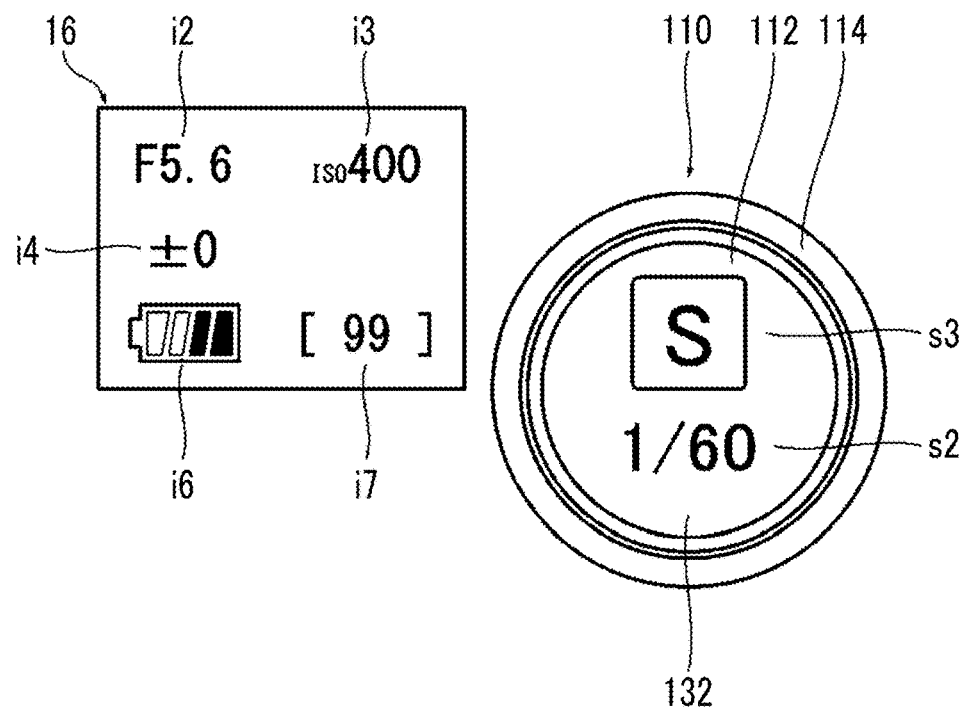

FIG. 43 is a diagram showing an example of displays on the sub-display and the dial-display.

Figure 44:
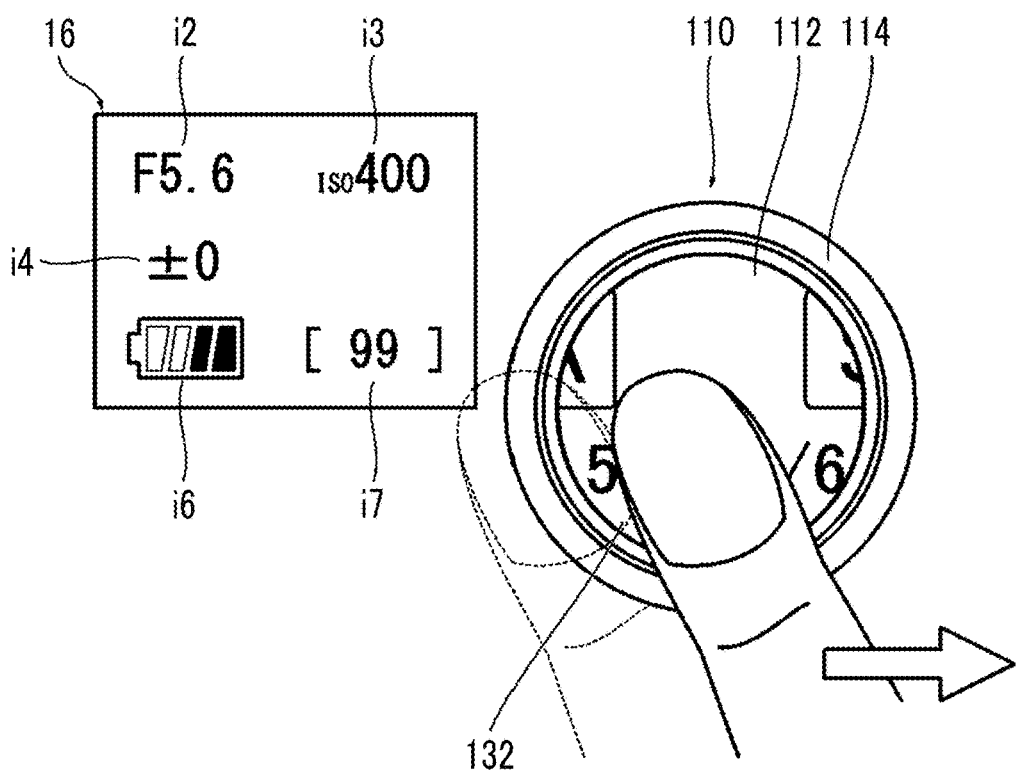

FIG. 44 is a diagram describing a method of switching the imaging mode by a swipe operation on the top surface of the operation dial.

Figure 45:
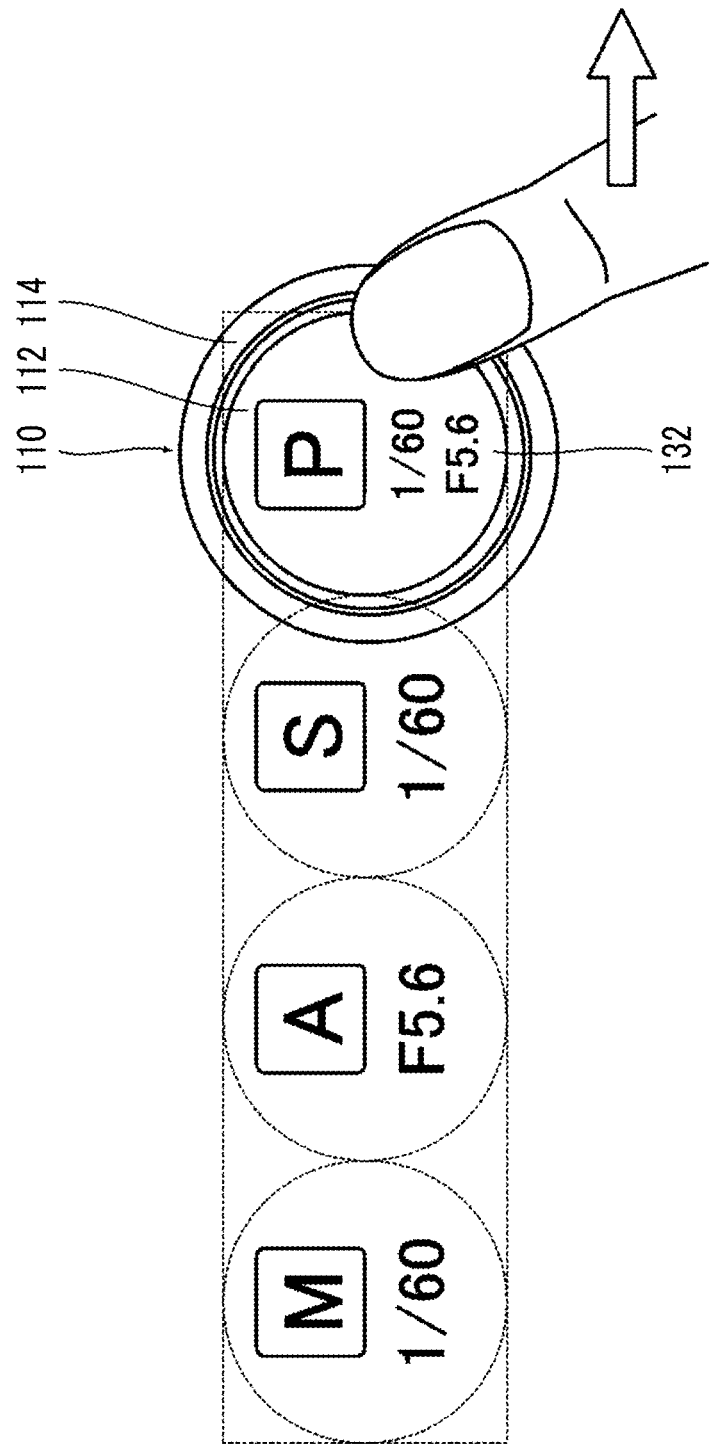

FIG. 45 is a conceptual diagram of the scroll of the display on the dial-display.

Figure 46:
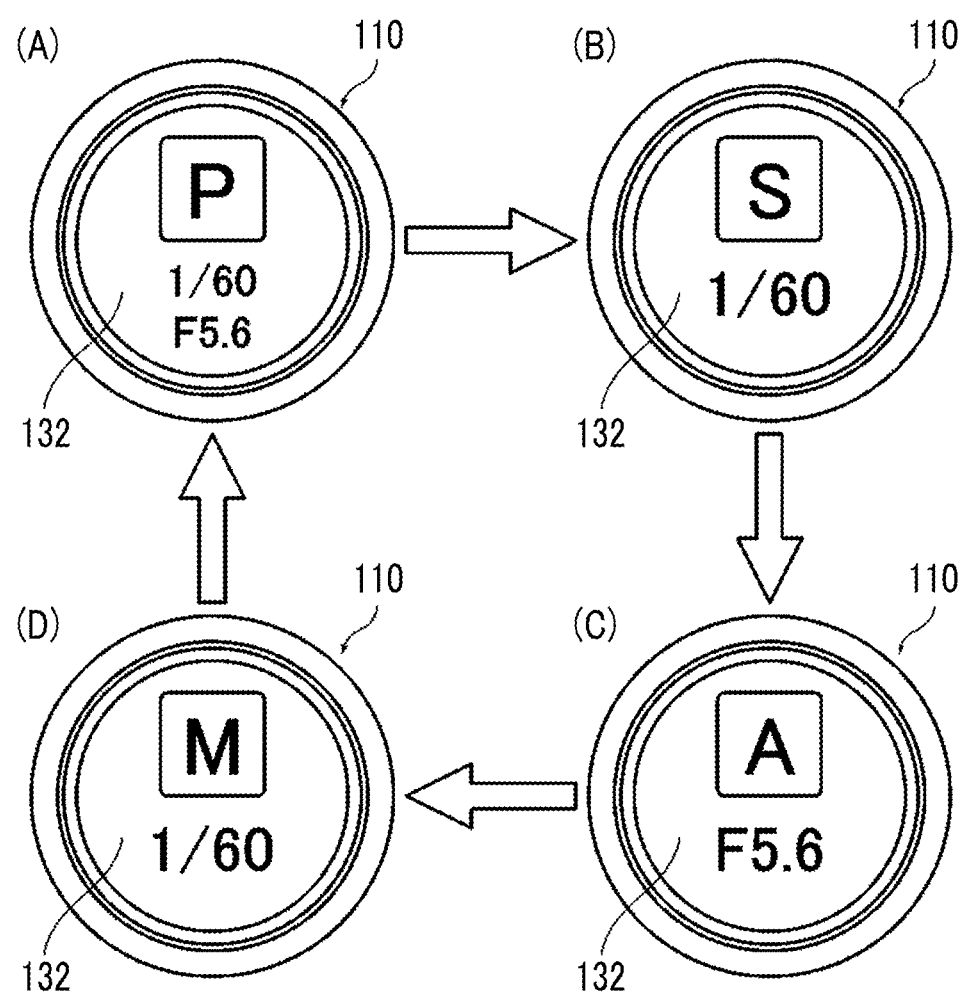

(A), (B), (C), and (D) of FIG. 46 are diagrams showing examples of the display on the dial-display in each imaging mode.

Figure 47:
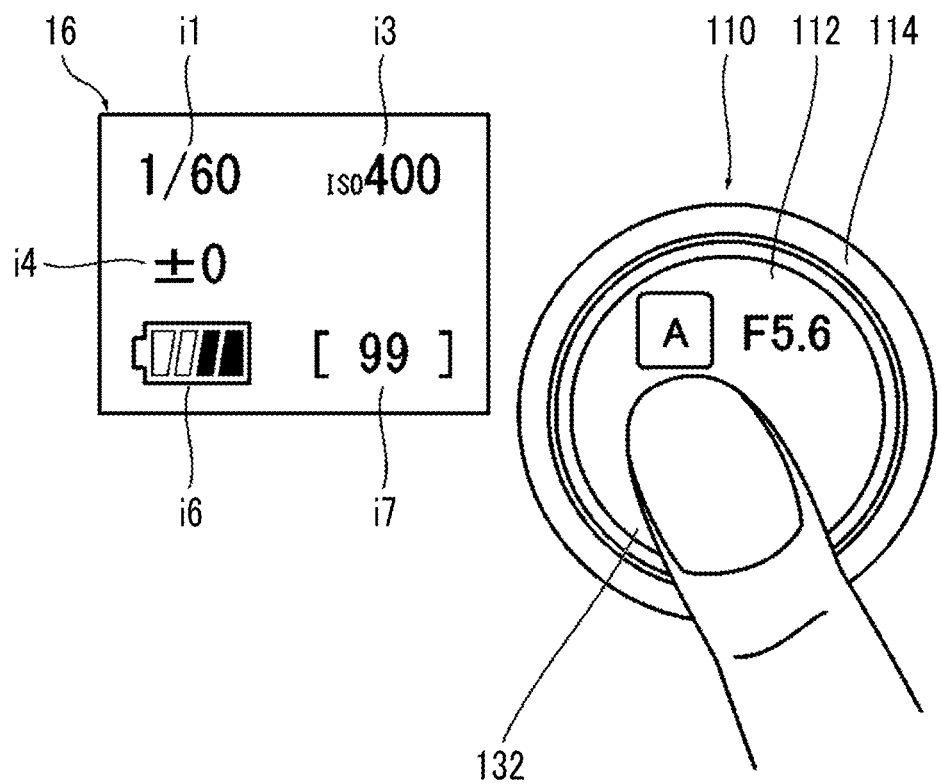

FIG. 47 is a diagram showing an example of a display on the sub-display and the dial-display in a case where the finger touches the same position continuously for a certain period of time or more.

Figure 48:
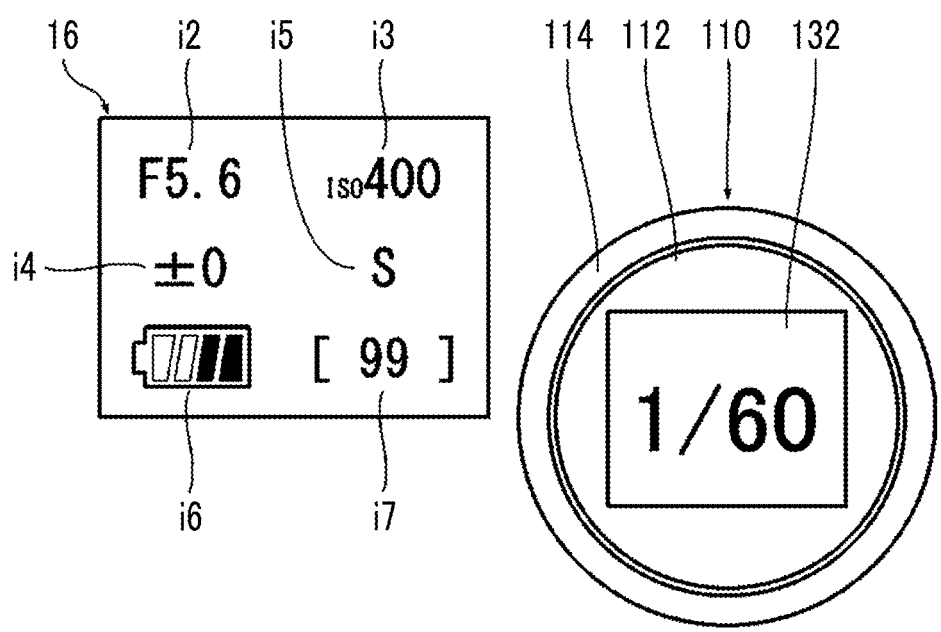

FIG. 48 is a plan view of the sub-display and the operation dial having a rectangular dial display section.

FIG. 49 is a plan view showing another example of a layout of the operation dial and the sub-display.

FIG. 50 is a plan view showing still another example of the layout of the operation dial and the sub-display.

DESCRIPTION OF THE PREFERRED EMBODIMENTS

A preferred embodiment of the invention will be described in detail below with reference to accompanying drawings.

First Embodiment

[Appearance]

Figure 1:
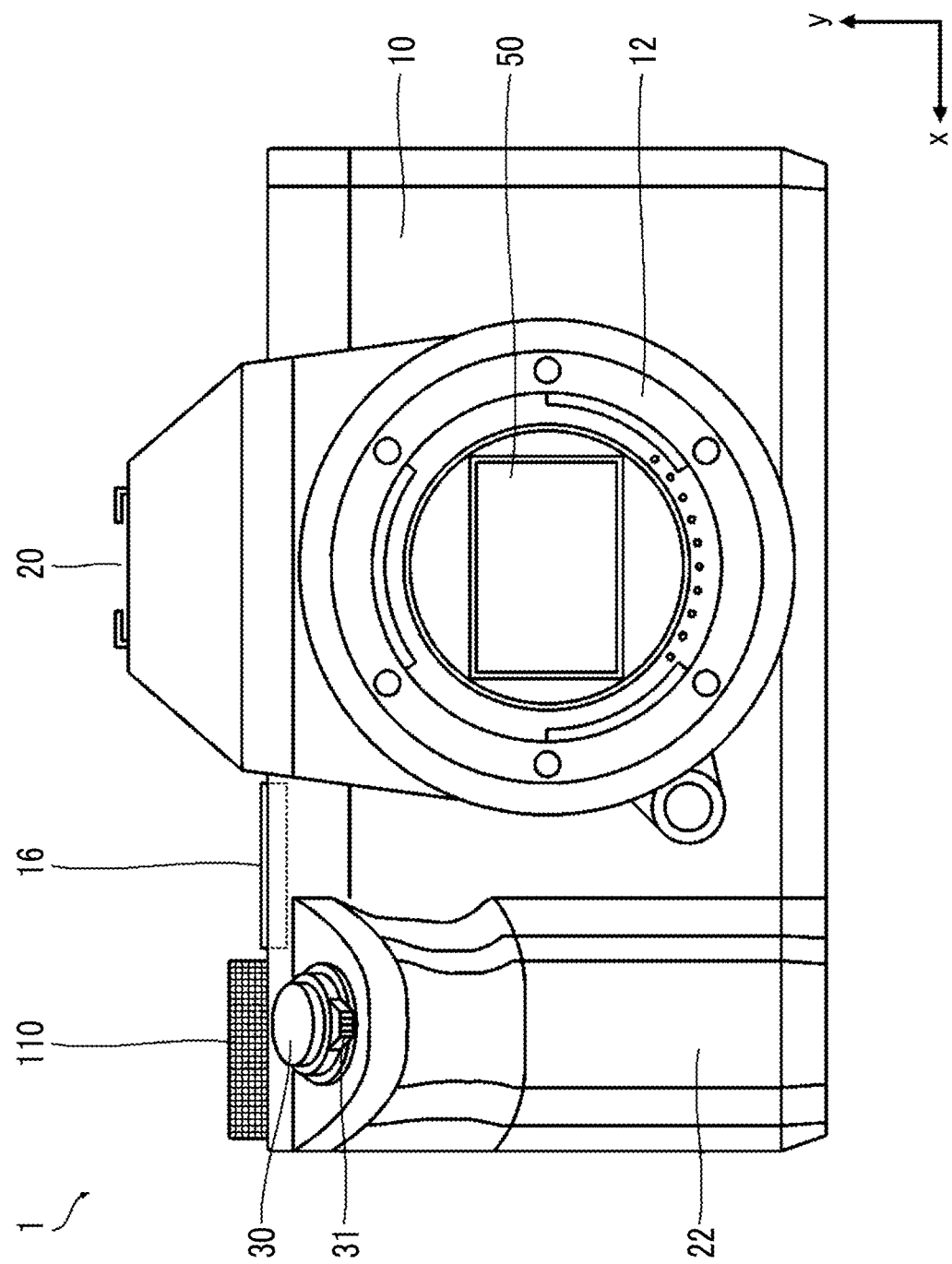
FIG. 1 is a front view showing an example of a digital camera.
Figure 2:
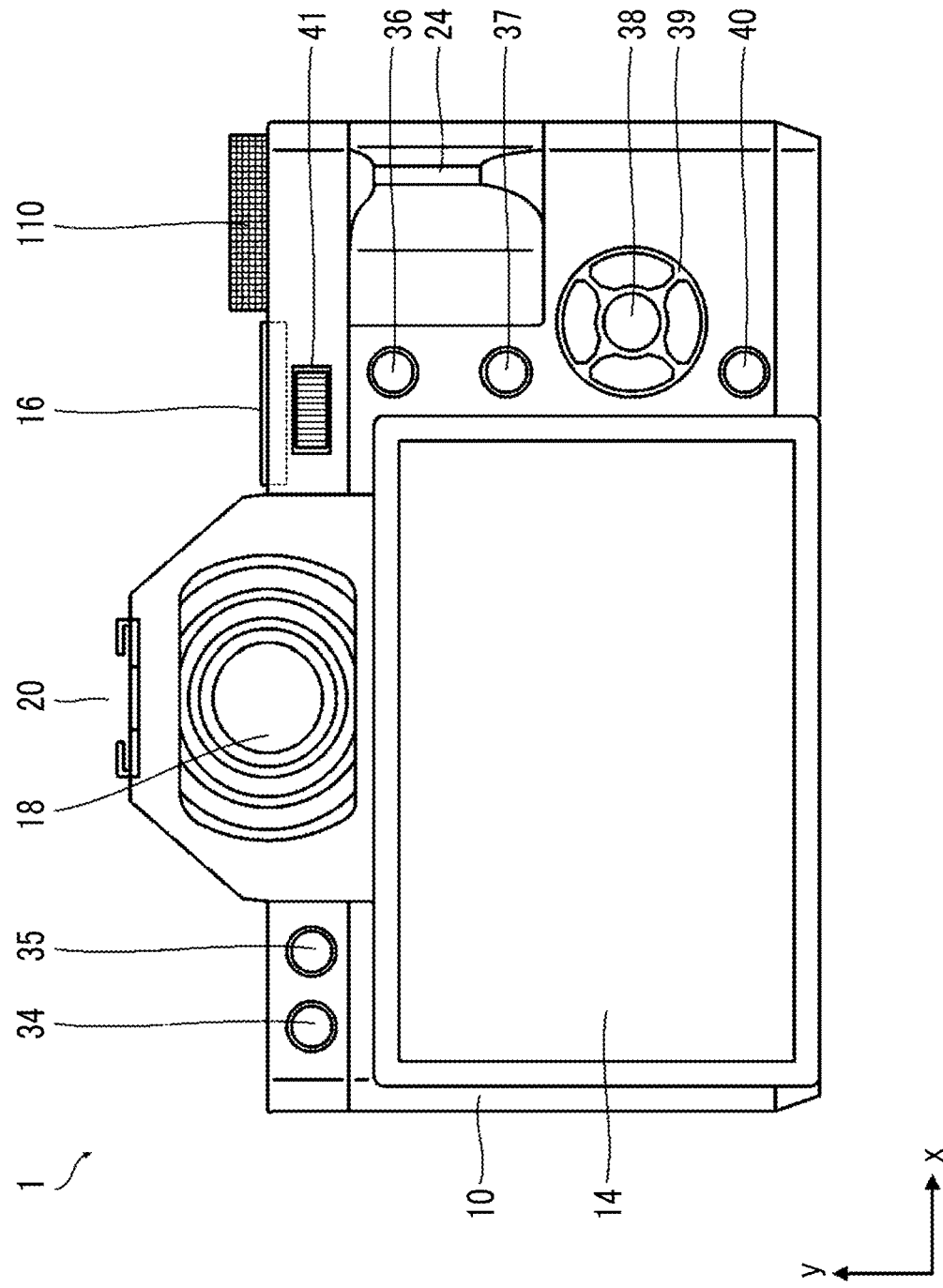
FIG. 2 is a back view showing an example of the digital camera.
Figure 3:
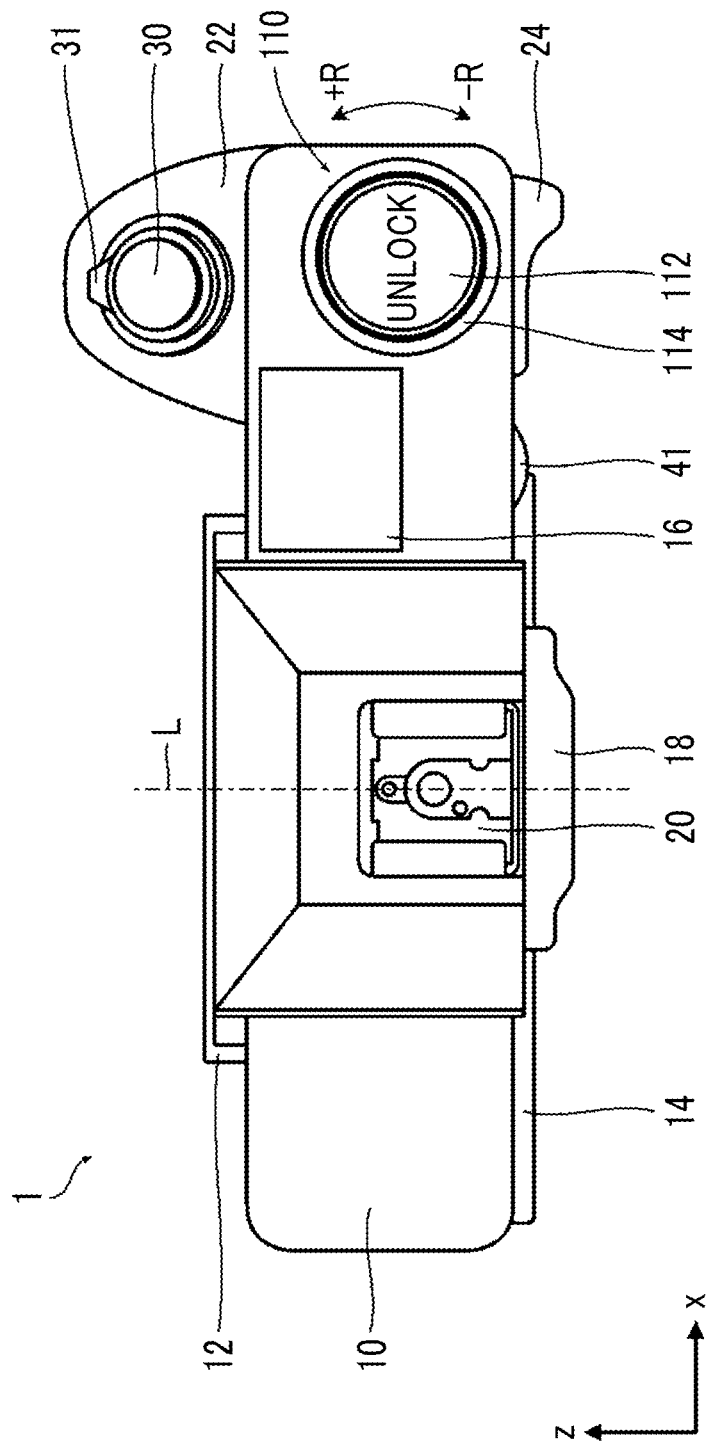
FIG. 3 is a plan view showing an example of the digital camera.

FIGS. 1, 2, and 3 are a front view, a back view, and a plan view, respectively, showing an example of a digital camera to which the invention is applied.

In this specification, a direction along an optical axis L (a z direction in FIG. 3) is referred to as a front-rear direction and a subject side is referred to as a front direction. Further, on a plane orthogonal to the optical axis L, a direction along a long side of an image sensor 50 (an x direction in FIG. 1) is referred to as a lateral direction or a left-right direction and a direction along a short side of the image sensor 50 (a y direction in FIG. 1) is referred to as a vertical direction or an up-down direction.

A digital camera 1 of this embodiment is a lens-interchangeable digital camera, and is a non-reflex digital camera. The lens-interchangeable digital camera is a digital camera of which a lens can be interchanged. The non-reflex digital camera is a digital camera not including a reflex mirror for guiding incident light from a lens to an optical viewfinder, and is also referred to as a mirrorless digital camera.

Figure 4:
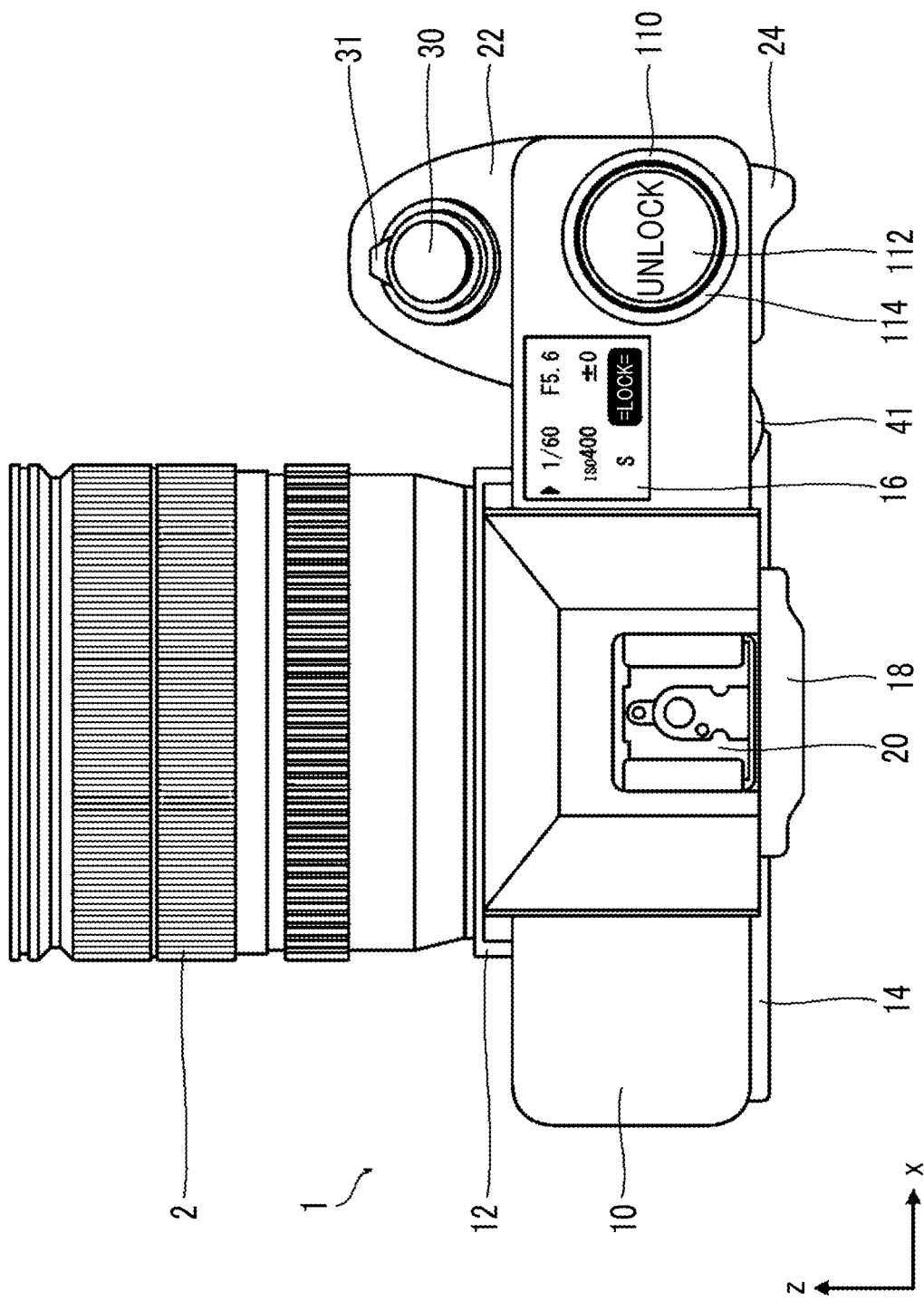
FIG. 4 is a plan view of the digital camera on which a lens is mounted.

FIG. 4 is a plan view of the digital camera on which a lens is mounted. As shown in FIG. 4, the digital camera 1 of this embodiment is used in a state in which a lens 2 is mounted on a camera body 10.

As shown in FIGS. 1 to 4, the camera body 10 is provided with a lens mount 12, a main-display 14, a sub-display 16, an electronic view finder 18, a hot shoe 20, and the like. Further, a shutter button 30, a power supply lever 31, a playback button 34, a delete button 35, an AF lock button 36, an AE lock button 37, a menu button 38, selector buttons 39, a BACK button 40, a rear command dial 41, an operation dial 110, and the like are provided as operation members.

«Camera Body»

The camera body 10 has the shape of a rectangular box that is thin in the front-rear direction. One (left side in FIG. 1) end portion of the camera body 10 is formed as a grip portion. A user grips the grip portion to perform a release operation. The grip portion is provided with a grip 22 on the front surface side and a thumb rest 24 on the back surface side.

«Lens Mount»

The lens mount 12 is a mounting portion for the lens 2. As shown in FIG. 1, the lens mount 12 is provided on the front surface of the camera body 10. The lens 2 is mounted on the lens mount 12 attachably and detachably. The lens mount 12 is formed of a bayonet type.

«Main-Display»

The main-display 14 is a display mainly used for the display of an image. As shown in FIG. 2, the main-display 14 is provided on the back surface of the camera body 10. The main-display 14 is formed of, for example, a color liquid crystal display (LCD).

As described above, the main-display 14 is mainly used for the display of the image. The image to be displayed includes a live view image in addition to an imaged image. The live view is a function of displaying an image captured by an image sensor in real time. It is possible to confirm the angle of view, a focus state, and the like on the main-display by performing the live view.

Further, the main-display 14 is also used as a graphical user interface (GUI). That is, in a case where various settings are performed, a setting screen is displayed on the main-display 14 and the various settings are performed on the setting screen.

«Sub-Display»

The sub-display 16 is an example of a display section. The sub-display 16 is formed of a display device having a small screen as compared with the main-display 14. As shown in FIG. 3, the sub-display 16 is provided on a top surface of the camera body 10. The sub-display 16 is formed of, for example, a reflective LCD comprising illumination. The sub-display 16 has a rectangular display surface, and the short side thereof is disposed in parallel to the optical axis L. More specifically, the short side thereof is disposed along the front-rear direction (z direction), and the long side thereof is disposed along the lateral direction (x direction).

The sub-display 16 displays mainly setting contents of the digital camera 1.

Information displayed on the sub-display 16 includes at least information on a setting value of an item to be set by the operation dial 110. This point will be described below in detail.

«Electronic View Finder»

The electronic view finder (EVF) 18 is an electronic finder in which the LCD is built. As shown in FIG. 2, the electronic view finder 18 is provided on the upper part of the camera body 10 (so-called warship part), and an eyepiece part is provided on the back surface.

«Hot Shoe»

The hot shoe 20 is a mounting portion of an external flash. As shown in FIG. 3, the hot shoe 20 is provided on the top surface of the camera body 10.

«Operation Member»

The camera body 10 is provided with the shutter button 30, the power supply lever 31, the playback button 34, the delete button 35, the AF lock button 36, the AE lock button 37, the menu button 38, the selector buttons 39, the BACK button 40, the rear command dial 41, the operation dial 110, and the like as the operation members.

<Shutter Button>

The shutter button 30 is provided on the top surface (upper surface) of the camera body 10 and disposed on a grip portion side. The shutter button 30 is formed of a so-called two-stage switch that has a half-pressed stage and a fully-pressed stage. In a case where the shutter button 30 is half pressed, imaging preparations, that is, AE and AF are executed. In a case where the shutter button 30 is fully pressed, main imaging, that is, imaging for recording is implemented. The AE is an abbreviation of automatic exposure and refers to a function that the camera automatically measures the brightness of a subject and decides proper exposure. Further, the AF is an abbreviation of automatic focus and refers to a function that the camera automatically measures a distance to the subject and focuses on the subject.

<Power Supply Lever>

The power supply lever 31 is disposed coaxially with the shutter button 30. The power supply lever 31 is formed of a rotary lever. In a case where the power supply lever 31 is rotated to an ON position, a power supply of the digital camera 1 is turned on. In a case where the power supply lever 31 is rotated to an OFF position, the power supply of the digital camera 1 is turned off <Playback Button>

The playback button 34 is a button that switches a mode of the digital camera 1 to a playback mode. The playback button 34 is provided on the back surface of the camera body 10 and disposed above the main-display 14. In a case where the playback button 34 is pressed in a state where the mode of the digital camera 1 is set to the imaging mode, the mode of the digital camera 1 is switched to the playback mode. In the case where the playback mode is set, the last captured image is displayed on the main-display 14.

A function of switching from the playback mode to the imaging mode is assigned to the shutter button 30. In a case where the shutter button 30 is pressed in a state where the playback mode is set, the mode of the digital camera 1 is switched to the imaging mode.

<Delete Button>

The delete button 35 is a button that performs an instruction to delete the imaged image displayed on the main-display 14. The delete button 35 is provided on the back surface of the camera body 10 and disposed above the main-display 14. In a case where the delete button 35 is pressed in a state where the imaged image is displayed on the main-display 14, a screen that confirms the deletion is displayed on the main-display 14. In a case where the execution of the deletion is instructed according to the display on the main-display 14, the imaged image during playback is deleted from a memory card.

<AF Lock Button>

The AF lock button 36 is a button that performs an instruction to lock the focus. As shown in FIG. 2, the AF lock button 36 is provided on the back surface of the camera body 10 and disposed near a thumb rest 24. In a case where the AF lock button 36 is pressed, the focus is locked.

<AE Lock Button>

The AE lock button 37 is a button that performs an instruction to lock the exposure. As shown in FIG. 2, the AE lock button 37 is provided on the back surface of the camera body 10 and disposed near the thumb rest 24. In a case where the AE lock button 37 is pressed, the exposure is locked.

<Menu Button>

The menu button 38 is a button that calls a menu screen on the main-display 14. The menu button 38 is provided on the back surface of the camera body 10. In a case where the menu button 38 is pressed in a state where the imaging mode or the playback mode is set, the menu screen is displayed on the main-display 14.

The menu button 38 functions also as an OK button and is used in a case of instructing OK for a selection item, a confirmation item, or the like.

<Selector Button>

The selector button 39 is formed of four buttons of up, down, left, and right disposed on the same circle with the menu button 38 as the center. A function according to a setting situation of the digital camera 1 is assigned to each button. For example, in the case where the digital camera 1 is set to the playback mode, in FIG. 2, a function of one-frame advance is assigned to the button in the right direction, and a function of one-frame return is assigned to the button in the left direction. A function of zoom-in is assigned to the button in the upper direction, and a function of zoom-out is assigned to the button in the lower direction. In the case where the digital camera 1 is set to the imaging mode, in FIG. 2, a function of calling the setting screen of white balance is assigned to the button in the right direction, and a function of calling the setting screen of the self-timer is assigned to the button in the left direction. A function of calling the setting screen of an AF mode is assigned to the button in the upper direction, and a function of calling the setting screen of a consecutive imaging mode is assigned to the button in the lower direction. Furthermore, in a case where the various setting screens are called on the main-display 14, the four buttons function as buttons that move a cursor in each direction on the screens.

<BACK Button>

The BACK button 40 is a button that performs an instruction to return the display on the main-display 14 to one previous state. The BACK button 40 is provided on the back surface of the camera body 10. In a case where the BACK button 40 is pressed in a state where various setting screens are displayed on the main-display 14, the display on the main-display 14 is returned to one previous state. Accordingly, it is possible to cancel the selection item, the confirmation item, or the like.

Further, the BACK button 40 functions as a button that performs an instruction to switch the display form of the main-display 14. In the state where the playback mode or the imaging mode is set, the BACK button 40 is pressed, the display form of the main-display 14 is switched. For example, in a case where the BACK button 40 is pressed in the state where the playback mode is set, an imaging condition, histogram, and the like of an image displayed on the main-display 14 are displayed on the image in an overlapped manner. For example, in a case where the BACK button 40 is pressed in the state where the imaging mode is set, various pieces of information such as the imaging condition or the histogram are displayed on the live view image in an overlapped manner.

<Rear Command Dial>

The rear command dial 41 is rotatably supported in the camera body, and a part of the outer periphery thereof is provided so as to be exposed on the back surface of the camera body 10. In particular, in the digital camera 1 of the embodiment, the rear command dial 41 is disposed at a position operable with the thumb of a hand gripping the camera body 10. Various functions are assigned to the rear command dial 41 according to a setting state of the digital camera 1.

<Operation Dial>

The operation dial 110 is an example of a rotary operation dial and is used for the various settings of the digital camera 1. The item to be set by the operation dial 110 is selected by the user. This point will be described below in detail.

The operation dial 110 is provided on the top surface of the camera body 10. In particular, in the digital camera 1 of the embodiment, the operation dial 110 is provided at an end portion on the grip portion side. Accordingly, it is possible to operate the operation dial 110 with a finger of the hand gripping the camera body 10.

The operation dial 110 has a disc shape as a whole. The operation dial 110 is mainly formed of an inner peripheral part 112 and an outer peripheral part 114. The inner peripheral part 112 has the disc shape and is fixedly provided. The outer peripheral part 114 has a ring shape and is provided rotatably around the outer periphery of the inner peripheral part 112. In the case of operating the operation dial 110, the operation dial 110 is operated by rotating the outer peripheral part 114.

Here, the operation by the operation dial 110 becomes valid only in a case where the outer peripheral part 114 is rotationally operated while an upper-end surface of the inner peripheral part 112 is touched. That is, the change in the setting value becomes possible only in the case where the outer peripheral part 114 is rotationally operated while the upper-end surface of the inner peripheral part 112 is touched. This point will be described below in detail.

Figure 5:
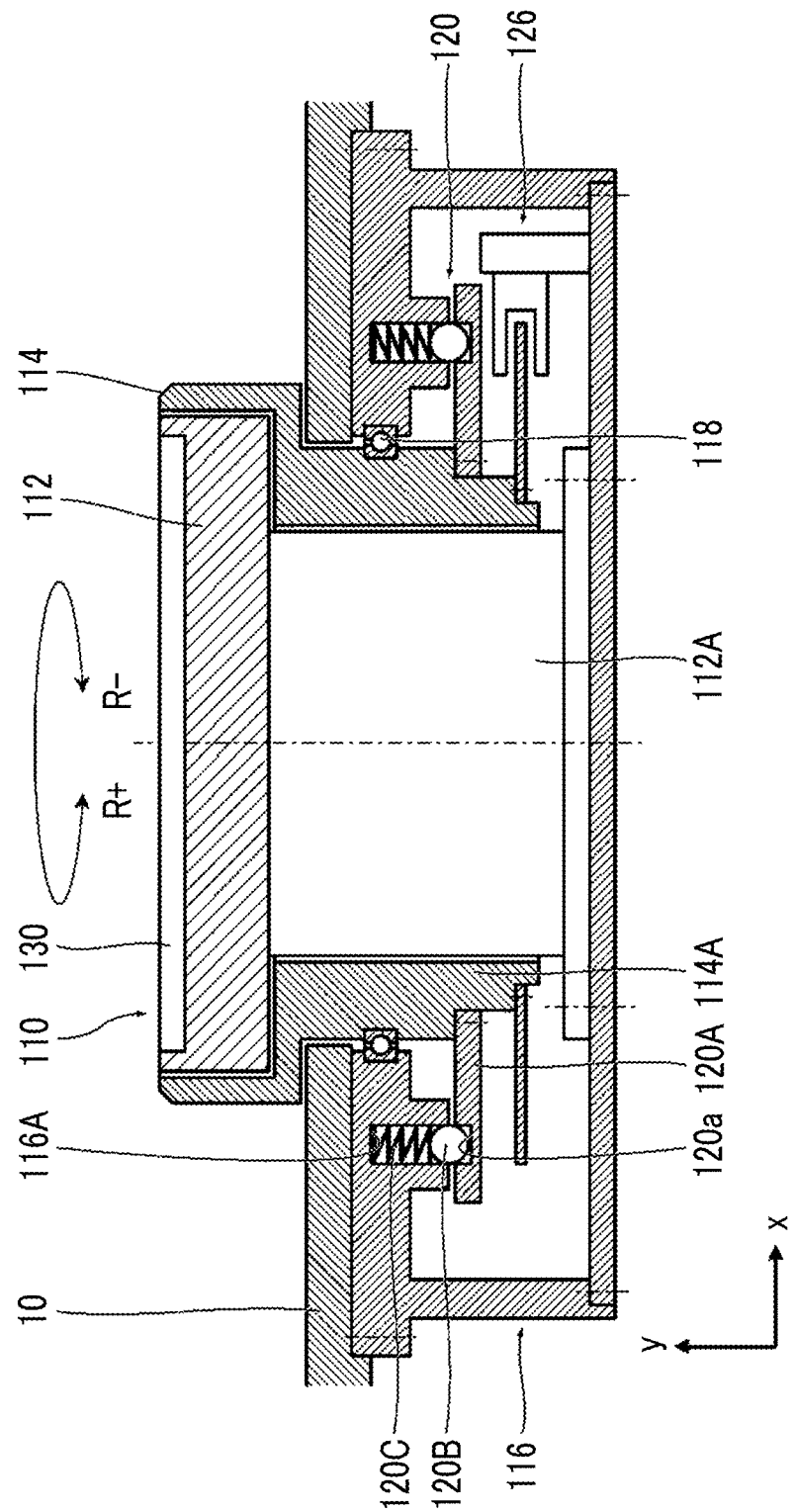
FIG. 5 is a longitudinal cross section view showing the schematic configuration of an operation dial.

FIG. 5 is a longitudinal cross section view showing the schematic configuration of the operation dial.

As shown in FIG. 5, the operation dial 110 is assembled to the camera body 10 through an operation dial support frame 116.

The inner peripheral part 112 has a columnar support part 112A on the coaxially lower portion, and the support part 112A is fixed to the operation dial support frame 116. The upper-end surface of the inner peripheral part 112 forms the top surface of the operation dial 110.

A touch sensor 130 is provided on the upper-end surface of the inner peripheral part 112. The touch sensor 130 is an example of a contact detection unit and detects contact of the finger with the top surface of the operation dial 110. In a case where the contact is detected, the touch sensor 130 outputs an ON signal. The touch sensor 130 has a circular contact detection region, and substantially the entire region on the upper-end surface of the inner peripheral part 112 is set as the contact detection region.

As described above, the operation by the operation dial 110 becomes valid only in the case where the outer peripheral part 114 is rotationally operated while the upper-end surface (top surface) of the inner peripheral part 112 which is the top surface is touched. That is, the lock is set in a state where the top surface is not touched, and the lock is released by touching the top surface. A character of "UNLOCK" indicating that the lock is released in a case of touching the top surface is displayed on the upper-end surface of the inner peripheral part 112 which is the top surface. The character is displayed on the upper-end surface of the inner peripheral part 112 in a printed or engraved manner.

The outer peripheral part 114 has a cylindrical shaft portion 114A on the coaxially lower portion, and the shaft portion 114A is rotatably supported by the operation dial support frame 116 through bearings 118.

The outer peripheral part 114 is supported so as to be rotatable in normal and reverse directions. In FIGS. 3 and 5, an arrow direction (counterclockwise rotation direction) indicated by a reference numeral R+ is referred to as a plus rotation direction, and an arrow direction (clockwise rotation direction) indicated by a reference numeral R− is referred to as a minus rotation direction.

A click mechanism 120 is provided in the operation dial support frame 116. The click mechanism 120 generates a click feeling in the rotation of the outer peripheral part 114 of the operation dial 110.

The click mechanism 120 comprises a click groove-metal plate 120A, click balls 120B, and click springs 120C.

The click groove-metal plate 120A has the disc shape that comprises a circular hole at the center thereof. The click groove-metal plate 120A is fixed to the shaft portion 114A of the outer peripheral part 114 by passing the shaft portion 114A of the outer peripheral part 114 through the center hole thereof. The click groove-metal plate 120A is disposed coaxially with the outer peripheral part 114 and rotates together with the outer peripheral part 114.

The click groove-metal plate 120A is provided with a plurality of click grooves 120a that are formed on the same circumference at regular intervals. The click grooves 120a are provided on the upper surface of the click groove-metal plate 120A as spherical depressions. The disposition interval of the click grooves 120a is an interval that generates the click feeling.

The click balls 120B are members that are fitted to the click grooves 120a and generate the click feelings. The click balls 120B are provided in the operation dial support frame 116. The operation dial support frame 116 comprises click ball-receiving holes 116A that receive the click balls 120B. The click ball-receiving holes 116A are provided parallel to the rotation axis of the outer peripheral part 114 as bottom holes. Further, the click ball-receiving holes 116A are provided at positions facing the click grooves 120a.

The click springs 120C are members that bias the click balls 120B to the click groove-metal plate 120A. The click springs 120C are received in the click ball-receiving holes 116A.

The action of the click mechanism 120 having the above-mentioned configuration is as follows.

In a case where the outer peripheral part 114 of the operation dial 110 is rotated, the click groove-metal plate 120A is rotated. In a case where the click groove-metal plate 120A is rotated, the click balls 120B are fitted to the click grooves 120a at regular angular intervals. Accordingly, the click feelings are generated at regular angular intervals.

Further, in a case where the rotation of the click groove-metal plate 120A is stopped at the time of generation of the click feeling, the click balls 120B are fitted to the click grooves 120a. Accordingly, the rotation of the click groove-metal plate 120A is stopped. That is, as long as the click groove-metal plate 120A is not rotated with a load equal to or larger than a certain level, a stop state of the click groove-metal plate 120A is maintained. The state where the click balls 120B are fitted to the click grooves 120a and the rotation of the click groove-metal plate 120A is stopped is referred to as click-stop.

In a case where a click-stop position is referred to as a click position, the number of click positions is the same as the number of click grooves 120a. The intervals of the click positions are also the same as the intervals of the click grooves 120a. For example, in a case where the number of click positions per rotation is 10, the disposition interval of the click grooves 120a becomes 36°. In this case, in a case where the outer peripheral part 114 is rotationally operated, the click feeling is generated at 36° interval. Further, it is possible to perform the click-stop at 36° interval.

The rotation of the outer peripheral part 114 of the operation dial 110 is detected by a rotation detection unit 126. The rotation detection unit 126 detects the rotation direction and a rotation amount of the outer peripheral part 114 of the operation dial 110. The rotation detection unit 126 is formed of a rotary encoder and detects the rotation of the outer peripheral part 114 of the operation dial 110 to detect the rotation direction and the rotation amount of the operation dial 110.

For example, in the case where the number of click positions per rotation is 10, it is possible to detect that the operation dial 110 is rotationally operated by one click in the plus direction R+ by detecting rotation by 36° in the plus direction R+.

As described above, the sub-display 16 displays the setting value of the item to be set by operating the operation dial 110. The sub-display 16 is provided near the operation dial 110 on the top surface of the camera body 10. In particular, in the digital camera 1 of the embodiment, the sub-display 16 is disposed adjacent to a position on the left oblique front side of the operation dial 110 in plan view as shown in FIG. 3. Accordingly, it is possible to prevent the display on the sub-display 16 from being hidden by the finger of the hand that operates the operation dial 110.

[Control System]

Figure 6:
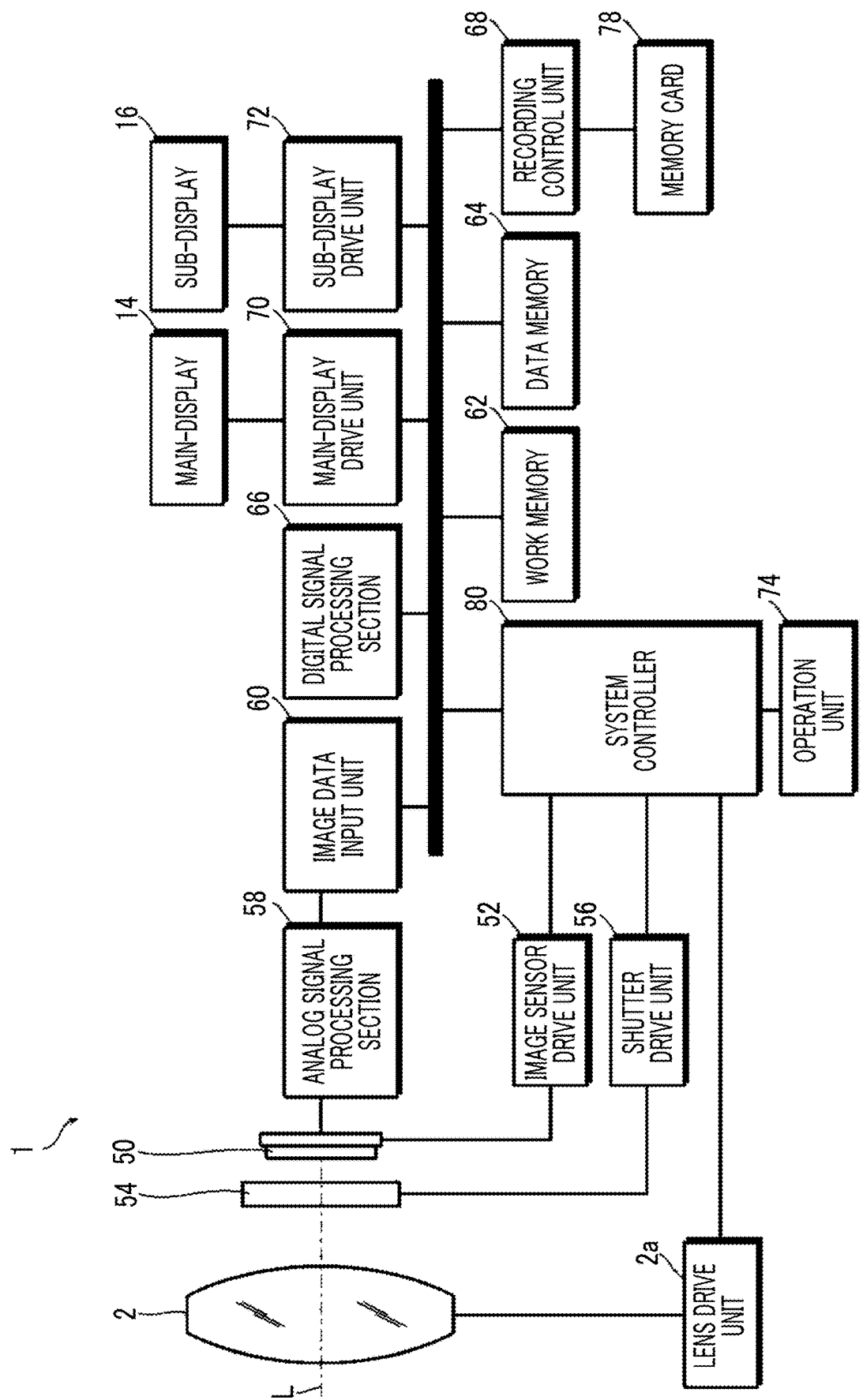
FIG. 6 is a block diagram showing the schematic configuration of a control system of the digital camera.

FIG. 6 is a block diagram showing the schematic configuration of a control system of the digital camera.

The digital camera 1 includes an image sensor 50, an image sensor drive unit 52, a shutter 54, a shutter drive unit 56, an analog signal processing section 58, an image data input unit 60, a work memory 62, a data memory 64, a digital signal processing section 66, a recording control unit 68, a main-display drive unit 70, a sub-display drive unit 72, an operation unit 74, a system controller 80, and the like.

The image sensor 50 converts an optical image of a subject, which is formed through the lens 2, into electrical signals and outputs the electrical signals. A publicly known image sensor, such as a charged coupled device (CCD) image sensor or a complementary metal oxide semiconductor (CMOS) image sensor, is used as the image sensor 50.

The image sensor drive unit 52 drives the image sensor 50 according to a command output from the system controller 80.

The shutter 54 is formed of a square type focal-plane shutter and is disposed directly in front of the image sensor 50. FIG. 1 shows a state where the shutter is fully opened.

The shutter drive unit 56 drives the shutter 54 according to a command output from the system controller 80.

The analog signal processing section 58 receives the signals output from the image sensor 50 and performs required signal processing, such as correlative double sampling processing and amplification processing. Further, the analog signal processing section 58 converts analog image signals subjected to the required signal processing into digital image signals and outputs the digital image signals.

The image data input unit 60 receives the digital image signals to be output from the analog signal processing section 58, according to a command output from the system controller 80. Received image data corresponding to one sheet is stored in the work memory 62.

The work memory 62 is used as a memory for work. The data memory 64 is formed of a non-volatile memory, such as electrically erasable programmable read only memory (EEPROM), and data required for control and the like are stored in the data memory 64.

The digital signal processing section 66 performs required signal processing, such as demosaicing processing, white balance correction, gamma correction, and outline correction, on the image data received in the work memory 62, and generates predetermined image data formed of brightness data (Y data) and color difference data (Cr and Cb data).

The recording control unit 68 accesses a memory card 78, and reads and writes data according to a command output from the system controller 80. Image data obtained by imaging is recorded in the memory card 78.

The main-display drive unit 70 drives the main-display 14 according to a command output from the system controller 80.

The sub-display drive unit 72 drives the sub-display 16 according to a command from the system controller 80.

The operation unit 74 includes the shutter button 30, the power supply lever 31, the playback button 34, the delete button 35, the AF lock button 36, the AE lock button 37, the menu button 38, the selector buttons 39, the BACK button 40, the rear command dial 41, the operation dial 110, and the like, and outputs a signal in response to the operation of each operation member to the system controller 80.

The system controller 80 is a control unit that controls the operation of each unit of the digital camera 1. The system controller 80 is formed of a microcomputer. That is, the microcomputer functions as the system controller 80 by executing a predetermined control program and functions as a control unit that controls the operation of each unit of the digital camera 1.

The system controller 80 also functions as a control unit for the lens 2. The system controller 80 controls the operation of the lens 2 through a lens drive unit 2a provided in the lens 2. The lens 2 comprises a stop, a focus lens, and the like. The lens drive unit 2a comprises a stop drive unit that drives the stop, a focus lens drive unit that drives the focus lens, and the like.

[Setting System by Using Operation Dial and Sub-display]

«Configuration»

Figure 7:
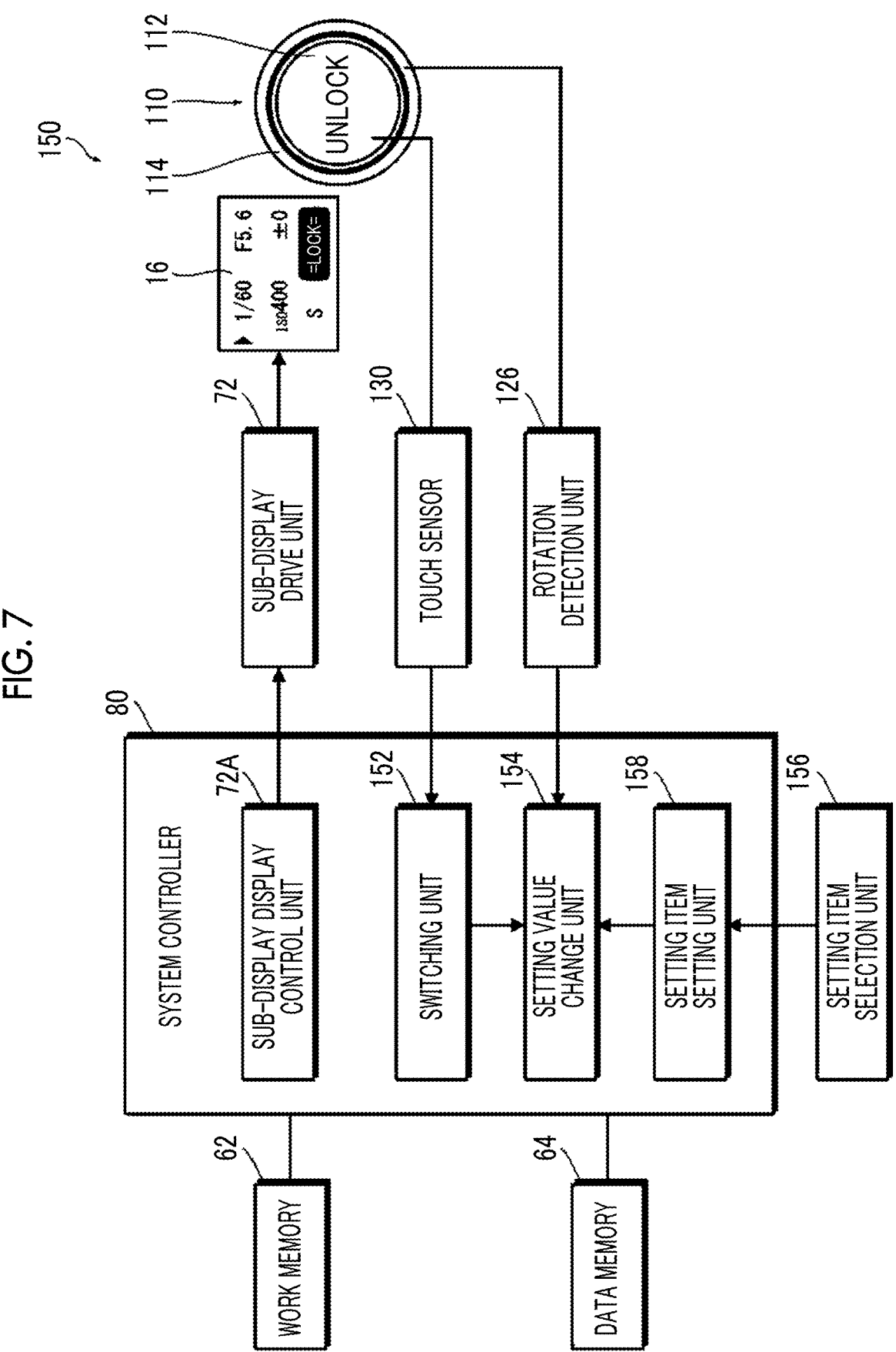
FIG. 7 is a block diagram showing the schematic configuration of a setting system using the operation dial and a sub-display.

FIG. 7 is a block diagram showing the schematic configuration of a setting system using the operation dial and a sub-display.

As described above, the operation dial 110 is valid only in the case where the operation thereof is performed while the top surface is touched. Further, the sub-display 16 displays the setting value of the item to be set by the operation dial 110.

As shown in FIG. 7, a setting system 150 using the operation dial 110 and the sub-display 16 comprises a switching unit 152 that switches between validity and invalidity of the change in the setting value by the operation dial 110 according to a detection result of the touch sensor 130 provided in the operation dial 110, a setting value change unit 154 that changes the setting value in response to the operation of the operation dial 110 in the case where the change in the setting value is valid, a sub-display display control unit 72A that controls the display on the sub-display 16, a setting item selection unit 156 that selects the item to be set by the operation dial 110, and a setting item setting unit 158 that sets the item to be set by the operation dial 110 according to a selection result by the setting item selection unit 156.

The switching unit 152 switches between validity and invalidity of the change in the setting value by the operation dial 110 according to the detection result of the touch sensor 130. As described above, in the digital camera 1 of the embodiment, the operation of the operation dial 110 becomes valid only in the case where the operation dial 110 is operated while the top surface is touched. Accordingly, the switching unit 152 validates the change in the setting value by the operation dial 110 only while the contact is detected by the touch sensor 130.

A function of the switching unit 152 is provided as one function of the system controller 80. That is, a microcomputer executes the predetermined control program and thus the system controller 80 functions as the switching unit 152.

In the case where the change in the setting value is valid, the setting value change unit 154 changes the setting value in response to the operation of the operation dial 110. The setting value change unit 154 changes the setting value of the item to be set by the operation dial 110 according to a detection result of the rotation detection unit 126. That is, the setting value of the item to be set by the operation dial 110 is changed according to the rotation amount and the rotation direction of the operation dial 110.

A function of the setting value change unit 154 is provided as one function of the system controller 80. That is, a microcomputer executes the predetermined control program and thus the system controller 80 functions as the setting value change unit 154.

The sub-display display control unit 72A is one example of a display control unit. The sub-display display control unit 72A controls the drive of the sub-display drive unit 72 to control the display on the sub-display 16. As described above, the sub-display 16 displays mainly the setting contents of the digital camera 1. The information displayed on the sub-display 16 includes at least the information on the setting value of the item to be set by the operation dial 110. The sub-display display control unit 72A acquires information necessary for the display on the sub-display 16 to control the display on the sub-display 16.

A function of the sub-display display control unit 72A is provided as one function of the system controller 80. That is, a microcomputer executes the predetermined control program and thus the system controller 80 functions as the sub-display display control unit 72A.

Figure 8:
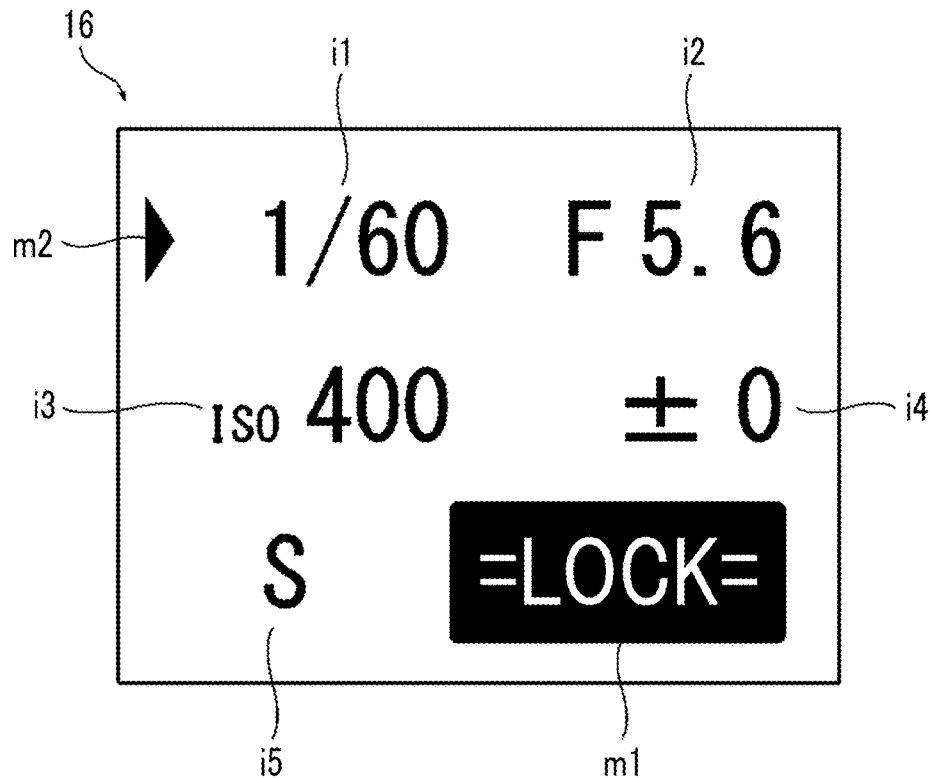
FIG. 8 is a plan view showing a display example of the sub-display.

FIG. 8 is a plan view showing a display example of the sub-display.

As shown in FIG. 8, the sub-display 16 displays shutter speed information i1, F-number information i2, international organization for standardization sensitivity (ISO) information i3, exposure correction value information i4, and imaging mode information i5 as the setting contents of the digital camera 1. These pieces of information are pieces of information on the items that can be set by the operation dial 110. That is, in the digital camera 1 of the embodiment, the shutter speed, the F-number, the ISO sensitivity, the exposure correction value, and the imaging mode can be set by the operation dial 110, and the sub-display 16 displays the setting values of the items that can be set by the operation dial 110.

Further, the sub-display 16 displays a lock mark m1 indicating that the operation dial 110 is locked, that is, the change in the setting value by the operation dial 110 is invalid. The lock mark m1 is formed of a figure including a character of "LOCK". In the case where the operation dial 110 is locked, the lock mark m1 is displayed.

Furthermore, the sub-display 16 displays a selection mark m2 indicating the item that can be set by the operation dial 110. The selection mark m2 is formed of a triangular figure and is displayed at a position indicating a position of an item that can be set by the operation dial 110. FIG. 8 shows an example in a case where the shutter speed is set by the operation dial 110. In this case, the selection mark m2 is displayed at a position indicating a position where the shutter speed is displayed.

The setting item selection unit 156 selects the item to be set by the operation dial 110. In the digital camera 1 of the embodiment, the item to be set by the operation dial 110 is set on the setting screen. In a case where the setting screen is called from the menu screen, an item of "operation dial setting" appears as one of the items that can be set on the setting screen. In a case where the item of "operation dial setting" is selected, a selection screen of the items to be set by the operation dial 110 appears on the main-display 14, and the selection of the items to be set by the operation dial 110 is possible. The selection is performed by using the selector buttons 39, the menu button 38, and the BACK button 40. That is, in the digital camera 1 of the embodiment, the main-display 14, the system controller 80, the selector buttons 39, the menu button 38, the BACK button 40, and the like cooperate to form the setting item selection unit 156.

The setting item setting unit 158 sets the item to be set by the operation dial 110 according to a selection result by the setting item selection unit 156. The setting item setting unit 158 is formed of the system controller 80. That is, the system controller 80 executes the predetermined control program to function as the setting item setting unit 158.

In a case where the shutter speed is selected as the item to be set by the operation dial 110, the setting value change unit 154 changes the shutter speed in a predetermined order in response to the operation of the operation dial 110. That is, in a case where the operation dial 110 is rotationally operated in the plus direction, the shutter speed is advanced for each one click. In a case where the operation dial 110 is rotationally operated in the minus direction, the shutter speed is lowered for each one click.

In a case where the F-number is selected as the item to be set by the operation dial 110, the setting value change unit 154 changes the F-number in a predetermined order in response to the operation of the operation dial 110. That is, in a case where the operation dial 110 is rotationally operated in the plus direction, the F-number is advanced for each one click. In a case where the operation dial 110 is rotationally operated in the minus direction, the F-number is lowered for each one click.

Furthermore, in a case where the ISO sensitivity is selected as the item to be set by the operation dial 110, the setting value change unit 154 changes the ISO sensitivity in a predetermined order in response to the operation of the operation dial 110. That is, in a case where the operation dial 110 is rotationally operated in the plus direction, the ISO sensitivity is advanced for each one click. In a case where the operation dial 110 is rotationally operated in the minus direction, the ISO sensitivity is lowered for each one click.

Further, in a case where the exposure correction value is selected as the item to be set by the operation dial 110, the setting value change unit 154 changes the exposure correction value in a predetermined step width in response to the operation of the operation dial 110. That is, in a case where the operation dial 110 is rotationally operated in the plus direction, the exposure correction value is advanced in the predetermined step width to the plus side for each one click. In a case where the operation dial 110 is rotationally operated in the minus direction, the exposure correction value is lowered in the predetermined step width to the minus side for each one click.

Further, in a case where the imaging mode is selected as the item to be set by the operation dial 110, the setting value change unit 154 changes the imaging mode in a predetermined order in response to the operation of the operation dial 110. In the digital camera 1 of the embodiment, program, shutter speed priority, aperture stop priority, and manual are prepared as the selectable imaging modes.

Here, the program refers to a mode in which an imaging person can change a combination of the F-number and the shutter speed while the exposure is constantly maintained. The mode is an imaging mode in which so-called program shift is possible. In a case where "program" is selected as the imaging mode, a character of "P" is displayed on the sub-display 16.

The shutter speed priority refers to a mode in which the camera automatically decides an F-number such that the proper exposure is achieved for a shutter speed selected by the user. In a case where "shutter speed priority" is selected as the imaging mode, a character of "S" is displayed on the sub-display 16.

The aperture stop priority refers to a mode in which the camera automatically decides a shutter speed such that the proper exposure is achieved for an F-number selected by the user. In a case where "aperture stop priority" is selected as the imaging mode, a character of "A" is displayed on the sub-display 16.

The manual refers to a mode in which the user selects the shutter speed and the F-number. In a case where "manual" is selected as the imaging mode, a character of "M" is displayed on the sub-display 16.

《Action》

Hereinafter, a setting method by using the operation dial and the sub-display will be described.

Figure 9:
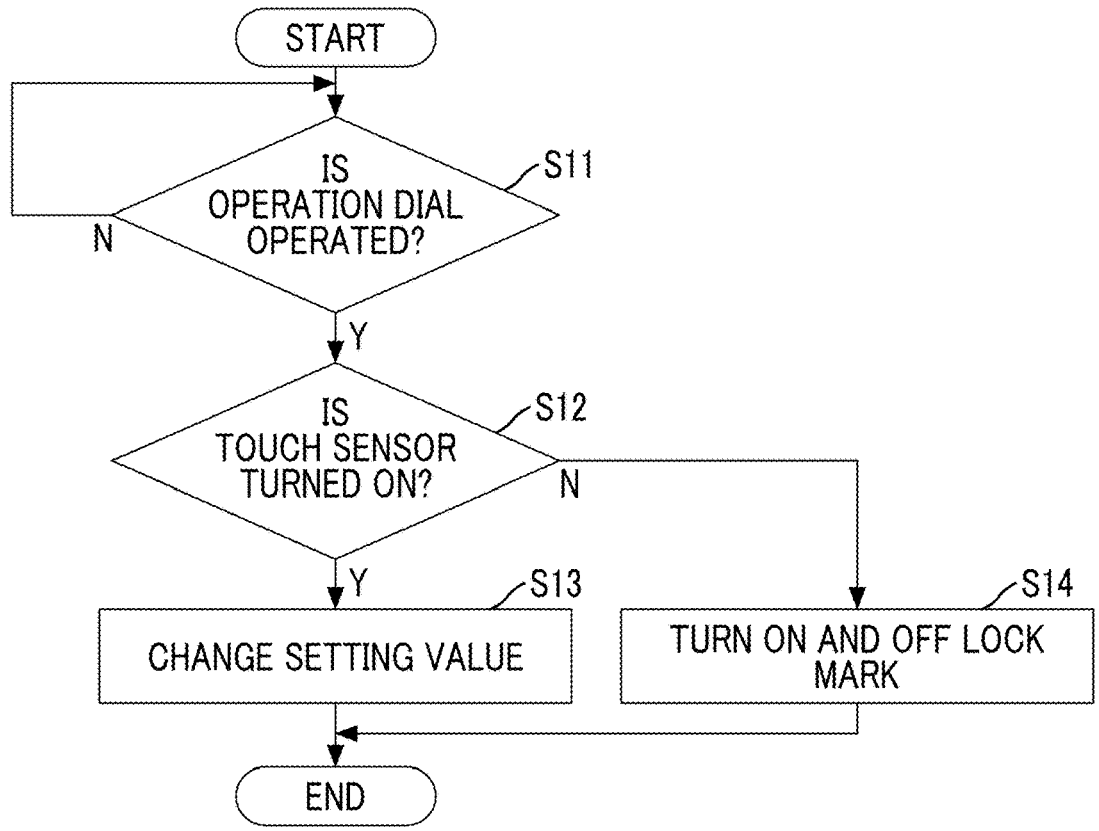
FIG. 9 is a flowchart showing a procedure of a setting change by using the operation dial.

FIG. 9 is a flowchart showing a procedure of the setting change by using the operation dial.

First, it is determined whether the operation dial 110 is operated (step S11). Whether the operation dial 110 is operated is determined based on an output from the rotation detection unit 126. That is, in a case where the rotation detection unit 126 detects the rotation of the outer peripheral part 114 of the operation dial 110, the operation dial 110 is determined to be operated.

In the case where the operation dial 110 is determined to be operated, then it is determined whether the touch sensor 130 is turned ON (step S12). That is, it is determined whether the top surface of the operation dial 110 is touched by the finger.

In a case where the touch sensor 130 is turned ON, the setting value of the item to be set by the operation dial 110 is changed in response to the operation of the operation dial 110 (step S13). For example, in the case where the item to be set by the operation dial 110 is the shutter speed, the shutter speed is changed in response to the operation of the operation dial 110.

On the other hand, in a case where the touch sensor 130 is turned OFF, that is, in a case where the operation dial 110 is not operated in a state where the top surface of the operation dial 110 is not touched by the finger, the change in the setting value cannot be performed. In this case, the display of the lock mark m1 on the sub-display 16 is turned on and off (step S14).

In this manner, in the digital camera 1 of the embodiment, the change in the setting value by the operation dial 110 is possible only in a case where the operation dial 110 is rotationally operated while the top surface is touched. That is, the lock of the operation dial 110 is released only in the case where the operation dial 110 is rotationally operated while the top surface is touched, and the operation dial 110 is locked in other cases.

Figure 10:
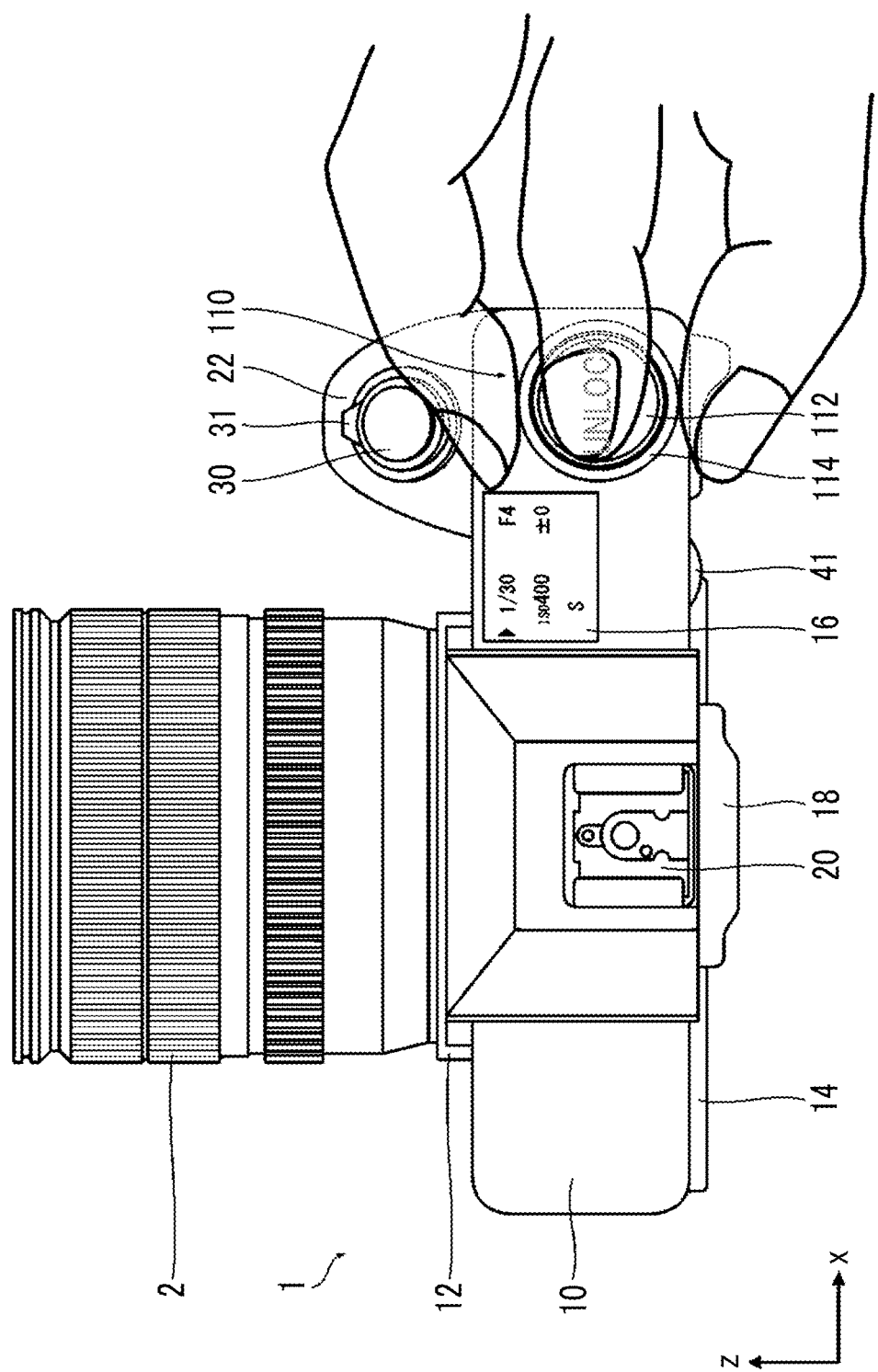
FIG. 10 is a plan view of the digital camera showing an operation method of the operation dial in a case where a change in a setting value is valid.

FIG. 10 is a plan view of the digital camera showing an operation method of the operation dial in a case where the change in the setting value is valid.

As shown in FIG. 10, the operation dial 110 is rotationally operated while the top surface is touched to validate the operation of the operation dial 110.

Figure 11:
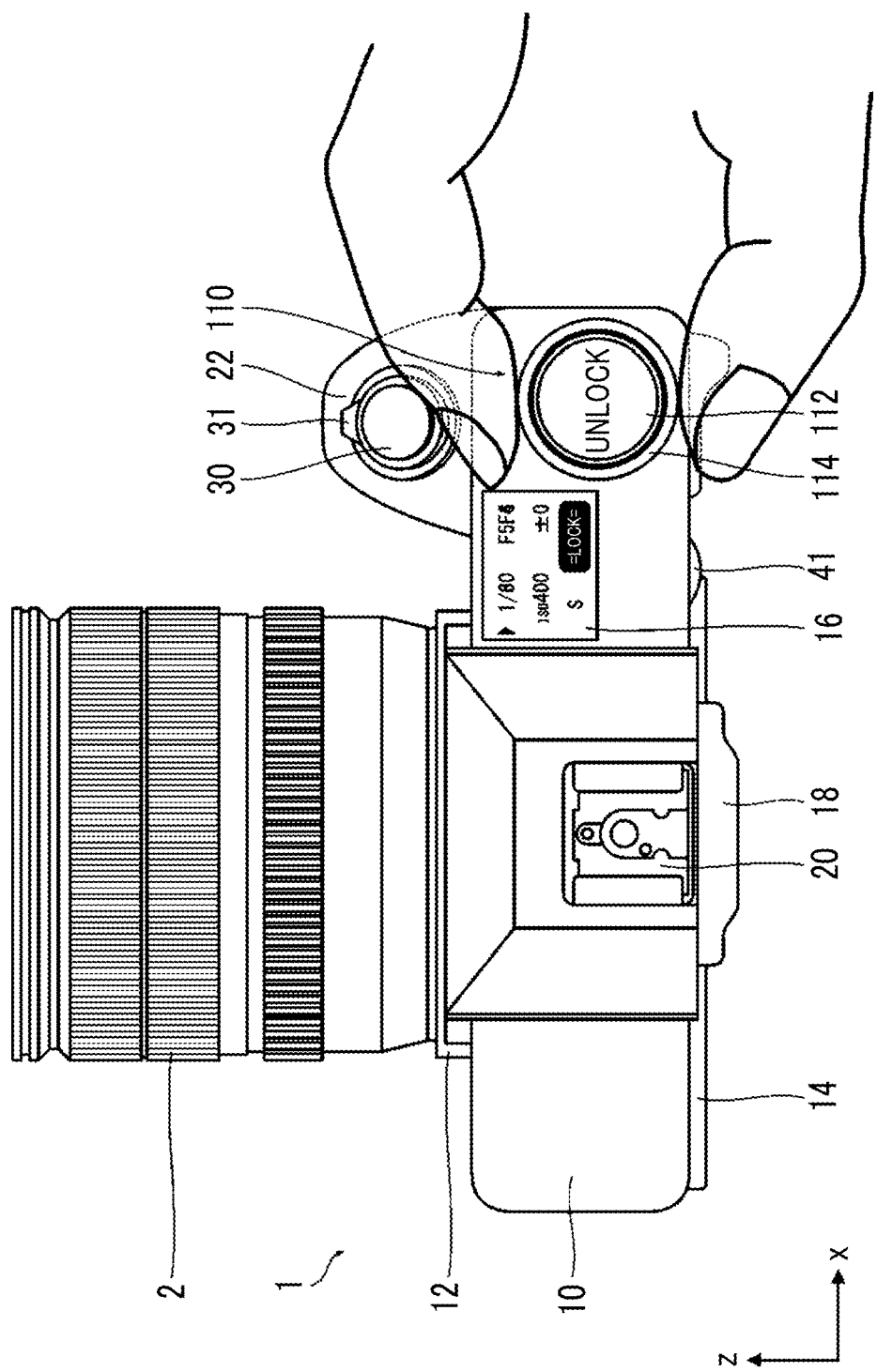
FIG. 11 is a plan view of the digital camera showing the operation method of the operation dial in a case where the change in the setting value is invalid.

FIG. 11 is a plan view of the digital camera showing the operation method of the operation dial in a case where the change in the setting value is invalid.

As shown in FIG. 11, in a case where the operation dial 110 is rotationally operated while the top surface is not touched, the operation of the operation dial 110 becomes invalid.

In the case where the operation of the operation dial 110 is invalid, that is, in the case where the operation dial 110 is locked, the lock mark m1 is displayed on the sub-display 16. In the case where the operation of the operation dial 110 is invalid, that is, in the case where the operation dial 110 is rotationally operated in the state where the operation dial 110 is locked, the lock mark m1 is turned on and off. Accordingly, it is possible to be more easily recognized that the operation dial 110 is locked.

The system controller 80 executes a predetermined setting program to implement the setting processing.

According to the digital camera 1 of the embodiment as described above, in the case of operating the operation dial 110, the operation of the operation dial 110 becomes valid only in the case where the operation thereof is performed while the top surface is touched. Accordingly, it is possible to effectively prevent the setting from being changed unintentionally.

Further, since the operation becomes valid only by touching the top surface of the operation dial 110, it is possible to ensure good operability.

Furthermore, since the operation dial 110 is electronically locked instead of a mechanical mechanism, it is possible to simplify the configuration of the operation dial 110.

Further, even in the case where the lock is set, since the information is displayed on the sub-display 16 disposed near the operation dial 110, the operation can be performed without being confused. Accordingly, it is possible to ensure good operability.

Furthermore, since a character of "UNLOCK" is displayed on the top surface of the operation dial 110, the operation can be performed intuitively.

In the embodiment, substantially the entire region of the top surface of the operation dial 110 (substantially the entire region on the upper-end surface of the inner peripheral part 112) is set as the contact detection region, but the region where the contact is detected may be limited to a part of the top surface of the operation dial 110. The center portion of the operation dial 110 may be set as the contact detection region. Accordingly, it is possible to effectively prevent the setting from being changed unintentionally. That is, since the operation becomes valid only in the case where the operation is performed while the center portion of the operation dial 110 is touched, it is possible to effectively prevent the erroneous operation. Further, since the region where the contact is detected is the center portion of the operation dial, it is also possible to ensure good operability. That is, other positions cannot be searched by groping, but the position of the rotation center can be found even by groping. Therefore, in a case where the operation is performed in a dark environment, in a case where the operation is performed while a view finder is viewed, or the like, it is possible to ensure especially good operability.

Second Embodiment

In the above-described digital camera 1 of the first embodiment, the operation of the operation dial 110 becomes valid only in the case where the operation dial 110 is operated while the top surface is touched.

In a digital camera 1 of the embodiment, the operation of the operation dial 110 can be switched alternately between valid and invalid every time the top surface of the operation dial 110 is touched. That is, the change in the setting value by the operation dial 110 can be switched alternately between valid and invalid every time the contact is detected by the touch sensor 130.

[Configuration]

A configuration in a second embodiment is basically the same as that of the digital camera 1 of the first embodiment except for a different operation of the switching unit 152.

The switching unit 152 alternately switches between validity and invalidity of the change in the setting value by the operation dial 110 every time the contact with the top surface is detected by the touch sensor 130 which is the contact detection unit.

Therefore, in the digital camera 1 of the embodiment, the touch sensor 130 functions as a so-called toggle type switch.

Figure 14:
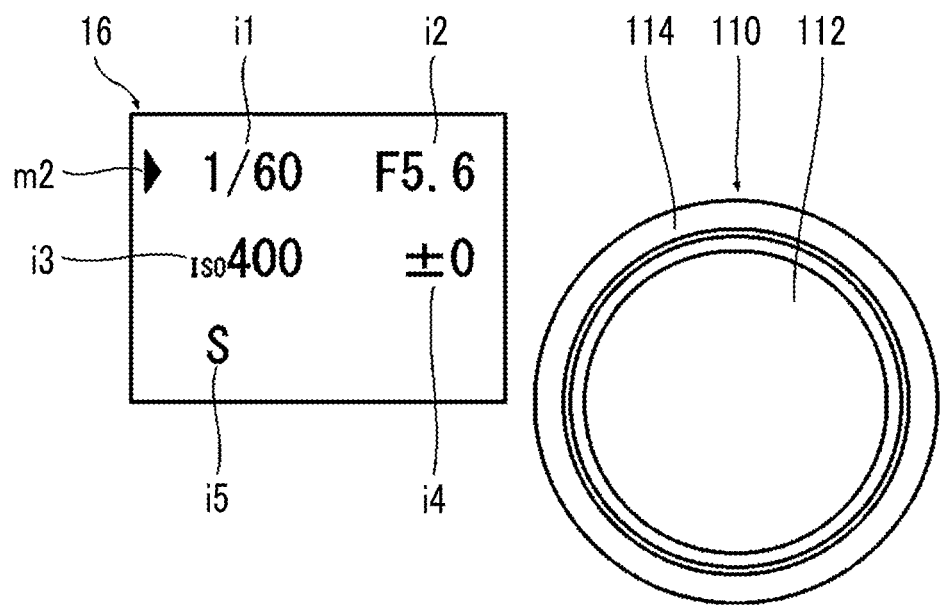
FIG. 14 is a plan view showing a display on the sub-display in the case where the change in the setting value is valid.
Figure 15:
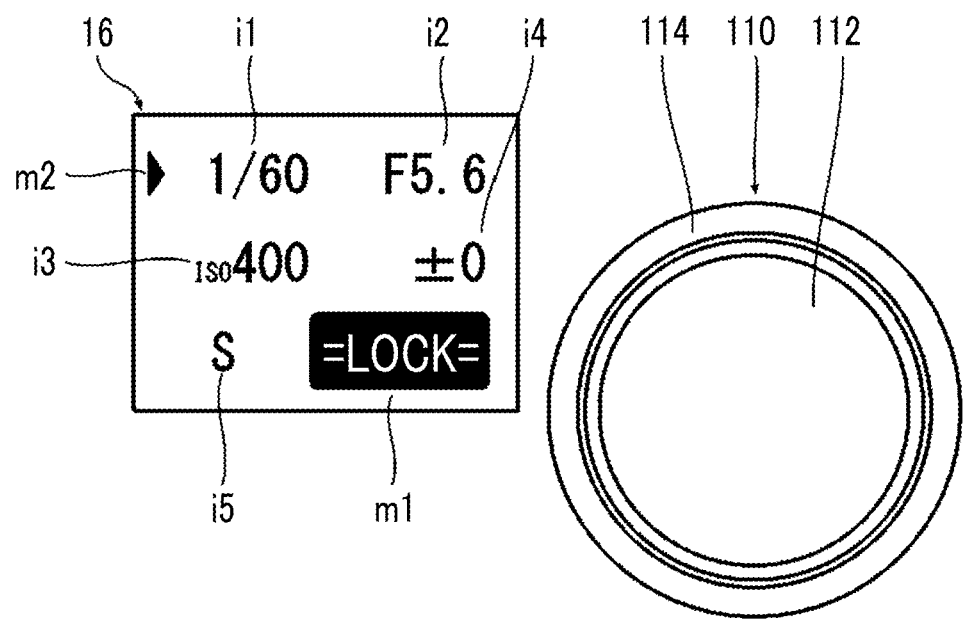
FIG. 15 is a plan view showing a display on the sub-display in the case where the change in the setting value is invalid.

In the digital camera 1 of the embodiment, the character of "UNLOCK" is not displayed on the top surface of the operation dial 110 (refer to FIGS. 14 and 15).

Figure 12:
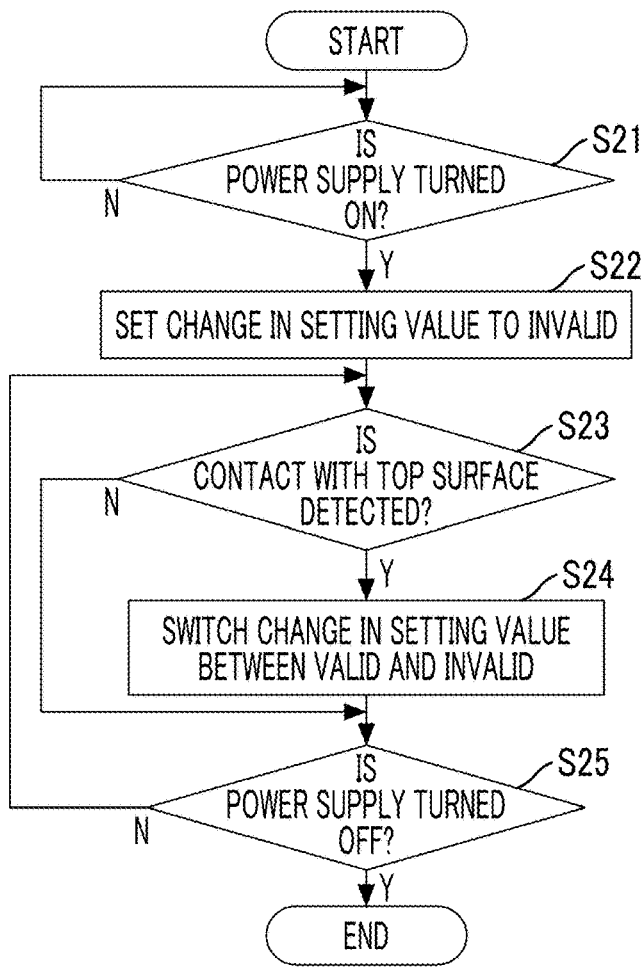
FIG. 12 is a flowchart showing an operation procedure of a switching unit.

FIG. 12 is a flowchart showing an operation procedure of the switching unit.

First, it is determined whether the power supply of the digital camera 1 is turned ON (step S21).

In a case where the power supply of the digital camera 1 is turned ON, the change in the setting value by the operation dial 110 is set to be invalid (step S22). That is, in the digital camera 1 of the embodiment, the operation by the operation dial 110 is invalidated at the time the power supply is turned on.

Thereafter, the presence or absence of the contact with the top surface is determined (step S23). That is, it is determined whether the contact with the top surface of the operation dial 110 is detected by the touch sensor 130.

In a case where the contact with the top surface of the operation dial 110 is detected, the switching unit 152 switches between validity and invalidity of the change in the setting value (step S24). That is, in a case where the previous state is valid, the state is switched to invalid. In a case where the previous state is invalid, the state is switched to valid. As described above, since the state is set to be invalid immediately after the power supply is turned on, the state can be switched to valid in a case where the contact is detected for the first time after the power supply is turned on.

In this manner, the switching unit 152 alternately switches between validity and invalidity of the change in the setting value by the operation dial 110 every time the contact with the top surface is detected.

Thereafter, it is determined whether the power supply of the digital camera 1 is turned OFF (step S25). In a case where the power supply is turned OFF, the processing ends.

[Action]

Hereinafter, a setting method by using the operation dial and the sub-display will be described.

Figure 13:
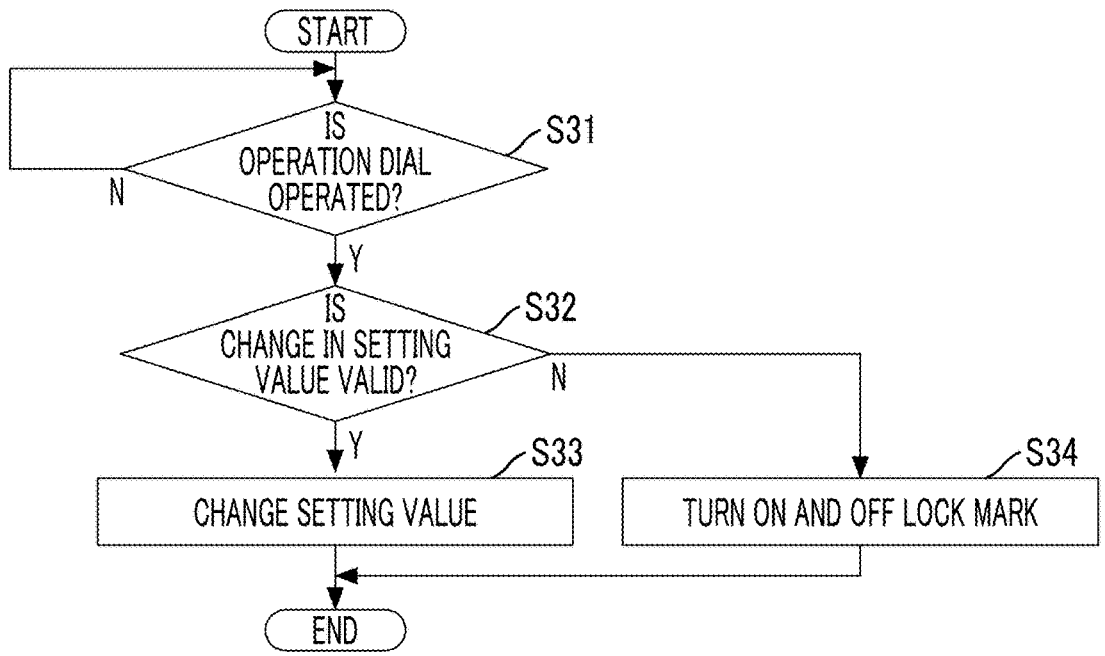
FIG. 13 is a flowchart showing a procedure of a setting change by using the operation dial.

FIG. 13 is a flowchart showing a procedure of the setting change by using the operation dial in the digital camera of the embodiment.

First, it is determined whether the operation dial 110 is operated (step S31).

In a case where the operation dial 110 is determined to be operated, then it is determined whether the operation by the operation dial 110 is valid, that is, the change in the setting value by the operation dial 110 is valid (step S32).

In a case where the change in the setting value by the operation dial 110 is valid, the setting value of the item to be set by the operation dial 110 is changed in response to the operation of the operation dial 110 (step S33). For example, in the case where the item to be set by the operation dial 110 is the shutter speed, the shutter speed is changed in response to the operation of the operation dial 110.

On the other hand, in a case where the change in the setting value by the operation dial 110 is invalid, the change in the setting value cannot be performed. In this case, the display of the lock mark m1 on the sub-display 16 is turned on and off (step S34).

In this manner, in the digital camera 1 of the embodiment, the change in the setting value by the operation dial 110 can be switched alternately between valid and invalid every time the top surface of the operation dial 110 is touched. That is, a locked state and an unlocked state (lock release state) of the operation dial 110 can be switched alternately.

FIG. 14 is a plan view showing a display on the sub-display in the case where the change in the setting value is valid.

As shown in FIG. 14, in the case where the change in the setting value is valid, a lock mark is not displayed on the sub-display 16.

FIG. 15 is a plan view showing a display on the sub-display in the case where the change in the setting value is invalid.

As shown in FIG. 15, in the case where the change in the setting value is invalid, the lock mark m1 is displayed on the sub-display 16. In the case where the change in the setting value is invalid, that is, in a case where the operation dial 110 is rotationally operated in the state where the lock is set, the lock mark m1 is turned on and off. Accordingly, it is possible to be more easily recognized that the operation dial 110 is locked.

The system controller 80 executes a predetermined setting program to implement the setting processing.

According to the digital camera 1 of the embodiment as described above, it is possible to lock and unlock the operation dial 110 by touching the top surface of the operation dial 110. Accordingly, it is possible to easily lock and unlock the operation dial 110. Accordingly, it is also possible to effectively prevent the setting from being changed unintentionally.

Third Embodiment

In a digital camera of the embodiment, the item to be set by the operation dial is automatically switched according to the imaging mode.

Figure 16:
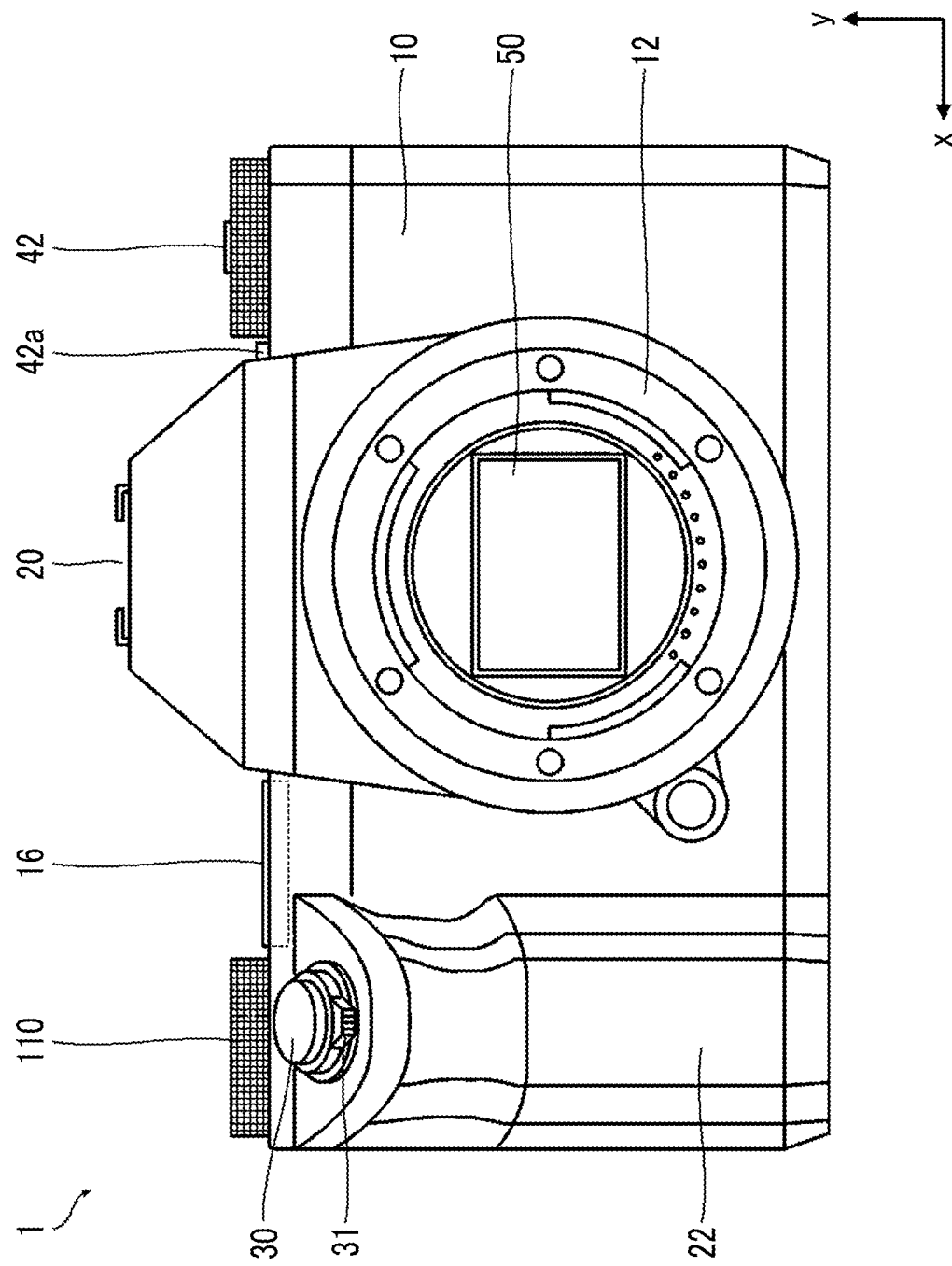
FIG. 16 is a front view of the digital camera.
Figure 17:
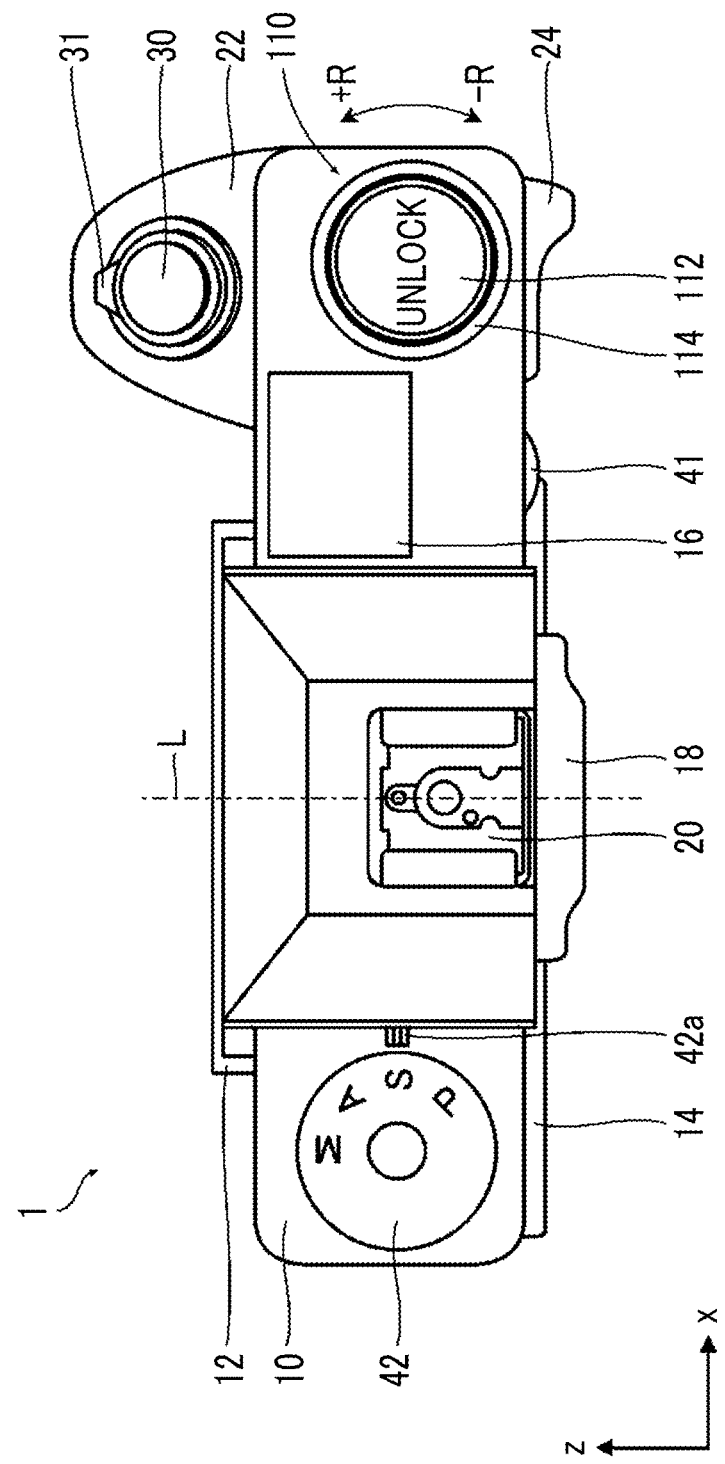
FIG. 17 is a plan view of the digital camera.

FIGS. 16 and 17 are respectively a front view and a plan view of the third embodiment of the digital camera to which the invention is applied.

As shown in FIGS. 16 and 17, the digital camera 1 of the embodiment is provided with a mode dial 42 on the top surface of the camera body 10.

The mode dial 42 is a rotary dial for setting the imaging mode. Each symbol of "P", "S", "A", and "M" is displayed on the same circumference at regular intervals on the top surface of the mode dial 42. The symbol "P" represents the program, the symbol "S" represents the shutter speed priority, the symbol "A" represents the aperture stop priority, and the symbol "M" represents the manual. The mode dial 42 is formed such that the click-stop is possible at a position of each symbol with respect to an indicator 42a. In a case where the symbol "P" is set to the indicator 42a, the imaging mode is set to the program. In a case where the symbol "S" is set to the indicator 42a, the imaging mode is set to the shutter speed priority. In a case where the symbol "A" is set to the indicator 42a, the imaging mode is set to the aperture stop priority. In a case where the symbol "M" is set to the indicator 42a, the imaging mode is set to the manual.

FIG. 17 shows a case where the shutter speed priority is selected as the imaging mode. In this case, the symbol "S" is set to the indicator 42a.

As described above, in the digital camera of the embodiment, the item to be set by the operation dial 110 is automatically switched according to the imaging mode.

FIG. 18 is a table representing a relationship between imaging modes and items to be set by the operation dial.

As shown in FIG. 18, in a case where the imaging mode is set to the program, the item to be set by the operation dial 110 is set to the program shift. In this case, in a case where the operation dial 110 is validated and the operation dial 110 is rotated in the plus direction, the shutter speed increases and the F-number decreases. Further, in a case where the operation dial 110 is validated and the operation dial 110 is rotated in the minus direction, the shutter speed decreases and the F-number increases.

Further, in a case where the imaging mode is set to the shutter speed priority, the item to be set by the operation dial 110 is set to the shutter speed. In this case, in a case where the operation dial 110 is validated and the operation dial 110 is rotated in the plus direction, the shutter speed is set to be increased. Further, in a case where the operation dial 110 is validated and the operation dial 110 is rotated in the minus direction, the shutter speed is set to be decreased.

Further, in a case where the imaging mode is set to the aperture stop priority, the item to be set by the operation dial 110 is set to the F-number. In this case, in a case where the operation dial 110 is validated and the operation dial 110 is rotated in the plus direction, the F-number is set to be increased. That is, in the case where the operation dial 110 is validated and the operation dial 110 is rotated in the plus direction, the stop is narrowed. Further, in a case where the operation dial 110 is validated and the operation dial 110 is rotated in the minus direction, the F-number is set to be decreased. That is, in the case where the operation dial 110 is validated and the operation dial 110 is rotated in the minus direction, the stop is opened.

Further, in a case where the imaging mode is set to the manual, the item to be set by the operation dial 110 is set to the shutter speed or the F-number. Whether the shutter speed or the F-number is set depends on the setting by the user. This setting is performed in advance on the setting screen called from the menu. In a case where the user selects the shutter speed, the item to be set by the operation dial is set to the shutter speed. In this case, the setting of the F-number is performed by the rear command dial 41. Further, in a case where the user selects the F-number, the item to be set by the operation dial is set to the F-number. In this case, the setting of the shutter speed is performed by the rear command dial 41.

In a case where the item to be set by the operation dial 110 is the shutter speed, in a case where the operation dial 110 is validated and the operation dial 110 is rotated in the plus direction, the shutter speed is set to be increased. Further, in a case where the operation dial 110 is validated and the operation dial 110 is rotated in the minus direction, the shutter speed is set to be decreased.

In a case where the item to be set by the operation dial 110 is F-number, in a case where the operation dial 110 is validated and the operation dial 110 is rotated in the plus direction, the F-number is set to be increased. That is, in the case where the operation dial 110 is validated and the operation dial 110 is rotated in the plus direction, the stop is narrowed. Further, in a case where the operation dial 110 is validated and the operation dial 110 is rotated in the minus direction, the F-number is set to be decreased. That is, in the case where the operation dial 110 is validated and the operation dial 110 is rotated in the minus direction, the stop is opened.

Figure 19:
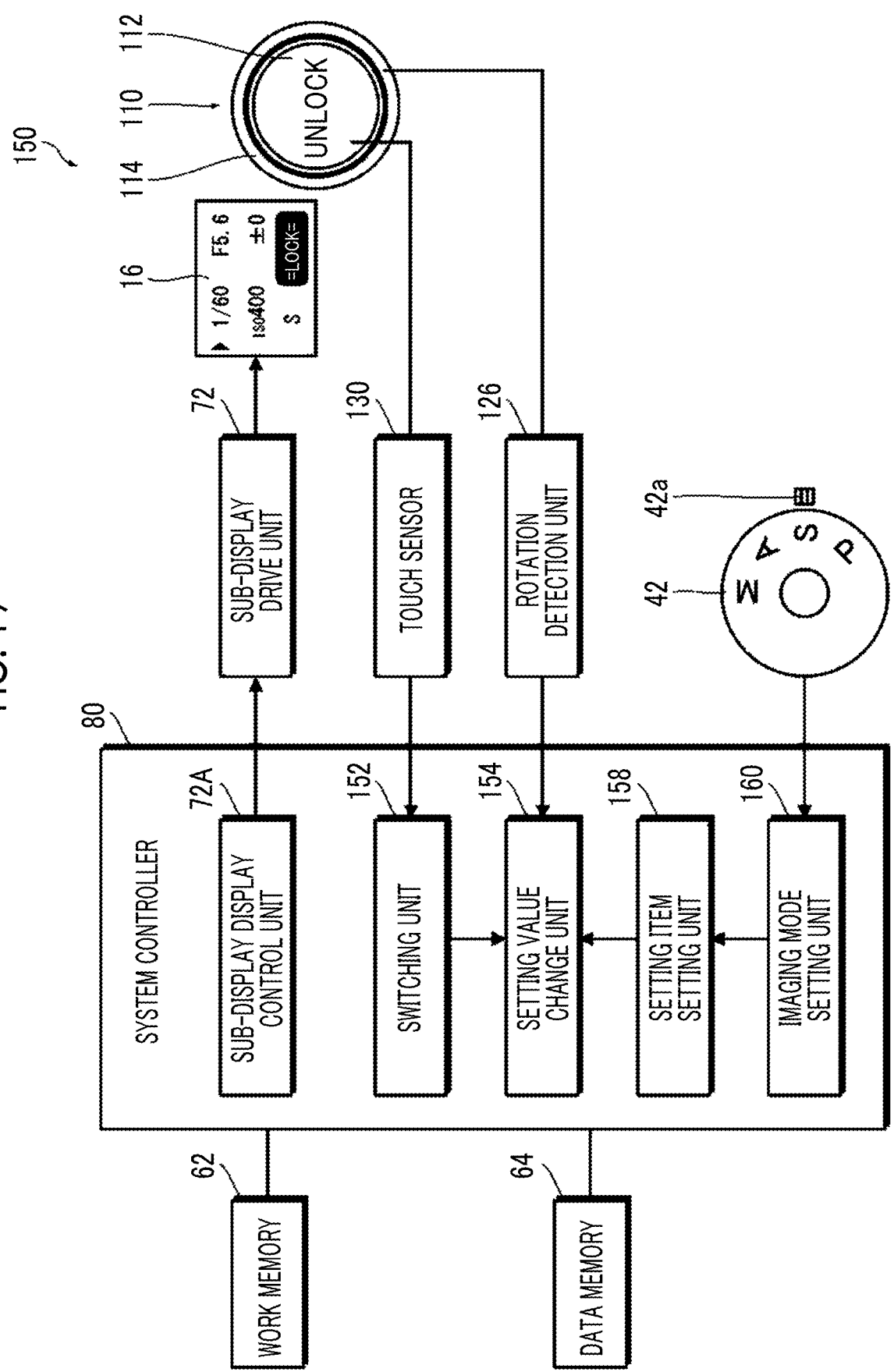
FIG. 19 is a block diagram showing the schematic configuration of the setting system.

FIG. 19 is a block diagram showing the schematic configuration of the setting system provided in the digital camera of the embodiment.

The setting system 150 of the embodiment is provided with an imaging mode setting unit 160 instead of the setting item selection unit 156. The imaging mode setting unit 160 sets the imaging mode of the digital camera 1 in response to the operation of the mode dial 42. The imaging mode setting unit 160 is formed of the system controller 80. That is, the system controller 80 executes the predetermined control program to function as the imaging mode setting unit 160.

The setting item setting unit 158 sets the item to be set by the operation dial 110 according to the imaging mode set by the imaging mode setting unit 160. That is, in the digital camera of the embodiment, the imaging mode setting unit 160 functions as a setting item switching instruction unit that performs an instruction to switch the item to be set by the operation dial, and the setting item setting unit 158 sets the item to be set by the operation dial 110 according to the imaging mode set by the imaging mode setting unit 160.

Information on the item to be set according to the imaging mode is stored in the data memory 64. The setting item setting unit 158 sets the item to be set by the operation dial 110 with reference to the information stored in the data memory 64.

According to the digital camera of the embodiment as described above, the item to be set by the operation dial is automatically switched according to the imaging mode. Accordingly, an appropriate function can be assigned to the operation dial according to the imaging mode.

In the embodiment, the imaging mode is set by the mode dial 42, but means for setting the imaging mode is not limited thereto. As the digital camera of the first embodiment described above, the imaging mode may be set on the setting screen.

Further, the method of switching between validity and invalidity of the operation of the operation dial 110, that is, the method of locking and unlocking the operation dial 110 may be any of methods of the first and second embodiments.

Fourth Embodiment

In a digital camera of the embodiment comprises means for switching the item to be set by the operation dial. Accordingly, it is possible to switch the item to be set by the operation dial as appropriate.

Figure 20:
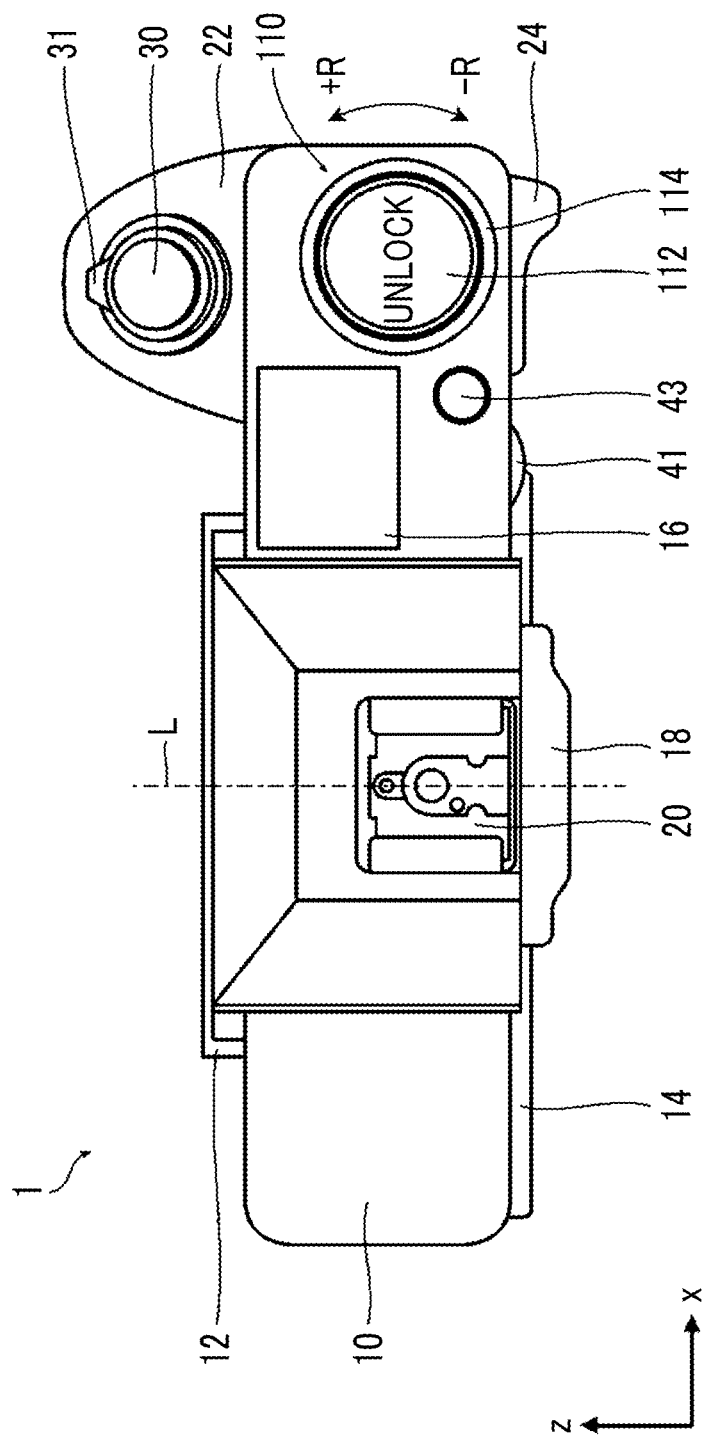
FIG. 20 is a plan view showing an example of the digital camera comprising means for switching the item to be set by the operation dial.

FIG. 20 is a plan view showing an example of the digital camera comprising the means for switching the item to be set by the operation dial.

The digital camera 1 of the embodiment comprises a push type setting item switching button 43 as the means for switching the item to be set by the operation dial 110.

As shown in FIG. 20, the setting item switching button 43 is provided on the top surface of the camera body 10. The setting item switching button 43 is provided near the operation dial 110. The switching of the item to be set by the operation dial 110 is instructed every time the setting item switching button 43 is pushed.

Figure 21:
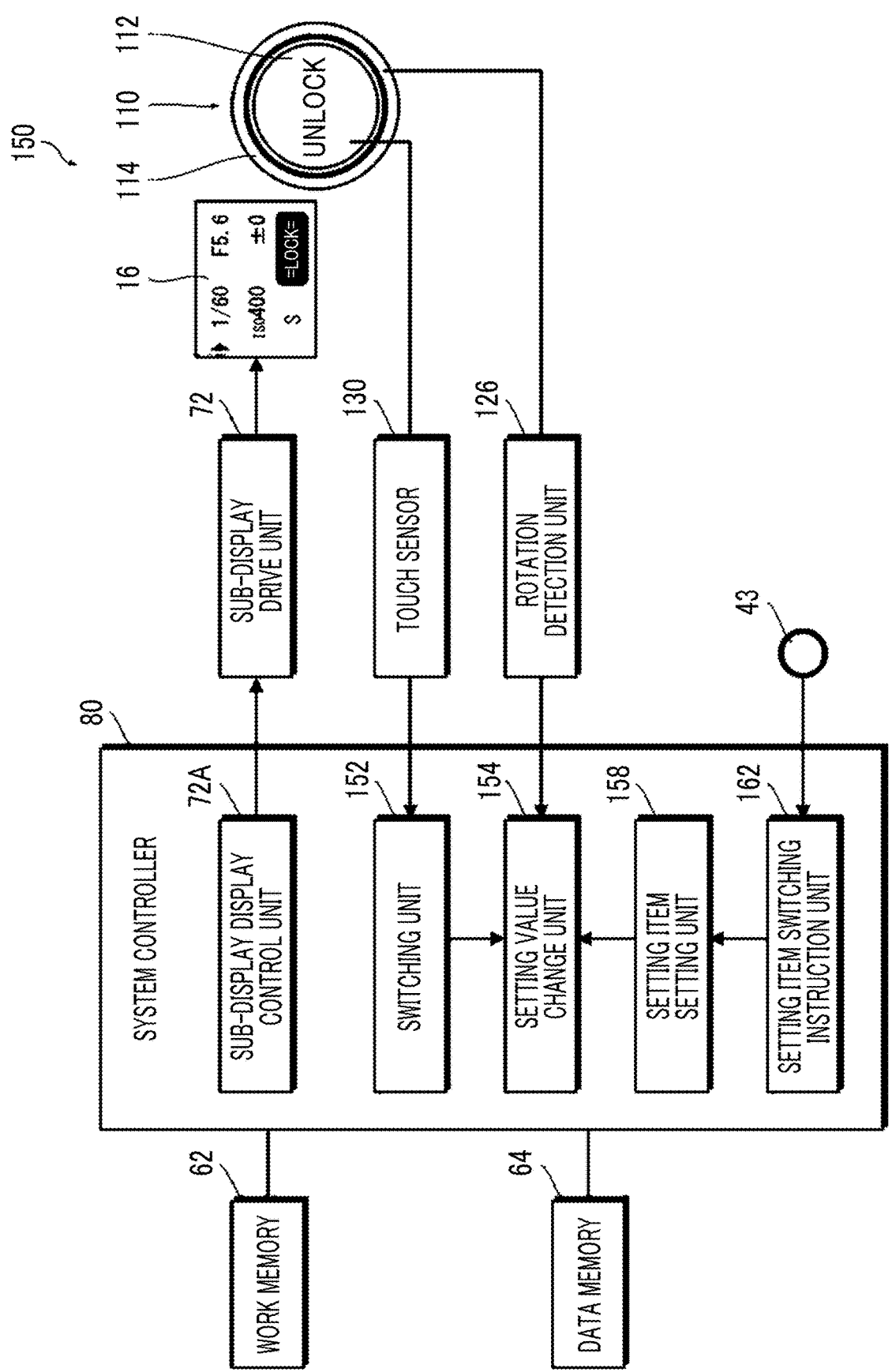
FIG. 21 is a block diagram showing the schematic configuration of the setting system.

FIG. 21 is a block diagram showing the schematic configuration of the setting system provided in the digital camera of the embodiment.

The setting system 150 of the embodiment is provided with a setting item switching instruction unit 162 instead of the setting item selection unit 156. The setting item switching instruction unit 162 performs an instruction to switch the item to be set by the operation dial 110 in response to the operation of the setting item switching button 43.

The setting item setting unit 158 sets the item to be set by the operation dial 110 in response to the instruction from the setting item switching instruction unit 162.

Here, the items to be set by the operation dial 110 can be switched in order of the shutter speed, the F-number, the ISO sensitivity, the exposure correction value, and the imaging mode in response to the instruction from the setting item switching instruction unit 162. Therefore, for example, in a case where the setting item switching button 43 is pushed in a state where the item to be set by the operation dial 110 is set to the shutter speed, the setting item setting unit 158 switches the item to be set by the operation dial 110 to the F-number.

In a case where the item to be set by the operation dial 110 is switched, a position of the selection mark m2 displayed on the sub-display 16 changes. Therefore, it is possible to confirm a current setting by confirming the display on the sub-display 16.

(A), (B), (C), (D), and (E) of FIG. 22 are plan views showing the switching of the display on the sub-display.

(A) of FIG. 22 shows the display on the sub-display 16 in the case where the item to be set by the operation dial 110 is the shutter speed. In this case, the selection mark m2 is displayed at a position indicating a position where the shutter speed information i1 is displayed.

(B) of FIG. 22 shows the display on the sub-display 16 in the case where the item to be set by the operation dial 110 is the F-number. In this case, the selection mark m2 is displayed at a position indicating a position where the F-number information i2 is displayed.

(C) of FIG. 22 shows the display on the sub-display 16 in the case where the item to be set by the operation dial 110 is the ISO sensitivity. In this case, the selection mark m2 is displayed at a position indicating a position where the ISO sensitivity information i3 is displayed.

(D) of FIG. 22 shows the display on the sub-display 16 in the case where the item to be set by the operation dial 110 is the exposure correction value. In this case, the selection mark m2 is displayed at a position indicating a position where the exposure correction value information i4 is displayed.

(E) of FIG. 22 shows the display on the sub-display 16 in the case where the item to be set by the operation dial 110 is the imaging mode. In this case, the selection mark m2 is displayed at a position indicating a position where the imaging mode information i5 is displayed.

The display on the sub-display 16 switches in order of (A), (B), (C), (D), and (E) of FIG. 22 every time the setting item switching button 43 is pushed. The display on the sub-display 16 returns again to the shutter speed next to the imaging mode.

According to the digital camera of the embodiment as described above, it is possible to switch the item to be set by the operation dial 110 by performing a button operation of the setting item switching button 43. Accordingly, it is possible to quickly set a desired item.

The method of switching between validity and invalidity of the operation by the operation dial 110 may be any of methods of the first and second embodiments.

Fifth Embodiment

A digital camera of the embodiment comprises a display on the top surface of the operation dial. Accordingly, it is possible to display various pieces of information on the top surface of the operation dial.

«Configuration»

FIG. 23 is a plan view showing an example of the digital camera comprising the display on the top surface of the operation dial.

As shown in FIG. 23, the display is provided on the top surface of the operation dial 110. Hereinafter, this display is referred to as a dial-display 132. The dial-display 132 is an example of a dial display section. The dial-display 132 is formed of the LCD and has a circular display section.

FIG. 24 is a longitudinal cross section view showing the schematic configuration of the operation dial comprising the dial-display on the top surface of the operation dial.

As shown in FIG. 24, the dial-display 132 is provided on the upper-end of the inner peripheral part 112 of the operation dial 110. Almost entire region of the inner peripheral part 112 of the operation dial 110 is set as a display surface of the dial-display 132.

The touch sensor 130 is disposed on the dial-display 132 in an overlapped manner. The touch sensor 130 detects the contact of the finger with the display surface of the dial-display 132. The touch sensor 130 is combined with the dial-display 132 to form a touch panel.

FIG. 25 is a block diagram showing the schematic configuration of the setting system provided in the digital camera of the embodiment.

The setting system 150 of the embodiment is provided with a dial-display display control unit 134 that controls the display on the dial-display 132 and a dial-display drive unit 136 that drives the dial-display 132 according to a command from the dial-display display control unit 134.

The dial-display display control unit 134 is an example of a dial display control unit. The dial-display display control unit 134 displays information on the item to be set by the operation dial 110 on the dial-display 132. The dial-display display control unit 134 acquires information necessary for the display on the dial-display 132 and controls the drive of the dial-display drive unit 136 to control the display of the dial-display 132.

A function of the dial-display display control unit 134 is provided as one function of the system controller 80. That is, a microcomputer executes the predetermined control program and thus the system controller 80 functions as the dial-display display control unit 134.

«Action»

As described above, it is possible to display various pieces of information on the top surface of the operation dial 110 by comprising the dial-display 132 on the top surface of the operation dial 110.

In the digital camera 1 of the embodiment, information on an item to be set by the operation dial 110 at the present time is displayed on the dial-display 132. For example, in a case where the item to be set by the operation dial 110 at the present time is the shutter speed, the dial-display 132 displays information indicating that the item to be set by the operation dial 110 is the shutter speed.

Further, in the digital camera 1 of the embodiment, the display form of the dial-display 132 can be switched between a case where the change in the setting value by the operation dial 110 is valid and a case where the change in the setting value by the operation dial 110 is invalid. Specifically, an inverted display is performed. The inverted display refers to invert and display a character and a background color on a part of a screen. For example, in the case where the change in the setting value by the operation dial 110 is valid, information is displayed in a black character on a white background (background color is white). In the case where the change in the setting value by the operation dial 110 is invalid, information is displayed in a white character on a black background (background color is black).

(A) and (B) of FIG. 26 are diagrams showing examples of the display on the sub-display and the dial-display in the case where the item to be set by the operation dial is the shutter speed. (A) of FIG. 26 shows the case where the change in the setting value by the operation dial 110 is valid, that is, a state where the lock is released. (B) of FIG. 26 shows the case where the change in the setting value by the operation dial 110 is invalid, that is, a state where the lock is set.

As shown in FIG. 26, in the case where the item to be set by the operation dial 110 is the shutter speed, a display of "SHUTTER SPEED" is displayed on the dial-display 132. This display is information indicating that the item to be set by the operation dial 110 is the shutter speed.

Further, as shown in FIG. 26, a color is inverted and displayed between the case where the change in the setting value by the operation dial 110 is valid and the case where the change in the setting value by the operation dial 110 is invalid. That is, in the case where the change in the setting value by the operation dial 110 is valid, "SHUTTER SPEED" is displayed in the black character on the white background as shown in (A) of FIG. 26. In the case where the change in the setting value by the operation dial 110 is invalid, "SHUTTER SPEED" is displayed in the white character on the black background as shown in (B) of FIG. 26.

In the case where the item to be set by the operation dial is the shutter speed, the sub-display 16 displays the selection mark m2 at the position indicating the shutter speed information i1.

Further, in the case where the change in the setting value by the operation dial 110 is invalid, the sub-display 16 displays the lock mark m1 as shown in (B) of FIG. 26.

(A) and (B) of FIG. 27 are diagrams showing examples of the display on the sub-display and the dial-display in the case where the item to be set by the operation dial is the F-number. (A) of FIG. 27 shows the case where the change in the setting value by the operation dial 110 is valid, that is, the state where the lock is released. (B) of FIG. 27 shows the case where the change in the setting value by the operation dial 110 is invalid, that is, the state where the lock is set.

As shown in FIG. 27, in the case where the item to be set by the operation dial 110 is the F-number, a display of "IRIS" is displayed on the dial-display 132. This display is information indicating that the item to be set by the operation dial 110 is the F-number.

Further, as shown in FIG. 27, the color is inverted and displayed between the case where the change in the setting value by the operation dial 110 is valid and the case where the change in the setting value by the operation dial 110 is invalid. That is, in the case where the change in the setting value by the operation dial 110 is valid, "IRIS" is displayed in the black character on the white background as shown in (A) of FIG. 27. In the case where the change in the setting value by the operation dial 110 is invalid, "IRIS" is displayed in the white character on the black background as shown in (B) of FIG. 27.

In the case where the item to be set by the operation dial is the F-number, the sub-display 16 displays the selection mark m2 at the position indicating the F-number information i2.

Further, in the case where the change in the setting value by the operation dial 110 is invalid, the sub-display 16 displays the lock mark m1 as shown in (B) of FIG. 27.

(A) and (B) of FIG. 28 are diagrams showing examples of the display on the dial-display in the case where the item to be set by the operation dial is the ISO sensitivity. (A) of FIG. 28 shows the case where the change in the setting value by the operation dial 110 is valid, that is, the state where the lock is released. (B) of FIG. 28 shows the case where the change in the setting value by the operation dial 110 is invalid, that is, the state where the lock is set.

As shown in FIG. 28, in the case where the item to be set by the operation dial 110 is the ISO sensitivity, a display of "ISO" is displayed on the dial-display 132. This display is information indicating that the item to be set by the operation dial 110 is the ISO sensitivity.

Further, as shown in FIG. 28, the color is inverted and displayed between the case where the change in the setting value by the operation dial 110 is valid and the case where the change in the setting value by the operation dial 110 is invalid. That is, in the case where the change in the setting value by the operation dial 110 is valid, "ISO" is displayed in the black character on the white background as shown in (A) of FIG. 28. In the case where the change in the setting value by the operation dial 110 is invalid, "ISO" is displayed in the white character on the black background as shown in (B) of FIG. 28.

In the case where the item to be set by the operation dial is the ISO sensitivity, the sub-display 16 displays the selection mark m2 at the position indicating the ISO sensitivity information i3.

Further, in the case where the change in the setting value by the operation dial 110 is invalid, the sub-display 16 displays the lock mark m1 as shown in (B) of FIG. 28.

(A) and (B) of FIG. 29 are diagrams showing examples of the display on the dial-display in the case where the item to be set by the operation dial is the exposure correction value. (A) of FIG. 29 shows the case where the change in the setting value by the operation dial 110 is valid, that is, the state where the lock is released. (B) of FIG. 29 shows the case where the change in the setting value by the operation dial 110 is invalid, that is, the state where the lock is set.

As shown in FIG. 29, in the case where the item to be set by the operation dial 110 is the exposure correction value, a display of "EXPOSURE CORRECTION" is displayed on the dial-display 132. This display is information indicating that the item to be set by the operation dial 110 is the exposure correction value.

Further, as shown in FIG. 29, the color is inverted and displayed between the case where the change in the setting value by the operation dial 110 is valid and the case where the change in the setting value by the operation dial 110 is invalid. That is, in the case where the change in the setting value by the operation dial 110 is valid, "EXPOSURE CORRECTION" is displayed in the black character on the white background as shown in (A) of FIG. 29. In the case where the change in the setting value by the operation dial 110 is invalid, "EXPOSURE CORRECTION" is displayed in the white character on the black background as shown in (B) of FIG. 29.

In the case where the item to be set by the operation dial is the exposure correction value, the sub-display 16 displays the selection mark m2 at the position indicating the exposure correction value information i3.

Further, in the case where the change in the setting value by the operation dial 110 is invalid, the sub-display 16 displays the lock mark m1 as shown in (B) of FIG. 29.

(A) and (B) of FIG. 30 are diagrams showing examples of the display on the dial-display in the case where the item to be set by the operation dial is the imaging mode. (A) of FIG. 30 shows the case where the change in the setting value by the operation dial 110 is valid, that is, the state where the lock is released. (B) of FIG. 30 shows the case where the change in the setting value by the operation dial 110 is invalid, that is, the state where the lock is set.

As shown in FIG. 30, in the case where the item to be set by the operation dial 110 is the imaging mode, a display of "MODE" is displayed on the dial-display 132. This display is information indicating that the item to be set by the operation dial 110 is the imaging mode.

Further, as shown in FIG. 30, the color is inverted and displayed between the case where the change in the setting value by the operation dial 110 is valid and the case where the change in the setting value by the operation dial 110 is invalid. That is, in the case where the change in the setting value by the operation dial 110 is valid, "MODE" is displayed in the black character on the white background as shown in (A) of FIG. 30. In the case where the change in the setting value by the operation dial 110 is invalid, "MODE" is displayed in the white character on the black background as shown in (B) of FIG. 30.

In the case where the item to be set by the operation dial is the imaging mode, the sub-display 16 displays the selection mark m2 at the position indicating the imaging mode information i5.

Further, in the case where the change in the setting value by the operation dial 110 is invalid, the sub-display 16 displays the lock mark m1 as shown in (B) of FIG. 30.

In this manner, in the digital camera 1 of the embodiment, the information on the item to be set by the operation dial 110 at the present time is displayed on the dial-display 132. Accordingly, it is possible to grasp the item that can be set by the operation dial 110 at a glance and to realize better operability. The display may be anything as long as the item to be set by the operation dial 110 can be understood.

Further, according to the digital camera 1 of the embodiment, the display form of the dial-display 132 can be switched between the case where the change in the setting value by the operation dial 110 is valid and the case where the change in the setting value by the operation dial 110 is invalid. Accordingly, it is possible to grasp whether the change in the setting value by the operation dial 110 is valid at a glance and to realize better operability.

The switching of the display form is not limited thereto. In addition, for example, the brightness may be switched between the case where the change in the setting value by the operation dial 110 is valid and the case where the change in the setting value by the operation dial 110 is invalid (for example, the brightness is made bright in the case where the change in the setting value by the operation dial 110 is valid, and the brightness is made dark in the case where the change in the setting value by the operation dial 110 is invalid).

Further, in the case where the operation dial 110 is rotationally operated in the case where the change in the setting value by the operation dial 110 is invalid, the display on the dial-display 132 may be turned on and off. Accordingly, it is possible to be more easily recognized that the operation is invalid.

The method of switching between validity and invalidity of the change in the setting value by the operation dial 110 may be any of methods of the first and second embodiments. In the case of the method of the first embodiment, the operation of the operation dial 110 becomes valid only in the case where the operation dial 110 is operated while the top surface is touched. On the other hand, in the case of the method of the second embodiment, the change in the setting value by the operation dial 110 can be switched alternately between valid and invalid every time the top surface of the operation dial 110 is touched.

Sixth Embodiment

A digital camera of the embodiment is in common with the digital camera of the fifth embodiment in that the operation dial comprises the dial-display. In the digital camera of the embodiment, pieces of information displayed on the sub-display and the dial-display are different from those of the digital camera of the fifth embodiment.

FIG. 31 is a diagram showing an example of displays on the sub-display and the dial-display provided in the digital camera of the embodiment.

In the digital camera of the embodiment, the dial-display 132 displays a setting value of an item to be set by the operation dial 110, and the sub-display 16 displays setting values of items other than the item to be set by the operation dial 110.

FIG. 31 shows the example in the case where the item to be set by the operation dial 110 is the shutter speed. In this case, the dial-display 132 displays a currently set shutter speed. FIG. 31 shows the example in a case where the currently set shutter speed is 1/60 second. In this case, "1/60" is displayed on the dial-display 132.

The sub-display 16 displays the setting values of the items other than the shutter speed. Information displayed on the sub-display 16 includes at least the information on the setting value of the item that can be set by the operation dial 110.

In a case where the shutter speed, the F-number, the ISO sensitivity, the exposure correction value, and the imaging mode can be set by the operation dial 110, the sub-display 16 displays the pieces of information excluding the item to be set by the operation dial 110 among the pieces of information. For example, in a case where the item to be set by the operation dial 110 is the shutter speed, the sub-display 16 displays the pieces of information excluding the shutter speed, that is, respective pieces of information i2 to i5 of the F-number, the ISO sensitivity, the exposure correction value, and the imaging mode as shown in FIG. 31. In addition, in the digital camera of the embodiment, the sub-display 16 displays battery remaining amount information i6 and the number of capturable images information i7.

FIG. 31 shows a display example in the case where the change in the setting value by the operation dial 110 is valid. In the case where the change in the setting value by the operation dial 110 is invalid, the display color of the dial-display 132 is inverted.

FIG. 32 is a diagram showing an example of displays on the sub-display and the dial-display in the case where the change in the setting value by the operation dial is invalid.

As shown in FIG. 32, in the case where the change in the setting value by the operation dial 110 is invalid, the dial-display 132 displays the setting value in the white character on the black background. On the other hand, in the case where the change in the setting value by the operation dial 110 is valid, the dial-display 132 displays the setting value in the black character on the white background as shown in FIG. 31.

In this manner, in the digital camera of the embodiment, the display form of the dial-display 132 can be switched between the case where the change in the setting value by the operation dial 110 is valid and the case where the change in the setting value by the operation dial 110 is invalid. Accordingly, it is possible to grasp at a glance whether the change in the setting value by the operation dial 110 is possible.

The display on the sub-display 16 is controlled by the sub-display display control unit 72A. Further, the display on the dial-display 132 is controlled by the dial-display display control unit 134.

(A) and (B) of FIG. 33 are diagrams showing examples of the displays on the sub-display and the dial-display in a case where the item to be set by the operation dial is the F-number. (A) of FIG. 33 shows the case where the change in the setting value by the operation dial 110 is valid, that is, the state where the lock is released. Further, (B) of FIG. 33 shows the case where the change in the setting value by the operation dial 110 is invalid, that is, the state where the lock is set.

As shown in FIG. 33, in the case where the item to be set by the operation dial 110 is the F-number, the dial-display 132 displays a currently set F-number. FIG. 33 shows a case where the currently set F-number is F5.6.

Further, the sub-display 16 displays the shutter speed information i1, the ISO sensitivity information i3, the exposure correction value information i4, and the imaging mode information i5 which are the pieces of information other than the F-number. Further, the battery remaining amount information i6 and the number of capturable images information i7 are displayed.

Further, the color is displayed in an inverted manner between the case where the change in the setting value by the operation dial 110 is valid and the case where the change in the setting value by the operation dial 110 is invalid as shown in FIG. 33. That is, in the case where the change in the setting value by the operation dial 110 is valid, the F-number is displayed in the black character on the white background as shown in (A) of FIG. 33. In the case where the change in the setting value by the operation dial 110 is invalid, the F-number is displayed in the white character on the black background as shown in FIG. 33 (B).

(A) and (B) of FIG. 34 are diagrams showing examples of the displays on the sub-display and the dial-display in a case where the item to be set by the operation dial is the ISO sensitivity. (A) of FIG. 34 shows the case where the change in the setting value by the operation dial 110 is valid, that is, the state where the lock is released. Further, (B) of FIG. 34 shows the case where the change in the setting value by the operation dial 110 is invalid, that is, the state where the lock is set.

As shown in FIG. 34, in the case where the item to be set by the operation dial 110 is the ISO sensitivity, the dial-display 132 displays a currently set ISO sensitivity. FIG. 34 shows a case where the currently set ISO sensitivity is ISO400.

Further, the sub-display 16 displays the shutter speed information i1, the F-number information i2, the exposure correction value information i4, and the imaging mode information i5 which are the pieces of information other than the ISO sensitivity. Further, the battery remaining amount information i6 and the number of capturable images information i7 are displayed.

Further, the color is displayed in an inverted manner between the case where the change in the setting value by the operation dial 110 is valid and the case where the change in the setting value by the operation dial 110 is invalid as shown in FIG. 34. That is, in the case where the change in the setting value by the operation dial 110 is valid, the ISO sensitivity is displayed in the black character on the white background as shown in (A) of FIG. 34. In the case where the change in the setting value by the operation dial 110 is invalid, the ISO sensitivity is displayed in the white character on the black background as shown in (B) of FIG. 34.

(A) and (B) of FIG. 35 are diagrams showing examples of the displays on the sub-display and the dial-display in a case where the item to be set by the operation dial is the exposure correction value. (A) of FIG. 35 shows the case where the change in the setting value by the operation dial 110 is valid, that is, the state where the lock is released. Further, (B) of FIG. 35 shows the case where the change in the setting value by the operation dial 110 is invalid, that is, the state where the lock is set.

As shown in FIG. 35, in the case where the item to be set by the operation dial 110 is the exposure correction value, the dial-display 132 displays a currently set exposure correction value. FIG. 35 shows a case where the currently set exposure correction value is ±0.

Further, the sub-display 16 displays the shutter speed information i1, the F-number information i2, the ISO sensitivity information i3, and the imaging mode information i5 which are the pieces of information other than the exposure correction value. Further, the battery remaining amount information i6 and the number of capturable images information i7 are displayed.

Further, the color is displayed in an inverted manner between the case where the change in the setting value by the operation dial 110 is valid and the case where the change in the setting value by the operation dial 110 is invalid as shown in FIG. 35. That is, in the case where the change in the setting value by the operation dial 110 is valid, the exposure correction value is displayed in the black character on the white background as shown in (A) of FIG. 35. In the case where the change in the setting value by the operation dial 110 is invalid, the exposure correction value is displayed in the white character on the black background as shown in (B) of FIG. 35.

(A) and (B) of FIG. 36 are diagrams showing examples of the displays on the sub-display and the dial-display in a case where the item to be set by the operation dial is the imaging mode. (A) of FIG. 36 shows the case where the change in the setting value by the operation dial 110 is valid, that is, the state where the lock is released. Further, (B) of FIG. 36 shows the case where the change in the setting value by the operation dial 110 is invalid, that is, the state where the lock is set.

As shown in FIG. 36, in the case where the item to be set by the operation dial 110 is the imaging mode, the dial-display 132 displays a currently set imaging mode. FIG. 36 shows a case where the currently set imaging mode is the shutter speed priority.

Further, the sub-display 16 displays the shutter speed information i1, the F-number information i2, the ISO sensitivity information i3, the exposure correction value information i4 which are the pieces of information other than the imaging mode. Further, the battery remaining amount information i6 and the number of capturable images information i7 are displayed.

Further, the color is displayed in an inverted manner between the case where the change in the setting value by the operation dial 110 is valid and the case where the change in the setting value by the operation dial 110 is invalid as shown in FIG. 36. That is, in the case where the change in the setting value by the operation dial 110 is valid, the imaging mode is displayed in the black character on the white background as shown in (A) of FIG. 36. In the case where the change in the setting value by the operation dial 110 is invalid, the imaging mode is displayed in the white character on the black background as shown in (B) of FIG. 36.

In this manner, according to the digital camera of the embodiment, the dial-display 132 displays the setting value of the item to be set by the operation dial 110, and the sub-display 16 displays the setting values of the items other than the item to be set by the operation dial 110. Accordingly, it is possible to grasp the item to be set by the operation dial 110 and the setting value of the item at a glance.

Further, the display form of the dial-display 132 can be switched between the case where the switching of the setting value by the operation dial 110 is valid and the case where the switching of the setting value by the operation dial 110 is invalid. Accordingly, it is possible to grasp at a glance whether the operation by the operation dial 110 is valid.

The switching of the display form is not limited thereto. In addition, for example, the brightness may be switched between the case where the change in the setting value by the operation dial 110 is valid and the case where the change in the setting value by the operation dial 110 is invalid (for example, the brightness is made bright in the case where the change in the setting value by the operation dial 110 is valid, and the brightness is made dark in the case where the change in the setting value by the operation dial 110 is invalid).

Further, in the case where the operation dial 110 is rotationally operated in the case where the change in the setting value by the operation dial 110 is invalid, the display on the dial-display 132 may be turned on and off. Accordingly, it is possible to be more easily recognized that the operation is invalid.

The method of switching between validity and invalidity of the change in the setting value by the operation dial 110 may be any of methods of the first and second embodiments. In the case of the method of the first embodiment, the operation of the operation dial 110 becomes valid only in the case where the operation dial 110 is operated while the top surface is touched. On the other hand, in the case of the method of the second embodiment, the change in the setting value by the operation dial 110 can be switched alternately between valid and invalid every time the top surface of the operation dial 110 is touched.

Further, the item to be set by the operation dial 110 may be set manually by the user or automatically according to the imaging mode or the like. That is, the item to be set by the operation dial 110 may be set manually on the setting screen or may be switched sequentially in response to the button operation or the like.

The dial-display 132 displays the setting value of the item to be set by the operation dial 110 in the above-described embodiment, and may also display information on the item to be set by the operation dial 110. Further, the dial-display 132 may display only the information on the item to be set by the operation dial 110 or display other pieces of information.

FIG. 37 is a diagram showing an example in a case where the dial-display displays information on an item to be set by the operation dial and a setting value of the item.

As shown in FIG. 37, the dial-display 132 displays information s1 on the item to be set by the operation dial 110 and information s2 on the setting value of the item. FIG. 37 displays the example in the case where the item to be set by the operation dial 110 is the shutter speed. In this case, the character of "SHUTTER SPEED" is displayed as the information indicating that the item to be set by the operation dial 110 is the shutter speed.

In addition, for example, in the case where the item to be set by the operation dial 110 is the F-number, the dial-display 132 displays the character of "IRIS" as the information indicating that the item to be set by the operation dial 110 is the F-number. Further, in the case where the item to be set by the operation dial 110 is the ISO sensitivity, the dial-display 132 displays the character of "ISO" as the information indicating that the item to be set by the operation dial 110 is the ISO sensitivity. Further, in the case where the item to be set by the operation dial 110 is the exposure correction value, the dial-display 132 displays the character of "EXPOSURE CORRECTION" as the information indicating that the item to be set by the operation dial 110 is the exposure correction value. Further, in the case where the item to be set by the operation dial 110 is the imaging mode, the dial-display 132 displays the character of "MODE" as the information indicating that the item to be set by the operation dial 110 is the imaging mode.

Seventh Embodiment

A digital camera of the embodiment also comprises the dial-display on the operation dial and is in common with the digital camera of the sixth embodiment in that the setting value of the item to be set by the operation dial is displayed on the dial-display.

In the digital camera of the embodiment, the displays on the dial-display and the sub-display in the case where the top surface of the operation dial is touched by the finger are different from those of the digital camera of the sixth embodiment.

In the case where the top surface of the operation dial is touched by the finger, the display on the dial-display becomes difficult to view. Thus, in the digital camera of the embodiment, in the case where the top surface of the operation dial is touched by the finger, the sub-display displays the setting value of the item to be set by the operation dial.

«First Display Form»

FIG. 38 is a diagram showing an example of displays on the sub-display and the dial-display in the case where the top surface of the operation dial is not touched by the finger. FIG. 38 shows the example in the case where the item to be set by the operation dial 110 is the shutter speed.

As shown in FIG. 38, in the case where the top surface of the operation dial is not touched by the finger, the dial-display 132 displays the setting value of the item to be set by the operation dial 110. As described above, FIG. 38 shows the example in the case where the item to be set by the operation dial 110 is the shutter speed. In this case, the dial-display 132 displays the setting value of the shutter speed. FIG. 38 shows a case where a currently set shutter speed is 1/60 second. In the dial-display 132, the setting value of the item to be set by the operation dial 110 is displayed in the black character on the white background.

Further, as shown in FIG. 38, in the case where the top surface of the operation dial is not touched by the finger, the sub-display 16 displays the F-number information i2, the ISO sensitivity information i3, the exposure correction value information i4, the imaging mode information i5, the battery remaining amount information i6, and the number of capturable images information i7. The F-number, the ISO sensitivity, the exposure correction value, and the imaging mode are the items that can be set by the operation dial 110.

FIG. 39 is a diagram showing an example of displays on the sub-display and the dial-display in the case where the top surface of the operation dial is touched by the finger.

As shown in FIG. 39, in the case where the top surface of the operation dial 110 is touched by the finger, the display of the setting value disappears and the background color is inverted in the dial-display 132. That is, the whole screen is displayed in black.

On the other hand, the sub-display 16 displays the setting value of the item to be set by the operation dial 110. That is, the sub-display 16 displays the setting value of the shutter speed.

In this manner, in the case where the top surface of the operation dial 110 is touched by the finger, the display on the sub-display 16 can be switched to the display on the dial-display 132. It is possible for the user to confirm the setting value of the item to be set by the operation dial 110 by confirming the display on the sub-display 16. Accordingly, it is possible to ensure good operability.

«Second Display Form»

The displays on the sub-display and the dial-display in the case where the top surface of the operation dial is not touched by the finger are the same as those of the first display form (refer to FIG. 38).

FIG. 40 is a diagram showing another example of displays on the sub-display and the dial-display in the case where the top surface of the operation dial is touched by the finger.

As shown in FIG. 40, in the case where the top surface of the operation dial 110 is touched by the finger, the display of the setting value disappears and the background color is inverted in the dial-display 132.

On the other hand, in the case where the top surface of the operation dial 110 is touched by the finger, a part of the display on the sub-display 16 is switched to the display of the setting value of the item to be set by the operation dial 110. FIG. 40 shows an example in a case where the displays of the battery remaining amount and the number of capturable images are switched to the display of the setting value of the item to be set by the operation dial 110, that is, the display of the shutter speed.

In the example shown in FIG. 40, information id on the setting value of the item to be set by the operation dial 110 is displayed surrounded by a frame line fl. Accordingly, it is possible to easily distinguish the setting value of the item to be set by the operation dial 110.

In this manner, a part of the display on the sub-display 16 may be switched to the display on the dial-display 132. It is possible for the user to confirm the setting value of the item to be set by the operation dial 110 by confirming the display on the sub-display 16. Further, in the case of this example, it is possible to confirm other pieces of information.

«Third Display Form»

The displays on the sub-display and the dial-display in the case where the top surface of the operation dial is not touched by the finger are the same as those of the first display form (refer to FIG. 38).

FIG. 41 is a diagram showing still another example of displays on the sub-display and the dial-display in the case where the top surface of the operation dial is touched by the finger.

As shown in FIG. 41, in the case where the top surface of the operation dial 110 is touched by the finger, the display of the setting value disappears and the background color is inverted in the dial-display 132.

On the other hand, in the case where the top surface of the operation dial 110 is touched by the finger, the original display is reduced and the setting value of the item to be set by the operation dial 110 is displayed in a margin region on the sub-display 16. The original display refers to the display in the case where the top surface of the operation dial 110 is not touched by the finger. In the case where the top surface of the operation dial is not touched by the finger as shown in FIG. 38, the sub-display 16 displays the F-number information i2, the ISO sensitivity information i3, the exposure correction value information i4, the imaging mode information i5, the battery remaining amount information i6, and the number of capturable images information i7. In the case where the top surface of the operation dial 110 is touched by the finger, these pieces of information are reduced as a whole at a predetermined reduction ratio, moved to the front side, and displayed. The setting value of the item to be set by the operation dial 110, that is, the setting value of the shutter speed is displayed in the margin region formed on the back side.

In the example shown in FIG. 41, the information id on the setting value of the item to be set by the operation dial 110 is displayed surrounded by the frame line fl. Accordingly, it is possible to easily distinguish the setting value of the item to be set by the operation dial 110.

In the case of this example, it is also possible for the user to confirm the setting value of the item to be set by the operation dial 110 by confirming the display on the sub-display 16.

According to the digital camera of the embodiment as described above, in the case where the top surface of the operation dial 110 is touched by the finger, the sub-display 16 displays the setting value of the item to be set by the operation dial 110. Accordingly, it is possible to easily confirm the setting value of the item to be set by the operation dial 110 and thus to ensure good operability.

In the case where the top surface of the operation dial 110 is touched by the finger, the display can be switched in the above-described embodiment. However, the display may be switched in a case where the top surface of the operation dial 110 is touched continuously for a certain period of time. For example, in a case where the top surface of the operation dial 110 is touched by the finger continuously for two seconds or more, the display may be switched.

Further, the method of switching between validity and invalidity of the change in the setting value by the operation dial 110 may be any of methods of the first and second embodiments. In the case of the method of the first embodiment, the operation of the operation dial 110 becomes valid only in the case where the operation dial 110 is operated while the top surface is touched. On the other hand, in the case of the method of the second embodiment, the change in the setting value by the operation dial 110 can be switched alternately between valid and invalid every time the top surface of the operation dial 110 is touched. In a case where the switching is performed by the method of the first embodiment, since the display on the top surface is hidden during the operation, the invention is particularly effective.

The switching between validity and invalidity of the change in the setting value by the operation dial 110 is performed by the method of the second embodiment, the display on the dial-display 132 may be switched between the case where the change in the setting value is valid and the case where the change in the setting value is invalid. For example, the color may be inverted between the case where the change in the setting value by the operation dial 110 is valid and the case where the change in the setting value by the operation dial 110 is invalid. Accordingly, it is possible to grasp at a glance whether the operation dial 110 is locked.

Eighth Embodiment

A digital camera of the embodiment also comprises the dial-display on the operation dial and is in common with the digital camera of the sixth embodiment in that the setting value of the item to be set by the operation dial is displayed on the dial-display.

In the digital camera of the embodiment, in the case where the top surface of the operation dial is touched by the finger, the setting value of the item to be set by the operation dial is displayed on the dial-display avoiding a position touched by the finger.

FIG. 42 is a diagram showing yet another example of displays on the sub-display and the dial-display in the case where the top surface of the operation dial is touched by the finger.

The displays on the sub-display and the dial-display in the case where the top surface of the operation dial is not touched by the finger are the same as those of the digital camera of the first display form (refer to FIG. 38).

As shown in FIG. 42, in the case where the top surface of the operation dial 110 is touched by the finger, the information s2 on the setting value of the item to be set by the operation dial 110 is displayed on the dial-display 132 avoiding a position touched by the finger. The display on the sub-display 16 is not changed.

Accordingly, it is possible to prevent the information displayed on the dial-display 132 from not being viewed and thus to ensure good operability.

In the case of this example, it is necessary to detect the region touched by the finger. Therefore, the touch sensor 130 provided with the operation dial 110 is provided with a function of detecting the touched region in addition to the detection of the contact. In particular, the function of detecting the region touched by the finger within the display surface of the dial-display 132 is provided.

The dial-display display control unit 134 displays the information on the setting value of the item to be set by the operation dial 110 on the dial-display 132 avoiding the region where the contact is detected based on the detection result of the touch sensor 130. At this time, the dial-display display control unit 134 adjusts a display size of the information on the setting value of the item to be set by the operation dial 110 and displays the information on the dial-display 132. That is, the display size is adjusted to a size that can be displayed on a region where the contact is not detected, and the information on the setting value of the item to be set by the operation dial 110 is displayed on the dial-display 132.

In a case where the majority on the display surface of the dial-display 132 is touched by the finger, the display of the information is substantially impossible. The information on the setting value of the item to be set by the operation dial 110 may be displayed on the dial-display 132 only in a case where the region where the finger is not touched is equal to or larger than a certain area.

In this manner, according to the digital camera of the embodiment, in the case where the top surface of the operation dial 110 is touched by the finger, the dial-display 132 displays the setting value of the item to be set by the operation dial 110 avoiding the position where the finger is touched. Accordingly, it is possible to easily confirm the setting value of the item to be set by the operation dial 110 and thus to ensure good operability.

In the case where the top surface of the operation dial 110 is touched by the finger, the display can be switched in the above-described embodiment. However, the display may be switched in a case where the top surface of the operation dial 110 is touched continuously for a certain period of time. For example, in a case where the top surface of the operation dial 110 is touched by the finger continuously for two seconds or more, the display may be switched.

Further, the method of switching between validity and invalidity of the change in the setting value by the operation dial 110 may be any of methods of the first and second embodiments. In the case of the method of the first embodiment, the operation of the operation dial 110 becomes valid only in the case where the operation dial 110 is operated while the top surface is touched. On the other hand, in the case of the method of the second embodiment, the change in the setting value by the operation dial 110 can be switched alternately between valid and invalid every time the top surface of the operation dial 110 is touched. In a case where the switching is performed by the method of the first embodiment, since the display on the top surface is hidden during the operation, the invention is particularly effective.

The switching between validity and invalidity of the change in the setting value by the operation dial 110 is performed by the method of the second embodiment, the display on the dial-display 132 may be switched between the case where the change in the setting value is valid and the case where the change in the setting value is invalid. For example, the color may be inverted between the case where the change in the setting value by the operation dial 110 is valid and the case where the change in the setting value by the operation dial 110 is invalid. Accordingly, it is possible to grasp at a glance whether the operation dial 110 is locked.

Further, the information s2 on the setting value of the item to be set by the operation dial 110 is displayed on the region where the contact is not detected while the contact is detected in the above-described embodiment. However, the information s2 on the setting value of the item to be set by the operation dial 110 may be shifted to and displayed at a predetermined position while the contact is detected. In a case where an operation form of a normal operation dial can be specified, it is also possible to assume a position where the display is hidden by the finger due to the operation. Therefore, in such case, the information s2 on the setting value of the item to be set by the operation dial 110 is shifted to and displayed at the predetermined position while the contact is detected. At this time, the display size is reduced and displayed as necessary. Accordingly, it is possible to display the information s2 on the setting value of the item to be set by the operation dial 110 on the dial-display 16 avoiding a substantially touched region. In a case of detecting the contact with the rotation center of the operation dial, the information to be displayed on the dial-display 16 is shifted to and displayed at the predetermined position while the contact is detected as in this example.

Ninth Embodiment

In a digital camera of the embodiment, the item to be set by the operation dial is automatically switched according to the imaging mode. This point is in common with the digital camera of the third embodiment, but a method of switching the imaging mode is different. In the digital camera of the embodiment, the imaging mode can be switched by an operation of swiping the top surface of the operation dial. The swipe operation refers to an operation of moving the finger so as to stroke in a specific direction while the finger touches the top surface.

A basic configuration of the digital camera is the same as the digital camera of the fifth embodiment. That is, the dial-display 132 and the touch sensor 130 that detects the contact with the display surface of the dial-display 132 are provided on the top surface of the operation dial 110. The touch sensor 130 is formed to be capable of detecting the swipe operation in addition to detecting the contact.

FIG. 43 is a diagram showing an example of displays on the sub-display and the dial-display in the digital camera of the embodiment.

As shown in FIG. 43, the dial-display 132 displays information s3 on a currently set imaging mode and the information s2 on the setting value of the item to be set by the operation dial 110.

FIG. 43 shows an example in a case where the currently set imaging mode is the shutter speed priority. In the case where the imaging mode is the shutter speed priority, the item to be set by the operation dial 110 is the shutter speed. Therefore, in this case, the dial-display 132 displays the information (s3) indicating that the currently set imaging mode is the shutter speed priority and the information (s2) on a currently set shutter speed.

In the case where the currently set imaging mode is the shutter speed priority, a symbol of "S" is displayed as the information s3 on the currently set imaging mode as shown in FIG. 43. FIG. 43 shows an example in a case where the currently set shutter speed is $\frac{1}{60}$ second. In this case, "$\frac{1}{60}$" is displayed as the information s2 on the setting value of the item to be set by the operation dial 110.

The sub-display 16 displays pieces of information other than the item to be set by the operation dial 110. The pieces of information displayed on the sub-display 16 include at least pieces of information on the setting values of the items that can be set by the operation dial 110.

In the currently set imaging mode is the shutter speed priority, the sub-display 16 displays pieces of information other than the shutter speed and the imaging mode, that is, respective pieces of information i2 to i4 of the F-number, the ISO sensitivity, and the exposure correction value as shown in FIG. 43. In addition, in the digital camera of the embodiment, the sub-display 16 displays the battery remaining amount information i6 and the number of capturable images information i7.

FIG. 44 is a diagram describing the method of switching the imaging mode by the swipe operation on the top surface of the operation dial.

In the digital camera of the embodiment, the imaging mode can be switched by swiping the top surface of the operation dial 110 in the lateral direction.

The imaging mode setting unit switches the imaging mode based on the output from the touch sensor 130.

Here, in a case where the top surface of the operation dial 110 is swiped in the right direction, the imaging mode can be switched in order of the program, the shutter speed priority, the aperture stop priority, and the manual. Further, in a case where the top surface of the operation dial 110 is swiped in the left direction, the imaging mode can be switched in a reverse order. That is, the imaging mode can be switched in order of the manual, the aperture stop priority, the shutter speed priority, and the program. For example, in the case where the currently selected imaging mode is the shutter speed priority, in the case where the top surface of the operation dial 110 is swiped in the right direction, the imaging mode can be switched to the aperture stop priority.

FIG. 44 shows a display on the dial-display 132 during the switching of the imaging mode. Specifically, the display on the dial-display 132 during the switching from the shutter speed priority to the aperture stop priority is shown. As shown in FIG. 44, the display on the dial-display 132 is switched by a scroll.

FIG. 45 is a conceptual diagram of the scroll of the display on the dial-display.

As shown in FIG. 45, the swipe operation is performed on the top surface of the operation dial 110 in the lateral direction to move contents of a display screen on the dial-display 132 in the lateral direction, and thus the display is switched. The contents of the screen move in the direction of swiping.

(A), (B), (C), and (D) of FIG. 46 are diagrams showing examples of the display on the dial-display in each imaging mode.

(A) of FIG. 46 shows a display screen of the dial-display 132 in a case where the imaging mode is the program.

In a case where the imaging mode is set to the program, the item to be set by the operation dial 110 is set to the program shift. In this case, the dial-display 132 displays information indicating that the currently set imaging mode is the program and pieces of information on the currently set shutter speed and F-number. In the example shown in (A) of FIG. 46, a symbol of "P" is displayed as the information indicating that the currently set imaging mode is the program. Further, (A) of FIG. 46 shows an example in a case where the currently set shutter speed is ⅟60 second and the F-number is F5.6.

(B) of FIG. 46 shows a display screen of the dial-display 132 in a case where the imaging mode is the shutter speed priority.

In a case where the imaging mode is set to the shutter speed priority, the item to be set by the operation dial 110 is set to the shutter speed. In this case, the dial-display 132 displays information indicating that the currently set imaging mode is the shutter speed priority and information on the currently set shutter speed. In the example shown in (B) of FIG. 46, a symbol of "S" is displayed as the information indicating that the currently set imaging mode is the shutter speed priority. Further, (B) of FIG. 46 shows an example in a case where the currently set shutter speed is ⅟60 second.

(C) of FIG. 46 shows a display screen of the dial-display 132 in a case where the imaging mode is the aperture stop priority.

In a case where the imaging mode is set to the aperture stop priority, the item to be set by the operation dial 110 is set to the F-number. In this case, the dial-display 132 displays information indicating that the currently set imaging mode is the aperture stop priority and information on the currently set F-number. In the example shown in (C) of FIG. 46, a symbol of "A" is displayed as the information indicating that the currently set imaging mode is the aperture stop priority. Further, FIG. (C) of 46 shows an example in a case where the currently set F-number is F5.6.

(D) of FIG. 46 shows a display screen of the dial-display 132 in a case where the imaging mode is the manual.

In a case where the imaging mode is set to the manual, the item to be set by the operation dial 110 is set to the shutter speed or the F-number. Whether the shutter speed or the F-number is set depends on the setting by the user. In a case where the user selects the shutter speed, the item to be set by the operation dial is set to the shutter speed. In this case, the setting of the F-number is performed by the rear command dial 41. Further, in a case where the user selects the F-number, the item to be set by the operation dial is set to the F-number. In this case, the setting of the shutter speed is performed by the rear command dial 41.

In the case where the item to be set by the operation dial 110 is the shutter speed, the dial-display 132 displays information indicating that the currently set imaging mode is the manual and information on the currently set shutter speed. On the other hand, in the case where the item to be set by the operation dial 110 is the F-number, the dial-display 132 displays information indicating that the currently set imaging mode is the manual and information on the currently set F-number. The example shown in (D) of FIG. 46 shows an example in the case where the item to be set by the operation dial 110 is the shutter speed. Further, in the example shown in (D) of FIG. 46, a symbol of "M" is displayed as the information indicating that the currently set imaging mode is the manual. Further, (D) of FIG. 46 shows an example in a case where the currently set shutter speed is ⅟60 second.

The imaging mode can be switched in order of the program, the shutter speed priority, the aperture stop priority, and the manual by swiping the top surface of the operation dial 110 in the right direction.

As described above, the imaging mode setting unit switches the imaging mode based on the output from the touch sensor 130. The setting item setting unit 158 sets the item to be set by the operation dial 110 according to the imaging mode set by the imaging mode setting unit.

The sub-display display control unit 72A controls the display on the sub-display 16 according to the set imaging mode. Similarly, the dial-display display control unit 134 controls the display on the dial-display 132 according to the set imaging mode.

According to the digital camera of the embodiment as described above, it is possible to switch the imaging mode by the operation of swiping the top surface of the operation dial 110. Accordingly, it is possible to easily switch the operation mode. Further, since the dial-display 132 displays the information on the set imaging mode, it is also possible to easily switch the operation mode visually. Furthermore, since the dial-display 132 displays also the information on the setting value of the item to be set by the operation dial 110, it is possible to realize good operability.

The imaging mode is switched by the operation of swiping the top surface of the operation dial in the above-described embodiment. However, the operation mode may be switched by a flick operation. The flick refers to an operation of touching the top surface with the finger and then moving the finger so as to flip.

Further, the method of switching between validity and invalidity of the change in the setting value by the operation dial 110 may be any of methods of the first and second embodiments. In the case of the method of the first embodiment, the operation of the operation dial 110 becomes valid only in the case where the operation dial 110 is operated while the top surface is touched. On the other hand, in the case of the method of the second embodiment, the change in the setting value by the operation dial 110 can be switched alternately between valid and invalid every time the top surface of the operation dial 110 is touched. In a case where the switching is performed by the method of the first embodiment, since the display on the top surface is hidden during the operation, the invention is particularly effective.

Further, the switching between validity and invalidity of the change in the setting value by the operation dial 110 is performed by the method of the second embodiment, the display on the dial-display 132 may be switched between the case where the change in the setting value is valid and the case where the change in the setting value is invalid. For example, the color may be inverted between the case where the change in the setting value by the operation dial 110 is valid and the case where the change in the setting value by the operation dial 110 is invalid. Accordingly, it is possible to grasp at a glance whether the operation dial 110 is locked.

In a case where the finger touches the display surface of the dial-display 132, the display may become difficult to view by the finger. Therefore, for example, in a case where the finger touches the same position continuously for a certain period of time or more, the display may be performed avoiding the position touched by the finger.

FIG. 47 is a diagram showing an example of a display on the dial-display in the case where the finger touches the same position continuously for a certain period of time or more.

As shown in FIG. 47, in the case where the finger touches the same position continuously for a certain period of time or more, the information to be displayed on the dial-display 132 is displayed avoiding the position touched by the finger. In this case, the touch sensor is provided with a function of detecting the region touched by the finger.

Other Embodiments

[Item to be Set by Operation Dial]

In each embodiment described above, the shutter speed, the F-number, the ISO sensitivity, the exposure correction value, and the imaging mode are set by the operation dial. However, the item to be set by the operation dial is not limited to the above items. It is possible to set the item as appropriate depending on the function provided with the digital camera.

[Modification Example of Contact Detection Unit]

The contact detection unit is formed of the touch sensor in the above-described embodiment, but the configuration of the contact detection unit is not limited thereto.

Further, in a case of detecting only the contact, the contact detection region may be limited to a part thereof. For example, the contact detection region may be limited to a center portion of the top surface of the operation dial.

[Modification Example of Detection of Contact]

A so-called dead zone may be provided for the detection of the contact. That is, it is preferable not to detect instantaneous finger contact. Similarly, it is preferable not to detect also a case where the finger is instantaneously released.

In order to provide the dead zone, for example, the contact is detected at regular time interval. In this case, it is determined whether the contact is continuously detected to determine the presence or absence of the contact. In a case where the contact is continuously detected, the contact is determined to be present. In the case of the instantaneous contact, since the contact is not continuously detected, the contact is not determined to be present. Further, even in the case where the finger is instantaneously released, it can be recognized that the contact is continued as long as the finger is touched before the next detection.

In this manner, the operation can be performed more stably by determining also duration of the contact and responding with hysteresis.

[Other Examples of Display Form in Case where Change in Setting Value by Operation Dial is Valid and in Case where Change in Setting Value by Operation Dial is Invalid]

In the case where the change in the setting value by the operation dial is invalid, the lock mark is displayed on the sub-display in the above-described embodiment. However, a method of notifying by the sub-display that the change in the setting value by the operation dial is invalid is not limited thereto. For example, it may be notified that the change in the setting value by the operation dial is invalid by changing the background color of the sub-display.

[Other Examples of Method of Notifying that Change in Setting Value by Operation Dial is Invalid]

(1) Notification by Sound

In a case where the digital camera is provided with a sound output unit such as a speaker, the user may be notified that the change in the setting value by the operation dial is invalid by using the sound output unit. For example, in the case where the operation dial is rotationally operated in the case where the change in the setting value by the operation dial is invalid, a sound such as a notification sound or a warning sound is output from the sound output unit. In this case, the digital camera is provided with a sound output control unit. In the case where it is detected that the operation dial is rotationally operated in the state where the change in the setting value by the operation dial is invalid, the sound output control unit outputs the sound such as the notification sound or the warning sound from the sound output unit.

Further, in the case where the digital camera is provided with the sound output unit such as the speaker, a pseudo-rotation operation sound may be output in conjunction with the rotation operation of the operation dial. In this case, the rotation operation sound may be switched between the case where the change in the setting value by the operation dial is valid and the case where the change in the setting value by the operation dial is invalid. Alternatively, the rotation operation sound may be output only in the case where the change in the setting value by the operation dial is valid.

(2) Notification on Main-Display

In a case where the camera body is provided with the main-display as the digital camera of the above-described embodiment, the main-display may display a state of the operation dial. That is, the main-display may display whether the change in the setting value by the operation dial is valid. In a case where the camera body is provided with the electronic view finder, the same display may be performed also on the electronic view finder.

[Other Forms of Dial-Display Section]

The shape of the dial-display as one example of the dial display section is circular in the above-described embodiment, but the shape of the dial display section is not limited thereto. For example, the shape thereof may be rectangular or polygonal.

FIG. 48 is a plan view of the sub-display and the operation dial having a rectangular dial display section.

In the operation dial 110 shown in FIG. 48, the dial-display 132 that is an example of the dial display section has a rectangular display surface.

In this manner, the shape of the dial display section does not necessarily match the shape of the top surface of the operation dial (shape of the upper-end surface of the inner peripheral part 112), and various shapes may be employed.

[Other Examples of Dial-Display Section]

The dial-display forming the dial display section is formed of the LCD in the above-described embodiment, but the dial-display forming the dial display section is not limited thereto. In addition, the dial-display may be formed of a self-luminous display or the like such as electronic paper, a memory liquid crystal display, or an organic electroluminescent display (EL).

The electronic paper is a thin display that has thinness and visibility at the same level as those of paper, and means a display of which contents to be displayed can be rewritten. The memory liquid crystal display is a liquid crystal display that has a function to be capable of maintaining contents displayed on a screen even though a power supply is turned off. Both of the electronic paper and the memory liquid crystal display can ensure good visibility even in an environment where surroundings are bright. Further, a display on the dial display section can be confirmed even in a case where the power supply of the camera is turned off.

Further, in a case where the dial-display is formed of the LCD, it is possible to ensure good visibility even in an environment where surroundings are bright by employing a reflective LCD as the display. In the case where the dial-display is formed of the reflective LCD, it is preferable to comprise illumination.

Similarly, the sub-display which is the display section may also be formed of the self-luminous display or the like such as the electronic paper, the memory liquid crystal display, or the organic EL display.

[Other Examples of Disposition of Display Section with Respect to Operation Dial]

The sub-display 16 is disposed at the position on the left oblique front side of the operation dial 110 on the top surface of the camera body 10 in the above-described embodiment. However, the disposition position of the sub-display 16 with respect to the operation dial 110 is not limited thereto.

However, since the operability and the visibility deteriorate in a case where the sub-display 16 is disposed at a position away from the operation dial 110, it is preferable to dispose the sub-display 16 near the operation dial 110.

Here, the "near" refers to a distance relationship to the extent that the sub-display 16 and the operation dial 110 are disposed adjacent to each other as shown in FIG. 3.

It is possible to enhance the relationship between the sub-display 16 and the operation dial 110 by disposing the sub-display 16 near the operation dial 110 and thus to provide better operability. That is, since the setting can be confirmed right near the operation dial 110 by disposing the sub-display 16 near the operation dial 110, in a case where the operation is performed while the operation dial or the dial-display is viewed, it is possible to reduce movement of line of sight and thus to provide good operability without stress. Further, it is also possible to realize an intuitive operation.

Further, in the case where the sub-display 16 is disposed near the operation dial 110, it is preferable to dispose the sub-display 16 on the left side than on the right side of the operation dial 110 and on the upper side than on the lower side of the operation dial 110 from the viewpoint of operability since the sub-display 16 is hardly hidden by the hand operating the operation dial 110.

FIG. 49 is a plan view showing another example of a layout of the operation dial and the sub-display.

In the example shown in FIG. 49, the sub-display 16 is disposed at a position on the left side of the operation dial 110 on the top surface of the camera body 10. Accordingly, it is possible to prevent the display on the sub-display 16 from being hidden by the finger of the hand operating the operation dial 110.

FIG. 50 is a plan view showing still another example of the layout of the operation dial and the sub-display.

In the example shown in FIG. 50, the sub-display 16 is disposed at a position on the front side of the operation dial 110 on the top surface of the camera body 10. In the example shown in FIG. 50, a plurality of dials D1 and D2 are provided on the top surface of the camera body 10. Further, in the example shown in FIG. 50, the outer diameter of the operation dial 110 and the screen size of the sub-display are reduced. In this manner, it is possible to set the outer diameter of the operation dial and the screen size of the sub-display as appropriate depending on the size of the camera body or the like.

[Other Modification Examples]

The rotation of the operation dial is detected by the rotary encoder in the above-mentioned embodiment, but the configuration of detecting the rotation of the operation dial is not limited thereto. In addition, for example, publicly known rotation detection means, which uses a rotary brush or the like, may also be employed.

Further, the click mechanism of the operation dial is formed of the click groove-metal plate and the click balls in the above-mentioned embodiment, but the configuration of the click mechanism is not limited thereto. In addition, publicly known click mechanism, which uses a leaf spring or the like, may also be employed.

Further, the case where the invention is applied to the digital camera is described in the above-mentioned embodiment, but the application of the invention is not limited thereto. The invention may be applied similarly to a camera that uses a silver halide film. Further, the invention may also be applied to an electronic apparatus comprising the camera function.

Further, the case where the invention is applied to the lens-interchangeable camera is described in the above-mentioned embodiment, but the invention may also be applied similarly to a camera, which is integrated with a lens.

Furthermore, the case where the invention is applied to the non-reflex camera is described in the above-mentioned embodiment, but the invention may also be applied similarly to a reflex camera.

EXPLANATION OF REFERENCES

1: digital camera
2: lens
2a: lens drive unit
10: camera body
12: lens mount
14: main-display
16: sub-display
18: electronic view finder
20: hot shoe
22: grip
24: thumb rest
30: shutter button
31: power supply lever 34: playback button
35: delete button
36: AF lock button
37: AE lock button
38: menu button
39: selector button
40: BACK button
41: rear command dial
42: mode dial
42a: indicator
43: setting item switching button
50: image sensor
52: image sensor drive unit
54: shutter
56: shutter drive unit
58: analog signal processing section
60: image data input unit
62: work memory
64: data memory
66: digital signal processing section
68: recording control unit
70: main-display drive unit
72: sub-display drive unit
72A: sub-display display control unit
74: operation unit
78: memory card
80: system controller
110: operation dial
112: inner peripheral part
112A: support part
114: outer peripheral part
114A: shaft portion
116: operation dial support frame
116A: click ball-receiving hole
118: bearing
120: click mechanism
120A: click groove-metal plate
120B: click ball
120C: click spring
120a: click groove
126: rotation detection unit
130: touch sensor
132: dial-display
134: dial-display display control unit
136: dial-display drive unit
150: setting system
152: switching unit
154: setting value change unit
156: setting item selection unit
158: setting item setting unit
160: imaging mode setting unit
162: setting item switching instruction unit
L: optical axis
S11 to S14: procedure of setting change by using operation dial
S21 to S25: operation procedure of switching unit
S31 to S34: procedure of setting change by using operation dial
fl: frame line
i1: shutter speed information
i2: F-number information
i3: ISO sensitivity information
i4: exposure correction value information
i5: imaging mode information
i6: battery remaining amount information
i7: the number of capturable images information
id: information on setting value of item to be set by operation dial
m1: lock mark
m2: selection mark
s1: information on item to be set by operation dial
s2: information on setting value of item to be set by operation dial
s3: information on currently set imaging mode

The invention claimed is:

1. A camera comprising:
a rotary operation dial;
a dial display section that is provided on a top surface of the operation dial;
a display section that is provided near the operation dial; and
a system controller configured to
display setting values of a plurality of items capable of being set by the operation dial on the display section,
set an item to be set by an operation of the operation dial among the plurality of items,
display information on the item to be set by the operation of the operation dial on the dial display section,
switch between validity and invalidity of a change in setting value of the item to be set by the operation dial, and
change the setting value of the item in response to an operation of the operation dial in a case where the change in the setting value is valid.

2. The camera according to claim 1,
wherein the plurality of items capable of being set by the operation dial include at least one of a shutter speed, an F-number, an ISO sensitivity, an exposure correction value, and an imaging mode of the camera.

3. The camera according to claim 1,
wherein the system controller is further configured to switch a display form of the information on the dial display section between the case where the change in the setting value by the operation dial is valid and a case where the change in the setting value by the operation dial is invalid.

4. The camera according to any claim 1,
wherein in the case where the change in the setting value by the operation dial is invalid, the system controller is further configured to display information indicating that the change in the setting value by the operation dial is invalid on the display section or the dial display section.

5. The camera according to claim 1,
wherein the system controller is further configured to
receive a selection of the item to be set by the operation dial; and
set the item to be set by the operation of the operation dial, among the plurality of items, according to the received selection.

6. The camera according to claim 1:
wherein the operation dial is further configured to perform an instruction to switch the item to be set by the operation dial, and
wherein the system controller is further configured to set the item to be set by the operation of the operation dial, among the plurality of items, in response to the instruction by the operation dial.

7. The camera according to claim 6, further comprising:
a touch sensor that is provided on the operation dial and detects contact with the operation dial;

wherein the touch sensor further detects an operation of swiping or flicking the top surface of the operation dial, and wherein the operation dial performs the instruction to switch the item to be set by the operation dial in response to the swipe operation or the flick operation detected by the touch sensor.

8. The camera according to claim 1, further comprising:
a touch sensor that is provided on the operation dial and detects contact with the operation dial;
wherein in a case where the contact is detected by the touch sensor and in the case where the change in the setting value by the operation dial is valid, the system controller is further configured to display information on the dial display section avoiding a touched region.

9. The camera according to claim 1, further comprising:
a touch sensor that is provided on the operation dial and detects contact with the operation dial;
wherein in a case where the contact is detected by the touch sensor and in the case where the change in the setting value by the operation dial is valid, the system controller is further configured to display information on the item to be set by the operation dial on the dial display section avoiding a predetermined touched region.

10. The camera according to claim 1, further comprising:
a touch sensor that is provided on the operation dial and detects contact with the operation dial;
wherein the system controller is further configured to make the change in the setting value by the operation dial valid while the contact is detected by the contact detection unit.

11. The camera according to claim 1, wherein the system controller is further configured to update the information displayed on the dial display section in response to the operation of the operation dial.

12. The camera according to claim 1,
wherein the operation dial and the display section are disposed on a top surface of a camera body.

13. The camera according to claim 1,
wherein a display direction of the operation dial and a display direction of the display section are the same.

14. The camera according to claim 1, further comprising:
a touch sensor that is provided on the operation dial and detects contact with the operation dial;
wherein the system controller switches between validity and invalidity of the change in a setting value by the operation dial in response to a detection by the touch sensor.

15. The camera according to claim 2, further comprising:
a touch sensor that is provided on the operation dial and detects contact with the operation dial;
wherein the system controller switches between validity and invalidity of the change in a setting value by the operation dial in response to a detection by the touch sensor.

16. The camera according to claim 3, further comprising:
a touch sensor that is provided on the operation dial and detects contact with the operation dial;
wherein the system controller switches between validity and invalidity of the change in a setting value by the operation dial in response to a detection by the touch sensor.

17. The camera according to claim 4, further comprising:
a touch sensor that is provided on the operation dial and detects contact with the operation dial;
wherein the system controller switches between validity and invalidity of the change in a setting value by the operation dial in response to a detection by the touch sensor.

18. The camera according to claim 5, further comprising:
a touch sensor that is provided on the operation dial and detects contact with the operation dial;
wherein the system controller switches between validity and invalidity of the change in a setting value by the operation dial in response to a detection by the touch sensor.

19. A setting method of a camera including a rotary operation dial, a dial display section that is provided on a top surface of the operation dial and a display section that is provided near the operation dial, the setting method comprising:
displaying setting values of a plurality of items capable of being set by the operation dial on the display section,
setting an item to be set by an operation of the operation dial among the plurality of items,
displaying information on the item to be set by the operation of the operation dial on the dial display section,
switching between validity and invalidity of a change in setting value of the item to be set by the operation dial, and
changing the setting value of the item in response to an operation of the operation dial in a case where the change in the setting value is valid.

20. The setting method of a camera according to claim 19, wherein switching between validity and invalidity of a change in a setting value by the operation dial is performed in response to a detection by a touch sensor that is provided on the operation dial.

* * * * *